United States Patent
Kodama et al.

(10) Patent No.: US 10,654,005 B2
(45) Date of Patent: May 19, 2020

(54) METHOD FOR PRODUCING GAS SEPARATION COMPOSITE MEMBRANE, LIQUID COMPOSITION, GAS SEPARATION COMPOSITE MEMBRANE, GAS SEPARATION MODULE, GAS SEPARATION APPARATUS, AND GAS SEPARATION METHOD

(71) Applicant: FUJIFILM Corporation, Tokyo (JP)

(72) Inventors: Keisuke Kodama, Kanagawa (JP); Akihiro Sugita, Kanagawa (JP); Kimiko Iwahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 15/879,446

(22) Filed: Jan. 25, 2018

(65) Prior Publication Data

US 2018/0147546 A1 May 31, 2018

Related U.S. Application Data

(63) Continuation of application No. PCT/JP2016/071290, filed on Jul. 20, 2016.

(30) Foreign Application Priority Data

Aug. 31, 2015 (JP) .................. 2015-170382

(51) Int. Cl.
*B01D 71/70* (2006.01)
*B01D 53/22* (2006.01)
(Continued)

(52) U.S. Cl.
CPC .......... *B01D 71/70* (2013.01); *B01D 53/228* (2013.01); *B01D 67/0088* (2013.01);
(Continued)

(58) Field of Classification Search
CPC ...... B01D 53/22; B01D 53/228; B01D 69/10; B01D 69/12; B01D 71/70;
(Continued)

(56) References Cited

U.S. PATENT DOCUMENTS 4,964,887 A * 10/1990 Shimatani .............. B01D 53/22
                                                                  208/308
5,286,280 A    2/1994 Chiou
(Continued)

FOREIGN PATENT DOCUMENTS

JP      H0235922 A      2/1990
JP      H04317734 A     11/1992
(Continued)

OTHER PUBLICATIONS

English language machine translation for JP 2008-55256. Retrieved from http://translationportal.epo.org on Sep. 16, 2019. (Year: 2019).*

(Continued)

*Primary Examiner* — Jason M Greene
(74) *Attorney, Agent, or Firm* — JCIPRNET

(57) ABSTRACT

The method for producing a gas separation composite membrane includes applying a mixed liquid containing compounds (a) and (b) below onto a porous support to form a coating film and curing the coating film to form a crosslinked polysiloxane compound layer:

(a) a particular crosslinkable polysiloxane compound having a structural unit (a1), a structural unit (a2), and a structural unit (a3) or (a4), and (b) a particular crosslinkable polysiloxane compound having a structural unit (b1), a structural unit (b2), and a structural unit (b3) or (b4), (Continued)

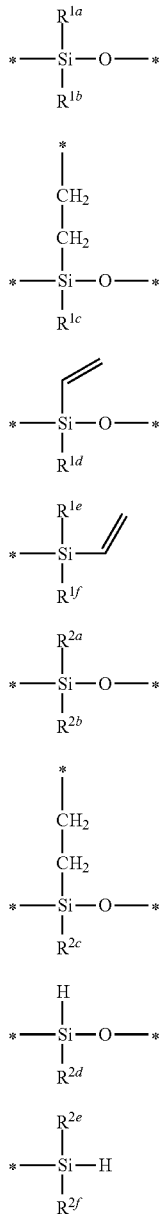

where $R^{1a}$ to $R^{1f}$ and $R^{2a}$ to $R^{2f}$ represent a particular group and * represents a particular linking site.

20 Claims, 1 Drawing Sheet

(51) Int. Cl.
| | | |
|---|---|---|
| B01D 67/00 | (2006.01) | |
| B01D 69/12 | (2006.01) | |
| B01D 69/02 | (2006.01) | |
| C09D 183/04 | (2006.01) | |
| C08G 73/10 | (2006.01) | |
| C08J 3/24 | (2006.01) | |
| C08K 5/00 | (2006.01) | |
| C08L 79/08 | (2006.01) | |
| C08L 83/06 | (2006.01) | |
| C08G 77/12 | (2006.01) | |
| C08G 77/20 | (2006.01) | |

(52) U.S. Cl.
CPC ............. *B01D 69/02* (2013.01); *B01D 69/12* (2013.01); *B01D 69/125* (2013.01); *C08G 73/1039* (2013.01); *C08G 73/1042* (2013.01); *C08G 73/1067* (2013.01); *C08J 3/24* (2013.01); *C08K 5/0025* (2013.01); *C08L 79/08* (2013.01); *C08L 83/06* (2013.01); *C09D 183/04* (2013.01); B01D 2256/245 (2013.01); B01D 2257/504 (2013.01); B01D 2258/025 (2013.01); B01D 2258/0233 (2013.01); B01D 2258/0283 (2013.01); B01D 2258/05 (2013.01); B01D 2323/30 (2013.01); B01D 2325/06 (2013.01); C08G 77/12 (2013.01); C08G 77/20 (2013.01); Y02C 20/20 (2013.01)

(58) Field of Classification Search
CPC ........ B01D 2256/245; B01D 2257/504; C08G 77/12; C08G 77/20; C08L 83/06; C08J 3/24

See application file for complete search history.

(56) References Cited

U.S. PATENT DOCUMENTS

| | | |
|---|---|---|
| 2014/0144323 A1 | 5/2014 | Chen et al. |
| 2015/0143995 A1 | 5/2015 | Umehara et al. |
| 2015/0165369 A1 | 6/2015 | Van Kessel et al. |
| 2015/0209733 A1 | 7/2015 | Umehara et al. |
| 2015/0298071 A1 | 10/2015 | Itoh et al. |
| 2015/0343389 A1 | 12/2015 | Umehara et al. |
| 2017/0296981 A1 | 10/2017 | Umehara et al. |

FOREIGN PATENT DOCUMENTS

| | | | |
|---|---|---|---|
| JP | H06269650 | 9/1994 | |
| JP | H09103663 | 4/1997 | |
| JP | 2007297605 | 11/2007 | |
| JP | 2008-55256 * | 3/2008 | ............. B01D 69/10 |
| JP | 2008055256 | 3/2008 | |
| JP | 2014176795 A | 9/2014 | |
| JP | 2015522410 | 8/2015 | |
| WO | WO 2014/001790 A1 * | 1/2014 | ............. B01D 53/22 |

OTHER PUBLICATIONS

Hideto Matsuyama et al. "Effect of plasma treatment on CO2 permeability and selectivity of poly(dimethylsiloxane) membrane," Journal of Membrane Science, vol. 99, Issue 2, Feb. 28, 1995, pp. 1-9.
"Office Action of Japan Counterpart Application," with machine English translation thereof, dated Aug. 21, 2018, p. 1-p. 9.
Hideto Matsuyama et al.,"Effect of plasma treatment on CO2 permeability and selectivity of poly (dimethylsiloxane) membrane",Journal of Membrane Science,vol. 99, Issue 2, Feb. 28, 1995, pp. 139-147.
"International Search Report (Form PCT/ISA/210)" of PCT/JP2016/071290, dated Sep. 13, 2016, with English translation thereof, pp. 1-6.
"Written Opinion of the International Searching Authority (Form PCT/ISA/237)" of PCT/JP2016/071290, dated Sep. 13, 2016, with English translation thereof, pp. 1-17.

* cited by examiner

METHOD FOR PRODUCING GAS SEPARATION COMPOSITE MEMBRANE, LIQUID COMPOSITION, GAS SEPARATION COMPOSITE MEMBRANE, GAS SEPARATION MODULE, GAS SEPARATION APPARATUS, AND GAS SEPARATION METHOD

CROSS-REFERENCE TO RELATED APPLICATIONS

This application is a Continuation of PCT International Application No. PCT/JP2016/71290, filed on Jul. 20, 2016, which claims priority under 35 U.S.C. § 119(a) to Japanese Patent Application No. 2015-170382, filed on Aug. 31, 2015. Each of the above application(s) is hereby expressly incorporated by reference, in its entirety, into the present application.

BACKGROUND OF THE INVENTION

1. Field of the Invention

The present invention relates to a method for producing a gas separation composite membrane and a liquid composition suitably used for the production method. The present invention also relates to a gas separation composite membrane and a gas separation module, a gas separation apparatus, and a gas separation method that use the gas separation composite membrane.

2. Description of the Related Art

Materials formed of polymer compounds or inorganic compounds each have gas permeability unique to the individual materials. On the basis of this property, selective permeation and separation of a desired gas component can be performed by using a membrane formed of a particular material. Regarding the industrial applications of such a gas separation membrane, in relation to the issues of global warming, separation and recovery of carbon dioxide from large-scale sources of carbon dioxide emission have been examined in thermal power plants, cement plants, blast furnaces in steel mills, and the like. Furthermore, this membrane separation technique has been attracting attention as means for solving environmental problems with relatively low energy.

In addition, natural gas and biogas (gas generated by fermentation or anaerobic digestion of excrement of organisms, organic fertilizers, biodegradable substances, sewage, garbage, and energy crops) are mixed gas mainly containing methane and carbon dioxide, and a membrane separation method has been examined as means for removing carbon dioxide and the like which are impurities (JP2007-297605A).

To more efficiently separate gas by the membrane separation method, gas separation composite membranes are required to have high gas permeability in addition to high gas separation selectivity. That is, gas separation composite membranes practically used need to have sufficient gas permeability with a thin gas separation layer.

To achieve this, a composite membrane separately including a material for a gas separation function and a material for mechanical strength has been known. This composite membrane has a structure in which a thin gas separation layer is formed on a gas permeable support having mechanical strength.

In the composite membrane, when a thin gas separation layer is formed on a porous support, a smooth layer for smoothening the surface of the porous support is normally disposed between the porous support and the gas separation layer. The smooth layer is generally formed by applying polydimethylsiloxane (PDMS) having high gas permeability onto a porous support to form a coating film and curing the coating film. However, since PDMS has a low surface free energy, PDMS readily infiltrates the porous support, which easily causes defects in a membrane to be obtained. On the other hand, if PDMS is thickly applied to prevent such defects in a membrane or phenyl-modified PDMS is used to improve the surface free energy of PDMS, the gas permeability deteriorates.

Another known technique of forming a polysiloxane compound layer on a porous support is, for example, a method in which PDMS is pre-crosslinked and then applied onto a porous support and the resulting film is cured (e.g., U.S. Pat. No. 5,286,280A).

SUMMARY OF THE INVENTION

It is an object of the present invention to provide a method for producing, at a high yield, a gas separation composite membrane having a polysiloxane compound layer on a porous support. The gas separation composite membrane has both high gas permeability and high gas separation selectivity, is not easily affected by plasticizing components such as toluene present in natural gas, leading to high durability, has good bending resistance, and can be processed into various modules. It is also an object of the present invention to provide a liquid composition suitable for forming the polysiloxane compound layer by this production method.

It is another object of the present invention to provide a gas separation composite membrane that has both high gas permeability and high gas separation selectivity, is not easily affected by plasticizing components such as toluene present in natural gas, leading to high durability, has good bending resistance, and can be processed into various modules, and to provide a gas separation module, a gas separation apparatus, and a gas separation method that use the gas separation composite membrane.

As a result of thorough studies conducted by the present inventors in view of the foregoing, they have found that a thin crosslinked polysiloxane compound layer having good smoothness can be formed at a high yield by applying a mixed liquid of a crosslinkable polysiloxane compound that has a vinyl group but does not have a hydrosilyl group and a crosslinkable polysiloxane compound that has a hydrosilyl group but does not have a vinyl group onto a porous support to form a coating film and curing the coating film. The present inventors have also found that the formed crosslinked polysiloxane compound layer has high gas permeability and high gas separation selectivity, is not easily plasticized even when exposed to toluene that is contained in natural gas and causes plasticization of membranes, and has high mechanical strength because film defects are not easily caused even when the crosslinked polysiloxane compound layer is bent.

The present invention has been further studied based on the above findings and has been completed.

That is, the above objects of the present invention have been achieved by the following means.

[1]

A method for producing a gas separation composite membrane includes applying a mixed liquid containing a crosslinkable polysiloxane compound (a) below and a crosslinkable polysiloxane compound (b) below onto a porous support to form a coating film and curing the coating film to form a crosslinked polysiloxane compound layer:

(a) a crosslinkable polysiloxane compound that has a structural unit represented by formula (a1) below, a structural unit represented by formula (a2) below, and at least one structural unit selected from the group consisting of a structural unit represented by formula (a3) below and a structural unit represented by formula (a4) below and that does not have a hydrosilyl group, and (b) a crosslinkable polysiloxane compound that has a structural unit represented by formula (b1) below, a structural unit represented by formula (b2) below, and at least one structural unit selected from the group consisting of a structural unit represented by formula (b3) below and a structural unit represented by formula (b4) below and that does not have a vinyl group.

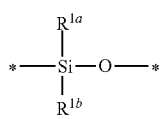

(a1)

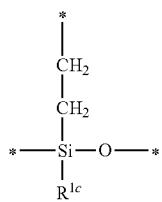

(a2)

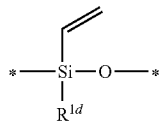

(a3)

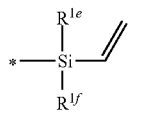

(a4)

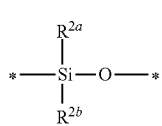

(b1)

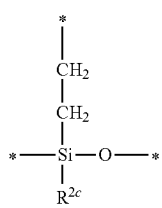

(b2)

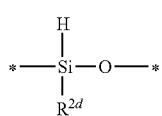

(b3)

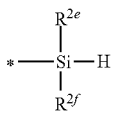

(b4)

In the formulae, $R^{1a}$ to $R^{1f}$ and $R^{2a}$ to $R^{2f}$ represent a substituent that is not reactive with a vinyl group or a hydrosilyl group and * represents a linking site, where a linking site * in *—Si— and —O—* is a linking site in a siloxane bond and a linking site * in —CH$_2$—CH$_2$—* is a linking site with a Si atom constituting a siloxane bond.

[2] In the method for producing a gas separation composite membrane according to [1], the crosslinkable polysiloxane compound (a) and the crosslinkable polysiloxane compound (b) are obtained by reacting a polysiloxane compound (c) below and a polysiloxane compound (d) below:

(c) a polysiloxane compound that has a structural unit represented by formula (c1) below and at least one structural unit selected from the group consisting of a structural unit represented by formula (c3) below and a structural unit represented by formula (c4) below, and (d) a polysiloxane compound that has a structural unit represented by formula (d1) below and at least one structural unit selected from the group consisting of a structural unit represented by formula (d3) below and a structural unit represented by formula (d4) below.

(c1)

(c3)

(c4)

(d1)

(d3)

(d4)

In the formulae, $R^{3a}$ to $R^{3e}$ and $R^{4a}$ to $R^{4e}$ represent a substituent that is not reactive with a vinyl group or a hydrosilyl group and * represents a linking site in a siloxane bond.

[3]

In the method for producing a gas separation composite membrane according to [1] or [2], the crosslinkable polysiloxane compound (a) and/or the crosslinkable polysiloxane compound (b) has a structural unit represented by formula (e1) below and/or a structural unit represented by formula (e2) below.

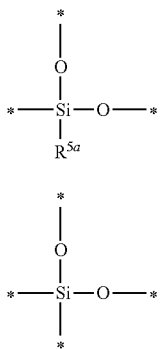

In the formulae, $R^{5a}$ represents a substituent that is not reactive with a vinyl group or a hydrosilyl group and * represents a linking site in a siloxane bond.

[4]

In the method for producing a gas separation composite membrane according to any one of [1] to [3], $R^{1a}$ to $R^{1f}$, $R^{2a}$ to $R^{2f}$, $R^{3a}$ to $R^{3e}$, $R^{4a}$ to $R^{4e}$, and $R^{5a}$ represent a non-aromatic substituent.

[5]

In the method for producing a gas separation composite membrane according to any one of [1] to [4], after the crosslinked polysiloxane compound layer is formed, a gas separation layer is formed on the crosslinked polysiloxane compound layer.

[6]

In the method for producing a gas separation composite membrane according to [5], after the crosslinked polysiloxane compound layer is formed and before the gas separation layer is formed, an oxygen atom is caused to permeate into the crosslinked polysiloxane compound layer.

[7]

In the method for producing a gas separation composite membrane according to [5] or [6], the gas separation layer is a layer having a polyimide compound.

[8]

A liquid composition contains a crosslinkable polysiloxane compound (a) below and a crosslinkable polysiloxane compound (b) below:

(a) a crosslinkable polysiloxane compound that has a structural unit represented by formula (a1) below, a structural unit represented by formula (a2) below, and at least one structural unit selected from the group consisting of a structural unit represented by formula (a3) below and a structural unit represented by formula (a4) below and that does not have a hydrosilyl group, and (b) a crosslinkable polysiloxane compound that has a structural unit represented by formula (b1) below, a structural unit represented by formula (b2) below, and at least one structural unit selected from the group consisting of a structural unit represented by formula (b3) below and a structural unit represented by formula (b4) below and that does not have a vinyl group.

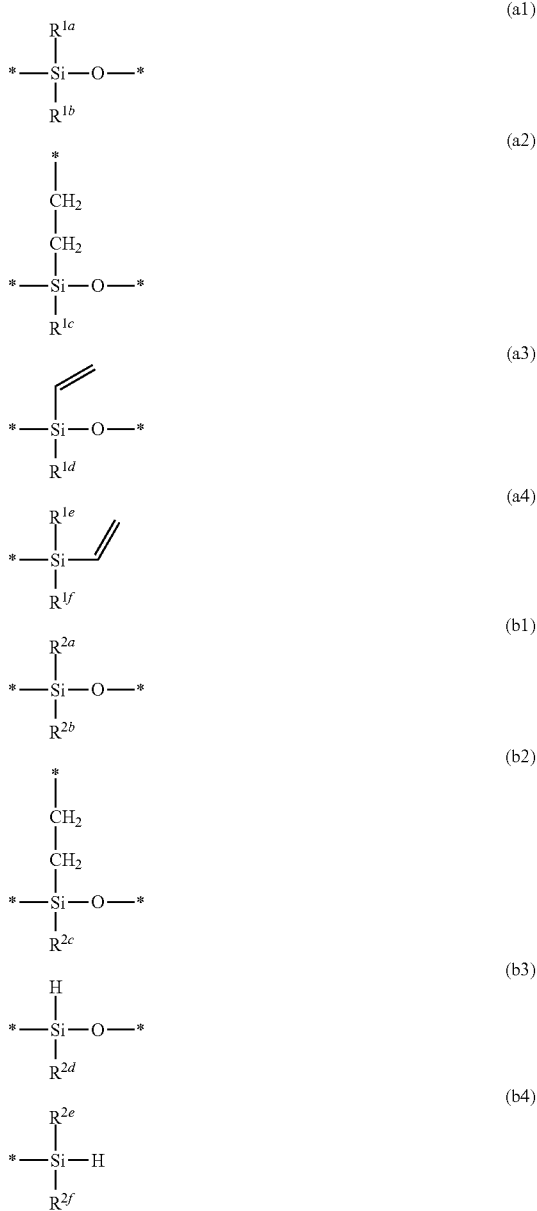

In the formulae, $R^{1a}$ to $R^{1f}$ and $R^{2a}$ to $R^{2f}$ represent a substituent that is not reactive with a vinyl group or a hydrosilyl group and * represents a linking site, where a linking site * in *—Si— and —O—* is a linking site in a siloxane bond and a linking site * in —CH$_2$—CH$_2$—* is a linking site with a Si atom constituting a siloxane bond.

[9]

In the liquid composition according to [8], a molar ratio of a total content β of a hydrosilyl group in the crosslinkable polysiloxane compound (b) to a total content α of a vinyl group in the crosslinkable polysiloxane compound (a) in the liquid composition is β/α=0.8 to 2.0.

[10]

In the liquid composition according to [8] or [9], $R^{1a}$ to $R^{1f}$ and $R^{2a}$ to $R^{2f}$ represent a non-aromatic substituent.

[11]

A gas separation composite membrane has a crosslinked polysiloxane compound layer on a porous support, wherein the crosslinked polysiloxane compound layer has a structural unit represented by formula (f1) below and a structural unit represented by formula (f2) below, and a Si ratio of the crosslinked polysiloxane compound layer before and after immersion in chloroform, the Si ratio being calculated from mathematical formula (I) below, is 0.65 to 1.00.

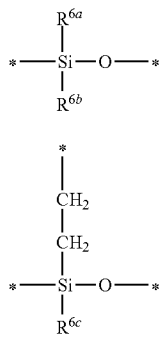

(f1)

(f2)

In the formulae, $R^{6a}$ to $R^{6c}$ represent a substituent that is not reactive with a vinyl group or a hydrosilyl group and * represents a linking site, where a linking site * in *—Si— and —O—* is a linking site in a siloxane bond and a linking site * in —CH$_2$—CH$_2$—* is a linking site with a Si atom constituting a siloxane bond.

Si ratio=(Si-KαX-ray intensity after immersion in chloroform)/(Si-KαX-ray intensity before immersion in chloroform)   Mathematical formula (I)

[12]

In the gas separation composite membrane according to [11], the crosslinked polysiloxane compound layer has a structural unit represented by formula (e1) below and/or a structural unit represented by formula (e2) below.

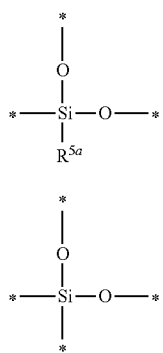

(e1)

(e2)

In the formulae, $R^{5a}$ represents a substituent and * represents a linking site in a siloxane bond.

[13]

In the gas separation composite membrane according to [11] or [12], the crosslinked polysiloxane compound layer has a hardness of 30 N/mm$^2$ or more.

[14]

In the gas separation composite membrane according to any one of [11] to [13], a volume swelling ratio obtained when the crosslinked polysiloxane compound layer is exposed to a toluene-saturated atmosphere for 10 minutes is 100% to 155%.

[15]

In the gas separation composite membrane according to any one of [11] to [14], a surface of the crosslinked polysiloxane compound layer has an arithmetical mean roughness of 100 nm or less.

[16]

In the gas separation composite membrane according to any one of [11] to [15], $R^{6a}$ to $R^{6c}$ and $R^{5a}$ represent a non-aromatic substituent.

[17]

In the gas separation composite membrane according to any one of [12] to [16], $R^{5a}$ represents a non-aromatic substituent.

[18]

The gas separation composite membrane according to any one of [11] to [17] has a gas separation layer on the crosslinked polysiloxane compound layer.

[19]

In the gas separation composite membrane according to [18], the gas separation layer contains a polyimide compound.

[20]

A gas separation module includes the gas separation composite membrane according to any one of [11] to [19].

[21]

A gas separation apparatus includes the gas separation module according to [20].

[22]

A gas separation method uses the gas separation composite membrane according to any one of [11] to [19].

[23]

The gas separation method according to [22] includes causing selective permeation of carbon dioxide from a gas including carbon dioxide and methane.

In this specification, when there are a plurality of substituents, a plurality of linking groups, or the like represented by a particular symbol (hereafter, referred to as "substituents or the like") or when a plurality of substituents or the like are simultaneously or alternatively defined, the substituents or the like may be the same or different. The same applies to the definition of the number of the substituents or the like. When a formula includes a plurality of repeating segment structures represented by the same expression, the segment structures or the repeating units may be the same or different. Furthermore, even if not specifically mentioned, when a plurality of substituents or the like are close (in particular, adjacent) to each other, they may be linked or fused to each other to form a ring.

In this specification, when compounds are shown, the compounds include the compounds themselves, salts thereof, and ions thereof. The compounds may be derivatives obtained by partly changing their structures as long as the desired effects are produced.

In this specification, substituents (the same applies to linking groups) in which substitution or no substitution is not specified may have any substituent as long as the desired effects are produced. The same applies to compounds in which substitution or no substitution is not specified.

In the method for producing a gas separation composite membrane according to the present invention, a gas separation composite membrane having a porous support and a crosslinked polysiloxane compound layer disposed on the porous support can be produced at a high yield (i.e., at a low sample error percentage). The gas separation composite membrane has both high gas permeability and high gas separation selectivity, is not easily affected by plasticizing components such as toluene present in natural gas, leading to high durability, has good bending resistance, and can be processed into various modules. The liquid composition according to the present invention can be suitably used for forming the above crosslinked polysiloxane compound layer.

The gas separation composite membrane according to the present invention has both high gas permeability and high gas separation selectivity, is not easily affected by plasticizing components such as toluene present in natural gas, leading to high durability, has good bending resistance, and can be processed into various modules. In the gas separation module, the gas separation apparatus, and the gas separation method according to the present invention, both high gas permeability and high gas separation selectivity can be achieved, the influence of plasticizing components such as toluene present in natural gas is small, and high gas separation performance can be sustained.

DESCRIPTION OF THE PREFERRED EMBODIMENTS

Method for Producing Gas Separation Composite Membrane

A method for producing a gas separation composite membrane according to the present invention (hereafter, also referred to as a production method according to the present invention) is a method for producing a gas separation composite membrane having a crosslinked polysiloxane compound layer on a gas permeable porous support. In the production method according to the present invention, the crosslinked polysiloxane compound layer is formed by applying a mixed liquid of at least two crosslinkable polysiloxane compounds each having a particular structure onto a porous support to form a coating film and curing the coating film.

A preferred embodiment of the production method according to the present invention will be described with reference to the attached drawings.

Figure 1:
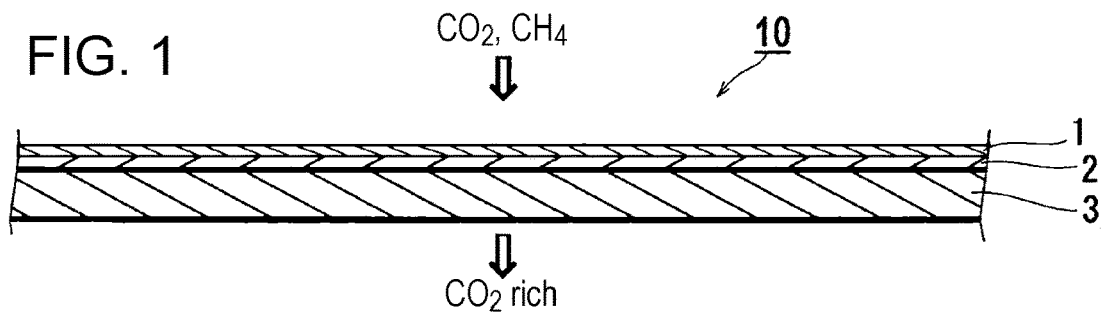
FIG. 1 is a sectional view schematically illustrating a preferred embodiment of a gas separation composite membrane according to the present invention.

FIG. 1 is a sectional view schematically illustrating a preferred embodiment of a gas separation composite membrane obtained by the production method according to the present invention. A gas separation composite membrane 10 has a crosslinked polysiloxane compound layer 2 and a porous support 3. In FIG. 1, the crosslinked polysiloxane compound layer 2 further has a gas separation layer 1 thereon.

Figure 2:
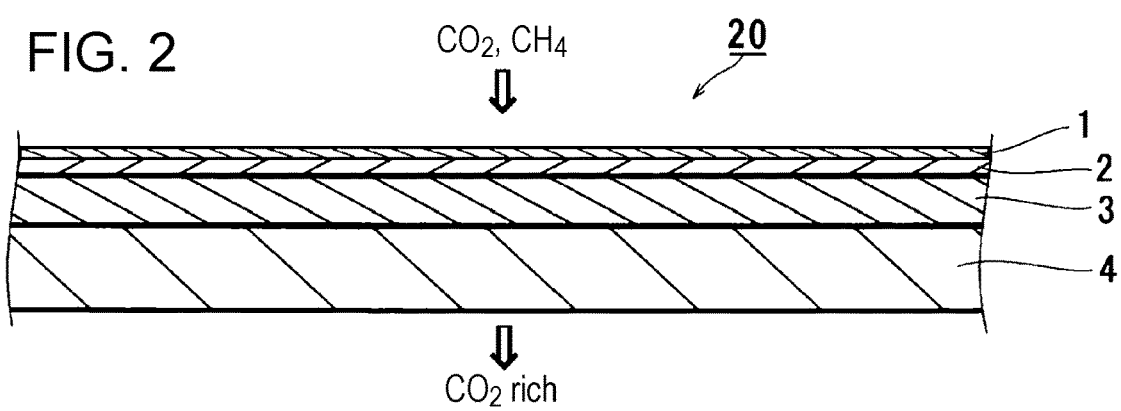
FIG. 2 is a sectional view schematically illustrating another preferred embodiment of a gas separation composite membrane according to the present invention.

FIG. 2 is a sectional view schematically illustrating another preferred embodiment of the gas separation composite membrane obtained by the production method according to the present invention. In this embodiment, in addition to the porous support 3 and the crosslinked polysiloxane compound layer 2, a gas separation composite membrane 20 has a gas separation layer 1 on the upper side of the crosslinked polysiloxane compound layer 2 and a nonwoven fabric layer 4 on the lower side of the porous support 3.

FIGS. 1 and 2 illustrate a state in which a carbon dioxide-rich permeated gas is generated by causing selective permeation of carbon dioxide from a mixture gas containing carbon dioxide and methane.

In this specification, regarding the expressions "upper side" and "lower side", the side to which a gas to be separated is supplied is defined to be the "upper side", and the side from which the separated gas is discharged is defined to be the "lower side".

In this specification, the phrase "having gas permeability" means that when carbon dioxide is supplied at a temperature of 40° C. at a total pressure of 4 MPa on the gas supply side, the permeation rate of the carbon dioxide is $1\times10^{-5}$ cm$^3$(STP)/cm$^2$·sec·cmHg (10 GPU) or more. The permeation rate of the carbon dioxide is preferably 30 GPU or more, more preferably 50 GPU or more, still more preferably 100 GPU or more, and further preferably 200 GPU or more.

Porous Support

In the production method according to the present invention, a porous support having gas permeability is used as a support. The porous support is not particularly limited as long as the porous support has gas permeability and imparts mechanical strength to the gas separation composite membrane, and may be formed of an organic or inorganic material. The porous support used in the present invention is preferably formed of an organic polymer material. Examples of the organic polymer material include publicly known polymers, for example, polyolefin resins such as polyethylene and polypropylene; fluorocarbon resins such as polytetrafluoroethylene, polyvinyl fluoride, and polyvinylidene fluoride; and various resins such as polystyrene, cellulose acetate, polyurethane, polyacrylonitrile, polyphenylene oxide, polysulfone, polyethersulfone, polyimide, and polyaramide. The porous support may have any shape such as a flat-plate shape, a spiral shape, a tubular shape, or a hollow-fiber shape.

The thickness of the porous support is 1 to 3000 μm, preferably 5 to 500 μm, and more preferably 5 to 150 μm. In this porous structure of the porous membrane, the average pore diameter is normally 10 μm or less, preferably 0.5 μm or less, and more preferably 0.2 μm or less. The porosity is preferably 20% to 90% and more preferably 30% to 80%.

In the production method according to the present invention, the porous support preferably includes a support formed on the lower side of the porous support to further increase the mechanical strength. Examples of the support include woven fabrics, nonwoven fabrics, and nets, and nonwoven fabric is suitably used from the viewpoint of membrane formability and cost. As the nonwoven fabric, fibers formed of polyester, polypropylene, polyacrylonitrile, polyethylene, polyamide, or the like may be used alone or in combination of two or more. The nonwoven fabric can be produced by, for example, papermaking main fibers and binder fibers that are uniformly dispersed in water with a cylinder machine, a Fourdrinier machine, or the like and drying the resulting product with a dryer. Furthermore, for the purpose of, for example, removing fuzz or improving mechanical properties, the nonwoven fabric is also preferably subjected to a thermal pressing process while being interposed between two rolls.

In the production method according to the present invention, a particular crosslinked polysiloxane compound layer is disposed on the porous support as a smooth layer or a gas separation layer. The formation of the crosslinked polysiloxane compound layer in the production method according to the present invention will be described.

Crosslinked Polysiloxane Compound Layer

In the production method according to the present invention, a mixed liquid (preferably a liquid composition) containing (a) a crosslinkable polysiloxane compound below (hereafter, also referred to as a crosslinkable polysiloxane compound (a)) and (b) a crosslinkable polysiloxane compound below (hereafter, also referred to as a crosslinkable polysiloxane compound (b)) is applied onto the porous support to form a coating film. Then, the coating film is cured to form the above-described crosslinked polysiloxane compound layer.

Crosslinkable Polysiloxane Compound (a)

The crosslinkable polysiloxane compound (a) is a polysiloxane compound having a crosslinked structure. The crosslinkable polysiloxane compound (a) has a structural unit represented by formula (a1) below (hereafter, also referred to as a structural unit (a1)), a structural unit represented by formula (a2) below (hereafter, also referred to as a structural unit (a2)), and at least one structural unit selected from the group consisting of a structural unit represented by formula (a3) below (hereafter, also referred to as a structural unit (a3)) and a structural unit represented by formula (a4) below (hereafter, also referred to as a structural unit (a4)) and does not have a hydrosilyl group.

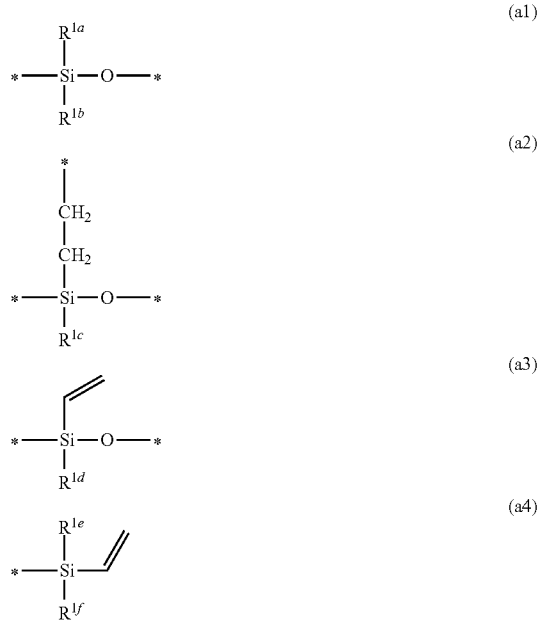

In the formulae (a1) to (a4), $R^{1a}$ to $R^{1f}$ represent a substituent that is not reactive with a vinyl group or a hydrosilyl group, and * represents a linking site. In this specification, the "substituent" excludes a hydrogen atom.

In this specification, a group (y1 group) that is not reactive with a certain group (x1 group) refers to a y1 group having a reaction characteristic in which when the x1 group and the y1 group are caused to react with each other in equimolar amounts at 20° C. for 1 hour in the presence of a 1 ppm zerovalent platinum catalyst, 97 mol % or more of the y1 group relative to 100 mol % of the whole y1 group reacted does not react with the x1 group. That is, the y1 group substantially does not react with the x1 group under the above reaction conditions and thus does not form a linked structure. In contrast, a group (y2 group) that is reactive with a certain group (x1 group) refers to a y2 group having a reaction characteristic in which when the x1 group and the y2 group are caused to react with each other in equimolar amounts at 20° C. for 1 hour in the presence of a 1 ppm zerovalent platinum catalyst, more than 3 mol % of the y2 group relative to 100 mol % of the whole y2 group reacted reacts with the x1 group. That is, the y2 group reacts with the x1 group under the above conditions to form a linked structure.

Among the above linking sites, the linking site * represented by *—Si— and —O—* is a linking site in a siloxane bond. That is, in *—Si—, an atom to which the linking site * bonds is an O atom. In —O—*, an atom to which the linking site * bonds is a Si atom. The linking site * represented by —CH$_2$—CH$_2$—* is a linking site with a Si atom constituting a siloxane bond. That is, in the above formula, the structure represented by —CH$_2$—CH$_2$— constitutes a bridged structure or a part of a bridged structure in the crosslinkable polysiloxane compound (a).

The crosslinkable polysiloxane compound (a) does not have a hydrosilyl group in its structure. Herein, the phrase "the crosslinkable polysiloxane compound (a) does not have a hydrosilyl group in its structure" means that a hydrosilyl group is not detected when the crosslinkable polysiloxane compound (a) is analyzed. More specifically, a deuterochloroform solution containing the crosslinkable polysiloxane compound (a) in a concentration of 1 mass % is prepared. When the solution is measured using 300 MHz $^1$H NMR 240 times, no peak is detected in the range of 4.3 to 4.9 ppm.

The crosslinkable polysiloxane compound (a) used in the present invention preferably does not have a group that is reactive with a vinyl group and does not have a group that is reactive with a hydrosilyl group except for a vinyl group in its structure. For example, the crosslinkable polysiloxane compound (a) preferably does not have an alkynyl group, an alkenyl group, a mercapto group, or an amino group. The presence or absence of such a group can also be determined by preparing a deuterochloroform solution containing the crosslinkable polysiloxane compound (a) in a concentration of 1 mass % and measuring the solution using 300 MHz $^1$H NMR 240 times. More specifically, in this measurement, when the molar quantity of a detection target group (i.e., a group that is reactive with a vinyl group or a group that is reactive with a hydrosilyl group except for a vinyl group) in the crosslinkable polysiloxane compound (a) is 3 or less relative to the molar quantity 100 of the vinyl group in the crosslinkable polysiloxane compound (a), the crosslinkable polysiloxane compound (a) is judged not to have the detection target group.

The substituent represented by $R^{1a}$ to $R^{1f}$ is a group that is not reactive with a vinyl group or a hydrosilyl group among groups selected from the substituent group Z described later. In particular, the substituent is preferably an alkyl group or an aryl group.

The number of carbon atoms of the alkyl group represented by $R^{1a}$ to $R^{1f}$ is preferably 1 to 18, more preferably 1 to 12, and further preferably 1 to 6. Specifically, the alkyl group represented by $R^{1a}$ to $R^{1f}$ is preferably methyl, ethyl, or trifluoropropyl and more preferably methyl.

The number of carbon atoms of the aryl group is preferably 6 to 15, more preferably 6 to 12, and further preferably 6 to 8.

$R^{1a}$ to $R^{1f}$ each more preferably represent a non-aromatic substituent. The non-aromatic substituent is, for example, the above-described alkyl group.

The crosslinkable polysiloxane compound (a) has two or more vinyl groups in a single molecule thereof and thus is cured through the reaction with the crosslinkable polysiloxane compound (b).

When the total molar quantity of the structural units (a1) to (a4) in the crosslinkable polysiloxane compound (a) is assumed to be 100, the molar quantity of the structural unit (a2) is preferably 0.1 to 2.0 and more preferably 0.3 to 1.5.

When the total molar quantity of the structural units (a1) to (a4) in the crosslinkable polysiloxane compound (a) is assumed to be 100, the total molar quantity of the structural units (a3) and (a4) is preferably 0.1 or more, more preferably 0.3 or more, and further preferably 0.3 to 2.0.

The molar quantity of each structural unit constituting the polysiloxane compound can be simply determined from the ratio of the substituents, the ratio being obtained by performing 300 MHz 1H NMR measurement 240 times. More strictly, the polysiloxane compound is hydrolyzed in a 50 wt % aqueous sodium hydroxide solution to obtain a siloxane compound, and the obtained siloxane compound is analyzed by using HPLC.

The total content of the structural units (a1) to (a4) in the crosslinkable polysiloxane compound (a) is preferably 45 to 100 mass % and more preferably 80 to 95 mass %.

Crosslinkable Polysiloxane Compound (b)

The crosslinkable polysiloxane compound (b) is a polysiloxane compound having a crosslinked structure. The crosslinkable polysiloxane compound (b) has a structural unit represented by formula (b1) below (hereafter, also referred to as a structural unit (b1)), a structural unit represented by formula (b2) below (hereafter, also referred to as a structural unit (b2)), and at least one structural unit selected from the group consisting of a structural unit represented by formula (b3) below (hereafter, also referred to as a structural unit (b3)) and a structural unit represented by formula (b4) below (hereafter, also referred to as a structural unit (b4)) and does not have a vinyl group.

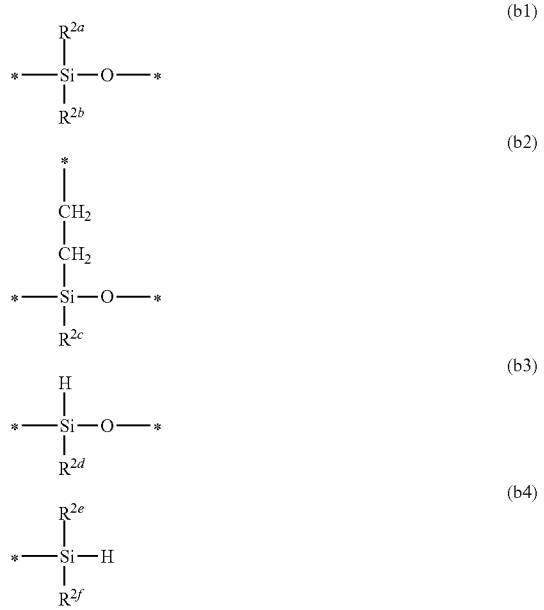

In the formulae (b1) to (b4), $R^{2a}$ to $R^{2f}$ have the same meaning as $R^{1a}$ to $R^{1f}$, the preferred forms of $R^{2a}$ to $R^{2f}$ are the same as those of $R^{1a}$ to $R^{1f}$, and * represents a linking site.

Among the above linking sites, the linking site * represented by *—Si— and —O—* is a linking site in a siloxane bond. That is, in *—Si—, an atom to which the linking site * bonds is an O atom. In —O—*, an atom to which the linking site * bonds is a Si atom. The linking site * represented by —CH$_2$—CH$_2$—* is a linking site with a Si atom constituting a siloxane bond. That is, in the above formula, the structure represented by —CH$_2$—CH$_2$— constitutes a bridged structure or a part of a bridged structure in the crosslinkable polysiloxane compound (b).

The crosslinkable polysiloxane compound (b) does not have a vinyl group in its structure. Herein, the phrase "the crosslinkable polysiloxane compound (b) does not have a vinyl group in its structure" means that a vinyl group is not detected when the crosslinkable polysiloxane compound (b) is analyzed. More specifically, a deuterochloroform solution containing the crosslinkable polysiloxane compound (b) in a concentration of 1 mass % is prepared. When the solution is measured using 300 MHz $^1$H NMR 240 times, no peak is detected in the range of 5.5 to 6.2 ppm.

The crosslinkable polysiloxane compound (b) of the present invention preferably does not have a group that is reactive with a hydrosilyl group and does not have a group that is reactive with a vinyl group except for a hydrosilyl group in its structure. For example, the crosslinkable polysiloxane compound (b) preferably does not have a mercapto group and a hydroperoxide group. The presence or absence of such a group can also be determined by preparing a deuterochloroform solution containing the crosslinkable polysiloxane compound (b) in a concentration of 1 mass % and measuring the solution using 300 MHz $^1$H NMR 240 times. More specifically, in this measurement, when the molar quantity of a detection target group (i.e., a group that is reactive with a hydrosilyl group or a group that is reactive with a vinyl group except for a hydrosilyl group) in the crosslinkable polysiloxane compound (b) is 3 or less relative to the molar quantity 100 of the hydrosilyl group in the crosslinkable polysiloxane compound (b), the crosslinkable polysiloxane compound (b) is judged not to have the detection target group.

The crosslinkable polysiloxane compound (b) has two or more hydrosilyl groups in a single molecule thereof and thus is cured through the reaction with the crosslinkable polysiloxane compound (a).

When the total molar quantity of the structural units (b1) to (b4) in the crosslinkable polysiloxane compound (b) is assumed to be 100, the molar quantity of the structural unit (b2) is preferably 0.1 to 2.0 and more preferably 0.3 to 1.5.

When the total molar quantity of the structural units (b1) to (b4) in the crosslinkable polysiloxane compound (b) is assumed to be 100, the total molar quantity of the structural units (b3) and (b4) is preferably 0.1 or more, more preferably 0.5 or more, still more preferably 1.0 or more, and further preferably 1.0 to 20.0.

The total content of the structural units (b1) to (b4) in the crosslinkable polysiloxane compound (b) is preferably 45 to 100 mass % and more preferably 80 to 95 mass %.

The crosslinkable polysiloxane compound (a) and/or the crosslinkable polysiloxane compound (b) also preferably has a structural unit represented by formula (e1) below (hereafter, also referred to as a structural unit (e1)) and/or a structural unit represented by formula (e2) below (hereafter, also referred to as a structural unit (e2)).

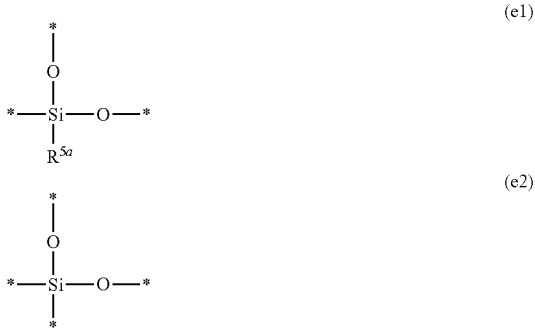

In the formula (e1), $R^{5a}$ has the same meaning as $R^{1a}$, and the preferred forms of $R^{5a}$ are also the same as those of $R^{1a}$. In the formulae (e1) and (e2), * represents a linking site in a siloxane bond. The structural unit (e1) is a so-called T component (T unit) and the structural unit (e2) is a so-called Q component (Q unit).

The total molar quantity of the structural unit (e1) and the structural unit (e2) is preferably 0 to 55 and more preferably 5 to 20 relative to the total molar quantity 100 of the structural units (a1) to (a4) in the crosslinkable polysiloxane compound (a).

The total molar quantity of the structural unit (e1) and the structural unit (e2) is preferably 0 to 55 and more preferably 5 to 20 relative to the total molar quantity 100 of the structural units (b1) to (b4) in the crosslinkable polysiloxane compound (b).

The weight-average molecular weight of the crosslinkable polysiloxane compound (a) is preferably 50,000 to 10,000,000 and more preferably 100,000 to 5,000,000.

The weight-average molecular weight of the crosslinkable polysiloxane compound (b) is preferably 50,000 to 10,000,000 and more preferably 100,000 to 5,000,000.

When the weight-average molecular weight of the crosslinkable polysiloxane compound used is within the above preferred range, a polysiloxane compound layer can be smoothly formed while the infiltration of the polysiloxane into a porous material is suppressed.

In this specification, the molecular weight and the dispersity are measured by GPC (gel permeation chromatography) unless otherwise specified, and the molecular weight is a weight-average molecular weight in terms of polystyrene. The gel filling a column used in GPC is preferably a gel including an aromatic compound as a repeating unit and is, for example, a gel formed of a styrene-divinylbenzene copolymer. Two to six columns are preferably connected and used. Examples of a solvent used include hydrocarbon solvents such as toluene, ether solvents such as tetrahydrofuran, and amide solvents such as N-methylpyrrolidinone. In the measurement, the flow velocity of the solvent is preferably in the range of 0.1 to 2 mL/min and most preferably in the range of 0.5 to 1.5 mL/min. When the measurement is performed within the above range, the measurement can be further efficiently performed without applying load to the instrument. The measurement temperature is preferably 10° C. to 50° C. and most preferably 20° C. to 40° C. The column and carrier used can be appropriately selected in accordance with the physical properties of a polymer compound to be measured.

Preparation of Crosslinkable Polysiloxane Compounds (a) and (b)

The crosslinkable polysiloxane compounds (a) and (b) are prepared by any method and, for example, can be prepared by reacting a polysiloxane compound represented by (c) below (hereafter, referred to as a polysiloxane compound (c)) and a polysiloxane compound represented by (d) below (hereafter, referred to as a polysiloxane compound (d)).

The polysiloxane compound (c) has a structural unit represented by formula (c1) below (hereafter, referred to as a structural unit (c1)) and at least one structural unit selected from the group consisting of a structural unit represented by formula (c3) below (hereafter, referred to as a structural unit (c3)) and a structural unit represented by formula (c4) below (hereafter, referred to as a structural unit (c4)).

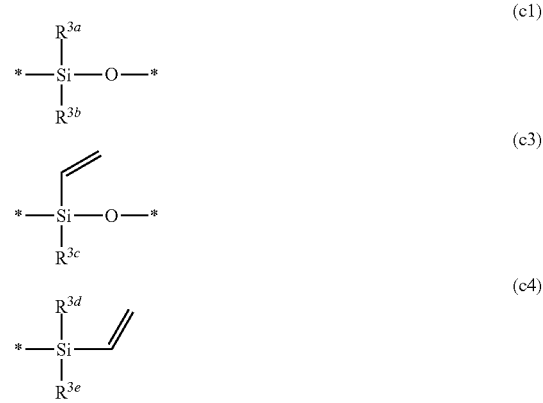

The polysiloxane compound (d) has a structural unit represented by formula (d1) below and at least one structural unit selected from the group consisting of a structural unit represented by formula (d3) below and a structural unit represented by formula (d4) below.

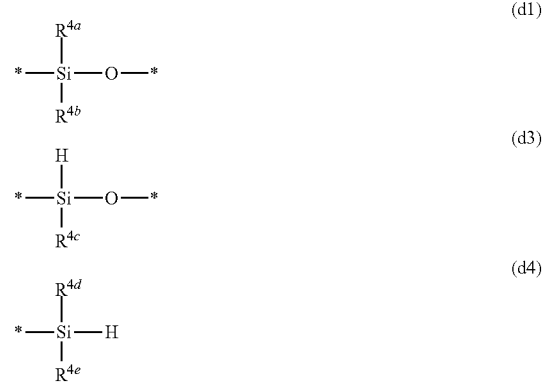

In the above formulae, $R^{3a}$ to $R^{3e}$ and $R^{4a}$ to $R^{4e}$ each have the same meaning as $R^{1a}$, the preferred ranges of $R^{3a}$ to $R^{3e}$ and $R^{4a}$ to $R^{4e}$ are also the same as that of $R^{1a}$, and * represents a linking site in a siloxane bond.

The polysiloxane compounds (c) and (d) are reacted with each other such that the amount of the polysiloxane compound (c) is excessively larger than that of the polysiloxane compound (d). Thus, the crosslinkable polysiloxane compound (a) can be obtained. This reaction is a hydrosilylation reaction described below and can be caused to efficiently proceed by applying heat in the presence of a particular catalyst such as a platinum catalyst. The structural unit (a2) in the crosslinkable polysiloxane compound (a) is formed by reacting and linking a vinyl group in the structural unit (c3) and a hydrosilyl group in the structural unit (d3) or (d4).

On the other hand, the polysiloxane compounds (c) and (d) are reacted with each other such that the amount of the polysiloxane compound (d) is excessively larger than that of the polysiloxane compound (c). Thus, the crosslinkable polysiloxane compound (b) can be obtained. The structural unit (b2) in the crosslinkable polysiloxane compound (b) is formed by reacting and linking a hydrosilyl group in the structural unit (d3) and a vinyl group in the structural unit (c3) or (c4).

The mixing ratio in the reaction of the polysiloxane compounds (c) and (d) is appropriately adjusted in accordance with the structures (the amounts of functional groups) of intended crosslinkable polysiloxane compounds (a) and (b).

When the intended crosslinkable polysiloxane compound has the above structural unit (e1) or (e2), the polysiloxane compounds (c) and/or (d) also have the above structural unit (e1) or (e2) accordingly.

The weight-average molecular weight of the polysiloxane compound (c) is preferably 50,000 to 10,000,000 and more preferably 100,000 to 5,000,000.

The weight-average molecular weight of the polysiloxane compound (d) is preferably 50,000 to 10,000,000 and more preferably 100,000 to 5,000,000.

Formation of Crosslinked Polysiloxane Compound Layer

Next, a method for forming a crosslinked polysiloxane compound layer on a porous support will be described.

In the production method according to the present invention, the crosslinkable polysiloxane compounds (a) and (b) are mixed with each other in a liquid to prepare a mixed liquid, and the resulting mixed liquid is applied onto a porous support. Herein, preferably, the crosslinkable polysiloxane compounds (a) and (b) are dissolved in an appropriate organic solvent to prepare a homogeneous liquid composition, and the liquid composition is applied onto a porous support. As a result, a coating film is formed on the porous support.

The organic solvent used for the preparation of the mixed liquid is not particularly limited as long as the crosslinkable polysiloxane compounds (a) and (b) can be dissolved in the organic solvent, and may be, for example, hexane, heptane, octane, benzene, toluene, or xylene.

The total content of the crosslinkable polysiloxane compounds (a) and (b) in the mixed liquid is preferably 3 to 30 mass % and more preferably 5 to 20 mass % from the viewpoint of smoothness and film thickness.

The viscosity of the mixed liquid is preferably 1 to 30 mPa·sec and more preferably 2 to 10 mPa·sec. In this specification, the viscosity is measured using a vibration-type viscometer (trade name: VM-10A-L, manufactured by SEKONIC Corporation) at 25° C. at 60 rpm for a measurement time of 60 seconds.

The molar ratio $\beta/\alpha$ of the total content $\beta$ of the hydrosilyl group to the total content $\alpha$ of the vinyl group in the mixed liquid (preferably the liquid composition, the same applies hereafter) that is used for the formation of the crosslinked polysiloxane compound layer and contains the crosslinkable polysiloxane compound (a) and the crosslinkable polysiloxane compound (b) is preferably 0.8 to 2.0, more preferably 1.3 to 1.9, and further preferably 1.5 to 1.9. When the ratio $\beta/\alpha$ is within the above preferred range, the curing reaction of a polysiloxane layer can be caused to efficiently proceed, which can provide a membrane having higher gas permeability and durability.

The molar quantity of each of the hydrosilyl group and the vinyl group in the mixed liquid can be determined by detecting a hydrosilyl group and a vinyl group by the above-described method using 1H NMR and calculating the ratio of the hydrosilyl group and the vinyl group.

The mixed liquid (coating liquid) containing the crosslinkable polysiloxane compound (a) and the crosslinkable polysiloxane compound (b) and used for the formation of the crosslinked polysiloxane compound layer is normally applied onto the porous support at a temperature of 10° C. to 35° C.

The coating method is not particularly limited and may be a publicly known method such as spin coating, extrusion die coating, blade coating, bar coating, screen printing, stencil printing, roll coating, curtain coating, spray coating, dip coating, inkjet printing, or dipping. In particular, for example, spin coating, screen printing, and dipping are preferred.

Subsequently, the coating film formed on the porous support is cured. This curing reaction is a hydrosilylation reaction (addition curing reaction) between a vinyl group of the crosslinkable polysiloxane compound (a) and a hydrosilyl group of the crosslinkable polysiloxane compound (b). This reaction can be caused by a typical method and, for example, efficiently proceeds through application of heat in the presence of a platinum catalyst. The reaction temperature of the hydrosilylation reaction is preferably 50° C. to 150° C. The reaction time is appropriately adjusted in accordance with the intended curing level. Normally, the reaction is caused to proceed for 0.5 to 10 hours to obtain a cured film having a strength sufficient for gas separation.

The thickness of the crosslinked polysiloxane compound layer obtained through the curing reaction is preferably 0.1 to 3 μm and more preferably 0.3 to 2 μm from the viewpoint of permeability and smoothness.

The hardness of the crosslinked polysiloxane compound layer obtained through the curing reaction is preferably 30 N/mm$^2$ or more and more preferably 50 N/mm$^2$ or more. The actual upper limit is 500 N/mm$^2$ or less.

The hardness is a hardness of the crosslinked polysiloxane compound layer measured when a pressure of 0.05 mN is applied using a PICODENTOR HM500 hardness tester (manufactured by FISCHER, Berkovich indenter) as described in Examples below. The measurement of the hardness is performed on a surface of the crosslinked polysiloxane compound layer opposite to the porous support.

When the crosslinked polysiloxane compound layer obtained through the curing reaction is exposed to a toluene-saturated atmosphere for 10 minutes, the volume swelling ratio is preferably 100% to 155% and more preferably 100% to 115%. The volume swelling ratio is measured by a method described in Examples below.

In the present invention, the phrase "the volume swelling ratio obtained when the crosslinked polysiloxane compound layer is exposed to a toluene-saturated atmosphere for 10 minutes is 100%" means that the crosslinked polysiloxane compound layer does not swell (change) even if exposed to a toluene-saturated atmosphere.

Through the above curing reaction, the surface of the crosslinked polysiloxane compound layer obtained (the surface of the crosslinked polysiloxane compound layer opposite to the porous support) can be highly smoothened compared with smooth layers of known gas separation composite membranes. The arithmetical mean roughness Ra of the surface of the crosslinked polysiloxane compound layer obtained through the curing reaction is preferably 80 nm or less and more preferably 60 nm or less. The arithmetical mean roughness Ra is measured by a method described in Examples below.

In the crosslinked polysiloxane compound layer obtained through the curing reaction, the Si ratio before and after immersion of the crosslinked polysiloxane compound layer in chloroform, the Si ratio being calculated from mathematical formula (I) below, is preferably in the range of 0.65 to 1.00.

Si ratio=(Si-KαX-ray intensity after immersion in chloroform)/(Si-KαX-ray intensity before immersion in chloroform)　　Mathematical formula (I)

The Si ratio is determined by immersing the siloxane compound layer in chloroform at 25° C. for 12 hours, irradiating the surfaces of the siloxane compound layers before and after the immersion with X-rays, and measuring the intensity of Si-Kα X-rays (1.74 keV). A method for measuring the Si-Kα X-ray intensity is described in, for example, JP1994-88792 (JP-H6-88792). If the Si-Kα X-ray intensity after the immersion in chloroform is lower than that before the immersion, low-molecular-weight components are present and leaches out. Therefore, a lower degree of the decrease in the Si-Kα X-ray intensity after the immersion in chloroform means that the molecular weight of a polymer constituting the siloxane compound layer increases and thus the polymer does not easily leach into chloroform.

When the Si ratio of the siloxane compound layer is in the range of 0.65 to 1.0, a siloxane compound can be made present in a layer at a high density and in a homogeneous manner, which can effectively prevent membrane defects and can further improve the gas separation performance. In addition, the membrane can be used under high-pressure, high-temperature, and high-humidity conditions and plasticization of the gas separation layer due to impurity components such as toluene can be further suppressed.

The Si ratio of the siloxane compound layer in the present invention is preferably 0.75 to 1.0 and more preferably 0.85 to 1.0.

Gas Separation Layer

The formed crosslinked polysiloxane compound layer itself can function as a gas separation layer. This form is a form in which the gas separation layer 1 is not disposed in FIG. 1, and the crosslinked polysiloxane compound layer 2 functions as a gas separation layer.

To obtain a gas separation composite membrane having higher gas separation performance, normally, the crosslinked polysiloxane compound layer is used as a smooth layer and a gas separation layer is separately disposed on the crosslinked polysiloxane compound layer. In this case, oxygen is preferably caused to permeate into the crosslinked polysiloxane compound layer from the viewpoint of further improving adhesiveness with the gas separation layer. Specific examples of this treatment include oxygen plasma treatment and UV-ozone treatment.

The oxygen plasma treatment can be performed by a typical method and is preferably performed using a vacuum plasma apparatus.

The flow rate of oxygen is preferably 10 to 500 cm$^3$ (STP)/min, and the flow rate of argon is preferably 20 to 1000 cm$^3$ (STP)/min.

The degree of vacuum is preferably 0 to 100 Pa, the input power is preferably 10 to 200 W, and the treatment time is preferably 5 to 20 seconds.

Specifically, the treatment can be performed, for example, under conditions described in Examples.

The UV-ozone treatment can be performed by a typical method and is preferably performed using a UV-ozone apparatus.

The UV light source is preferably a low-pressure mercury lamp. The distance between the light source and a sample is preferably 5 to 20 cm. The UV intensity is preferably 10 to 10000 J/cm$^2$. The treatment time is preferably 10 seconds to 10 minutes.

A gas separation layer separately disposed on the crosslinked polysiloxane compound layer (hereafter, simply referred to as a "gas separation layer") will be described below.

The gas separation layer may be formed of an inorganic material or an organic polymer material (polymer).

Gas Separation Layer Formed of Inorganic Material

Examples of the inorganic material used for the gas separation layer include silica, alumina, titania, zirconia, and palladium. Regarding the method for forming a gas separation layer formed of an inorganic material, for example, see "Membrane Experimentation, Artificial Membrane, First Edition, Second Printing" prepared under the supervision of The Membrane Society of Japan, CD-ROM making: HOTEC, May 12, 2008, pp. 55 to 99.

Gas Separation Layer Formed of Polymer

Examples of the polymer used for the gas separation layer include polyimide compounds, polybenzoxazole compounds, polyethersulfone compounds, polyetherketone compounds, polycarbonate compounds, polysulfone compounds, polystyrene compounds, polyaniline compounds, PIM (polymer of intrinsic microporosity) compounds, alkyl celluloses, and cellulose acetate. The gas separation layer can be formed using at least one selected from the group consisting of the above polymers. In particular, from the viewpoint of gas separation performance, polyimide compounds, polyetherketone compounds, polycarbonate compounds, and cellulose acetate are preferably used; polyimide compounds and cellulose acetate are more preferably used; and polyimide compounds are further preferably used.

The polymer constituting the gas separation layer preferably has a ring structure, more preferably has an aromatic ring, and further preferably has a benzene ring from the viewpoint of high gas permeability. The aromatic ring may have a monocyclic structure or a polycyclic structure.

From the viewpoint of stable performance of separation membranes, the proportion of a benzene ring in the polymer is preferably 20 to 75 mass % and more preferably 30 to 60 mass %.

Herein, the proportion of a benzene ring in the polymer refers to the total proportion of carbon atoms and hydrogen atoms of the benzene ring in the polymer on a mass basis. In the case where the benzene ring has a substituent on its carbon atom constituting the ring, the proportion refers to a proportion of a structure excluding the substituent.

For example, in the case where the benzene ring is present in the form of phenylene in the polymer, the mass of the single benzene ring corresponds to that of $C_6H_4$.

For example, in the case where the benzene ring is present in the form of a phenylene having one substituent on its carbon atom constituting the ring, the mass of the single benzene ring corresponds to that of $C_6H_3$.

For example, in the case where the benzene ring is present in the form of a divalent linking group obtained by removing two hydrogen atoms from a naphthalene ring (a divalent group constituted by two benzene rings), the mass of the benzene rings in the divalent linking group corresponds to that of $C_{10}H_6$.

For example, in the case where the benzene ring is present in the form of a divalent linking group obtained by removing one hydrogen atom on the benzene ring and one hydrogen atom on an oxazole ring from a benzoxazole ring, the mass of the benzene ring in the divalent linking group corresponds to that of $C_6H_3$.

A preferred embodiment of the polyimide compound used for the gas separation layer will be described below.

The polyimide compound used for the gas separation layer preferably includes at least one of structural units represented by formula (I) below and at least one selected from the group consisting of structural units represented by formulae (II-a), (II-b), (III-a), and (III-b) below. The polyimide compound more preferably includes at least one of structural units represented by formula (I), at least one of structural units represented by formulae (II-a) and (II-b), and at least one of structural units represented by formulae (III-a) and (III-b). The structural units are linked to each other through an imide bond.

The polyimide compound used for the gas separation layer may include a structural unit other than the above-described structural units. When the total number of moles of the repeating units represented by the above formulae is assumed to be 100, the number of moles of the structural unit is preferably 20 or less and more preferably 0 to 10. The polyimide compound used in the present invention particularly preferably includes only the repeating units represented by the above formulae.

Formula (I)

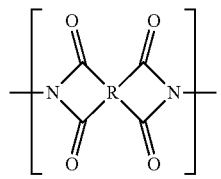

In the formula (I), R represents a group having a structure represented by any one of formulae (I-1) to (I-28) below. Herein, * represents a bonding site with a carbonyl group in the formula (I). R preferably represents a group having a structure represented by the formula (I-1), (I-2), or (I-4), more preferably represents a group having a structure represented by the formula (I-1) or (I-4), and particularly preferably represents a group having a structure represented by the formula (I-1).

(I-1)

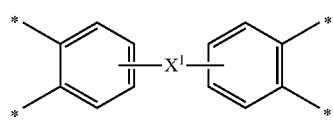

(I-2)

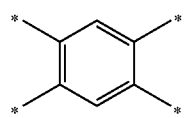

-continued (I-3)

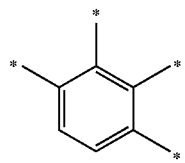

(I-4)

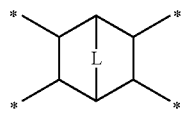

(I-5)

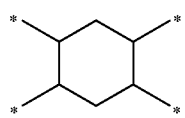

(I-6)

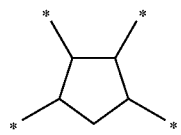

(I-7)

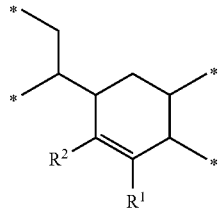

(I-8)

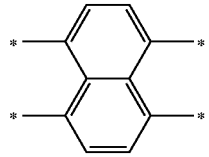

(I-9)

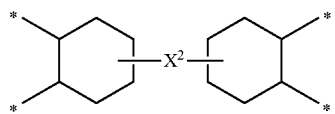

(I-10)

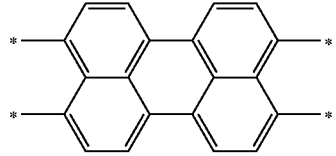

(I-11)

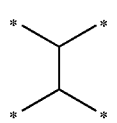

(I-12)

(I-13) 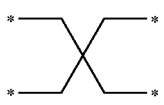

(I-14) 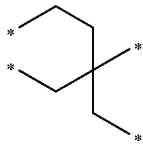

(I-15) 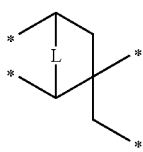

(I-16) 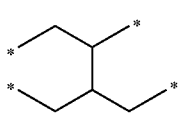

(I-17) 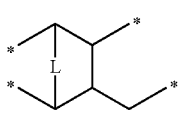

(I-18) 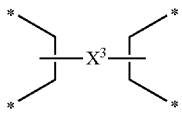

(I-19) 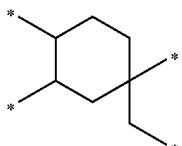

(I-20) 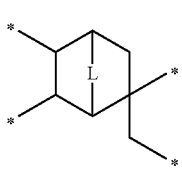

(I-21) 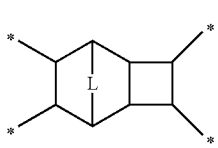

(I-22) 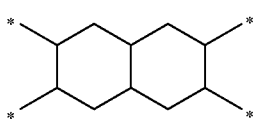

(I-23) 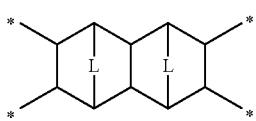

(I-24) 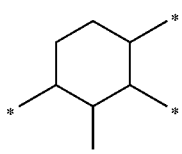

(I-25) 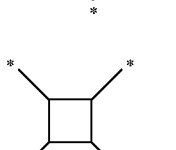

(I-26) 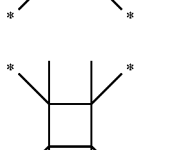

(I-27) 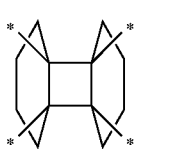

(I-28) 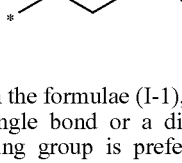

In the formulae (I-1), (I-9), and (I-18), $X^1$ to $X^3$ represent a single bond or a divalent linking group. The divalent linking group is preferably —C($R^x$)$_2$— ($R^x$ represents a hydrogen atom or a substituent. When $R^x$ represents a substituent, $R^x$ may be linked to each other to form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), —C$_6$H$_4$— (phenylene group), or a combination of the foregoing and more preferably a single bond or —C($R^x$)$_2$—. When $R^x$ represents a substituent, the substituent is specifically selected from the substituent group Z described below. In particular, the substituent is preferably an alkyl group (the preferred list is the same as that of the alkyl group in the substituent group Z described below), more preferably an alkyl group having a halogen atom as a substituent, and particularly preferably trifluoromethyl. In this specification, when "substituents may be linked to each other to form a ring", the substituents may bond to each other through a single bond, a double bond, or the like to form a ring or may be subjected to condensation to form a condensed ring. In the formula (I-18), $X^3$ links to one of two carbon atoms illustrated on the left side and one of two carbon atoms illustrated on the right side.

In the formulae (I-4), (I-15), (I-17), (I-20), (I-21), and (I-23), L represents —CH=CH— or —CH$_2$—.

In the formula (I-7), $R^1$ and $R^2$ represent a hydrogen atom or a substituent. The substituent is selected from the substituent group Z described below. $R^1$ and $R^2$ may bond to each other to form a ring.

$R^1$ and $R^2$ preferably represent a hydrogen atom or an alkyl group, more preferably represent a hydrogen atom, a methyl group, or an ethyl group, and further preferably represent a hydrogen atom.

The carbon atoms in the structures represented by the formulae (I-1) to (I-28) may further have a substituent. The substituent is specifically selected from the substituent group Z described below. In particular, an alkyl group or an aryl group is preferred.

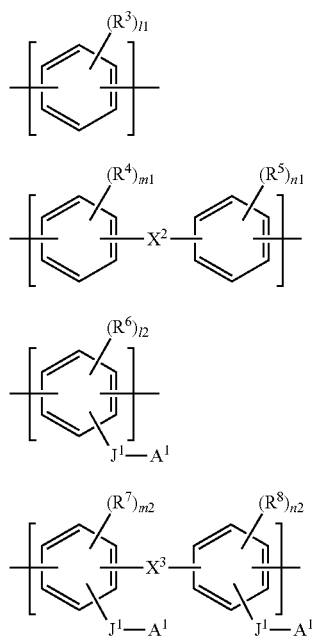

Formula (II-a)

Formula (II-b)

Formula (III-a)

Formula (III-b)

In the formulae (II-b) and (III-b), $X^2$ and $X^3$ each have the same meaning as $X^1$ described in the formula (I-1), and the preferred forms of $X^2$ and $X^3$ are also the same as that of $X^1$.

$R^3$ represents an alkyl group or a halogen atom. Preferred examples of the alkyl group and the halogen atom are the same as those of the alkyl group and the halogen atom specified in the substituent group Z described below. The number of $R^3$, l1, is an integer of 0 to 4, preferably 1 to 4, and more preferably 3 and 4. $R^3$ preferably represents an alkyl group, more preferably represents a methyl group or an ethyl group, and further preferably represents a methyl group.

$R^4$ and $R^5$ represent an alkyl group or a halogen atom or represent groups that are linked to each other to form a ring together with $X^2$. Preferred examples of the alkyl group and the halogen atom are the same as those of the alkyl group and the halogen atom specified in the substituent group Z described below. A structure obtained by linking $R^4$ and $R^5$ is not particularly limited, but the structure is preferably a single bond, —O—, or —S—. The numbers of $R^4$ and $R^5$, m1 and n1, are an integer of 0 to 4, preferably 1 to 4, and more preferably 3 and 4.

When $R^4$ and $R^5$ represent an alkyl group, the alkyl group is preferably a methyl group, an ethyl group, or trifluoromethyl.

$R^6$, $R^7$, and $R^8$ represent a substituent. $R^7$ and $R^8$ may bond to each other to form a ring, and l2, m2, and n2 represent an integer of 0 to 4, preferably represent 0 to 2, and more preferably represent 0 and 1.

$J^1$ represents a single bond or a divalent linking group. The linking group is *—COO⁻N⁺$R^b R^c R^d$—** ($R^b$ to $R^d$ represent a hydrogen atom, an alkyl group, or an aryl group, and the preferred examples thereof are the same as those described in the substituent group Z), *—SO₃⁻N⁺$R^e R^f R^g$—** ($R^e$ to $R^g$ represent a hydrogen atom, an alkyl group, or an aryl group, and the preferred examples thereof are the same as those described in the substituent group Z), an alkylene group (preferably having 1 to 10 carbon atoms and more preferably having 1 to 5 carbon atoms), or an arylene group (preferably having 6 to 20 carbon atoms and more preferably having 6 to 15 carbon atoms). Herein, * represents a bonding site on the phenylene group side and ** represents a bonding site on the opposite side. $J^1$ preferably represents a single bond, a methylene group, or a phenylene group and particularly preferably represents a single bond.

$A^1$ represents a group selected from the group consisting of —COOH, —OH, —SH, and —S(=O)₂OH. $A^1$ preferably represents —COOH or —OH.

The substituent group Z is constituted by the following: alkyl groups (preferably an alkyl group having 1 to 30 carbon atoms, more preferably an alkyl group having 1 to 20 carbon atoms, and particularly preferably an alkyl group having 1 to 10 carbon atoms, e.g., methyl, ethyl, iso-propyl, tert-butyl, n-octyl, n-decyl, and n-hexadecyl), cycloalkyl groups (preferably a cycloalkyl group having 3 to 30 carbon atoms, more preferably a cycloalkyl group having 3 to 20 carbon atoms, and particularly preferably a cycloalkyl group having 3 to 10 carbon atoms, e.g., cyclopropyl, cyclopentyl, and cyclohexyl), alkenyl groups (preferably an alkenyl group having 2 to 30 carbon atoms, more preferably an alkenyl group having 2 to 20 carbon atoms, and particularly preferably an alkenyl group having 2 to 10 carbon atoms, e.g., vinyl, allyl, 2-butenyl, and 3-pentenyl), alkynyl groups (preferably an alkynyl group having 2 to 30 carbon atoms, more preferably an alkynyl group having 2 to 20 carbon atoms, and particularly preferably an alkynyl group having 2 to 10 carbon atoms, e.g., propargyl and 3-pentynyl), aryl groups (preferably an aryl group having 6 to 30 carbon atoms, more preferably an aryl group having 6 to 20 carbon atoms, and particularly preferably an aryl group having 6 to 12 carbon atoms, e.g., phenyl, p-methylphenyl, naphthyl, and anthranyl), amino groups (including an amino group, an alkylamino group, an arylamino group, and a heterocyclic amino group, preferably an amino group having 0 to 30 carbon atoms, more preferably an amino group having 0 to 20 carbon atoms, and particularly preferably an amino group having 0 to 10 carbon atoms, e.g., amino, methylamino, dimethylamino, diethylamino, dibenzylamino, diphenylamino, and ditolylamino), alkoxy groups (preferably an alkoxy group having 1 to 30 carbon atoms, more preferably an alkoxy group having 1 to 20 carbon atoms, and particularly preferably an alkoxy group having 1 to 10 carbon atoms, e.g., methoxy, ethoxy, butoxy, and 2-ethylhexyloxy), aryloxy groups (preferably an aryloxy group having 6 to 30 carbon atoms, more preferably an aryloxy group having 6 to 20 carbon atoms, and particularly preferably an aryloxy group having 6 to 12 carbon atoms, e.g., phenyloxy, 1-naphthyloxy, and 2-naphthyloxy), and heterocyclic oxy groups (preferably a heterocyclic oxy group having 1 to 30 carbon atoms, more preferably a heterocyclic oxy group having 1 to 20 carbon atoms, and particularly preferably a heterocyclic oxy group having 1 to 12 carbon atoms, e.g., pyridyloxy, pyrazyloxy, pyrimidyloxy, and quinolyloxy);

acyl groups (preferably an acyl group having 1 to 30 carbon atoms, more preferably an acyl group having 1 to 20 carbon atoms, and particularly preferably an acyl group having 1 to 12 carbon atoms, e.g., acetyl, benzoyl, formyl, and pivaloyl), alkoxycarbonyl groups (preferably an alkoxycarbonyl group having 2 to 30 carbon atoms, more preferably an alkoxycarbonyl group having 2 to 20 carbon atoms, and particularly preferably an alkoxycarbonyl group having 2 to 12 carbon atoms, e.g., methoxycarbonyl and ethoxycarbonyl), aryloxycarbonyl groups (preferably an aryloxycarbonyl group having 7 to 30 carbon atoms, more preferably an aryloxycarbonyl group having 7 to 20 carbon atoms, and particularly preferably an aryloxycarbonyl group having 7 to 12 carbon atoms, e.g., phenyloxycarbonyl), acyloxy groups (preferably an acyloxy group having 2 to 30 carbon atoms, more preferably an acyloxy group having 2 to 20 carbon atoms, and particularly preferably an acyloxy group having 2 to 10 carbon atoms, e.g., acetoxy and benzoyloxy), and acylamino groups (preferably an acylamino group having 2 to 30 carbon atoms, more preferably an acylamino group having 2 to 20 carbon atoms, and particularly preferably an acylamino group having 2 to 10 carbon atoms, e.g., acetylamino and benzoylamino);

alkoxycarbonylamino groups (preferably an alkoxycarbonylamino group having 2 to 30 carbon atoms, more preferably an alkoxycarbonylamino group having 2 to 20 carbon atoms, and particularly preferably an alkoxycarbonylamino group having 2 to 12 carbon atoms, e.g., methoxycarbonylamino), aryloxycarbonylamino groups (preferably an aryloxycarbonylamino group having 7 to 30 carbon atoms, more preferably an aryloxycarbonylamino group having 7 to 20 carbon atoms, and particularly preferably an aryloxycarbonylamino group having 7 to 12 carbon atoms, e.g., phenyloxycarbonylamino), sulfonylamino groups (preferably a sulfonylamino group having 1 to 30 carbon atoms, more preferably a sulfonylamino group having 1 to 20 carbon atoms, and particularly preferably a sulfonylamino group having 1 to 12 carbon atoms, e.g., methanesulfonylamino and benzenesulfonylamino), and sulfamoyl groups (preferably a sulfamoyl group having 0 to 30 carbon atoms, more preferably a sulfamoyl group having 0 to 20 carbon atoms, and particularly preferably a sulfamoyl group having 0 to 12 carbon atoms, e.g., sulfamoyl, methylsulfamoyl, dimethylsulfamoyl, and phenylsulfamoyl);

carbamoyl groups (preferably a carbamoyl group having 1 to 30 carbon atoms, more preferably a carbamoyl group having 1 to 20 carbon atoms, and particularly preferably a carbamoyl group having 1 to 12 carbon atoms, e.g., carbamoyl, methylcarbamoyl, diethylcarbamoyl, and phenylcarbamoyl), alkylthio groups (preferably an alkylthio group having 1 to 30 carbon atoms, more preferably an alkylthio group having 1 to 20 carbon atoms, and particularly preferably an alkylthio group having 1 to 12 carbon atoms, e.g., methylthio and ethylthio), arylthio groups (preferably an arylthio group having 6 to 30 carbon atoms, more preferably an arylthio group having 6 to 20 carbon atoms, and particularly preferably an arylthio group having 6 to 12 carbon atoms, e.g., phenylthio), heterocyclic thio groups (preferably a heterocyclic thio group having 1 to 30 carbon atoms, more preferably a heterocyclic thio group having 1 to 20 carbon atoms, and particularly preferably a heterocyclic thio group having 1 to 12 carbon atoms, e.g., pyridylthio, 2-benzimizolylthio, 2-benzoxazolylthio, and 2-benzothiazolylthio);

sulfonyl groups (preferably a sulfonyl group having 1 to 30 carbon atoms, more preferably a sulfonyl group having 1 to 20 carbon atoms, and particularly preferably a sulfonyl group having 1 to 12 carbon atoms, e.g., mesyl and tosyl), sulfinyl groups (preferably a sulfinyl group having 1 to 30 carbon atoms, more preferably a sulfinyl group having 1 to 20 carbon atoms, and particularly preferably a sulfinyl group having 1 to 12 carbon atoms, e.g., methanesulfinyl and benzenesulfinyl), ureido groups (preferably an ureido group having 1 to 30 carbon atoms, more preferably an ureido group having 1 to 20 carbon atoms, and particularly preferably an ureido group having 1 to 12 carbon atoms, e.g., ureido, methylureido, and phenylureido), phosphoramide groups (preferably a phosphoramide group having 1 to 30 carbon atoms, more preferably a phosphoramide group having 1 to 20 carbon atoms, and particularly preferably a phosphoramide group having 1 to 12 carbon atoms, e.g., diethylphosphoramide and phenylphosphoramide), a hydroxy group, a mercapto group, and a halogen atom (e.g., a fluorine atom, a chlorine atom, a bromine atom, and an iodine atom, more preferably a fluorine atom); and a cyano group, a sulfo group, a carboxy group, an oxo group, a nitro group, a hydroxamic acid group, a sulfino group, a hydrazino group, an imino group, heterocyclic groups (3- to 7-membered ring heterocyclic groups are preferable, the heterocycle may be aromatic or non-aromatic, examples of the heteroatom contained in the heterocycle include a nitrogen atom, an oxygen atom, and a sulfur atom, the number of carbon atoms of each heterocyclic group is preferably 0 to 30 and more preferably 1 to 12, e.g., imidazolyl, pyridyl, quinolyl, furyl, thienyl, piperidyl, morpholino, benzoxazolyl, benzimidazolyl, benzothiazolyl, carbazolyl, and azepinyl)), silyl groups (preferably a silyl group having 3 to 40 carbon atoms, more preferably a silyl group having 3 to 30 carbon atoms, and particularly preferably a silyl group having 3 to 24 carbon atoms, e.g., trimethylsilyl and triphenylsilyl), and silyloxy groups (preferably a silyloxy group having 3 to 40 carbon atoms, more preferably a silyloxy group having 3 to 30 carbon atoms, and particularly preferably a silyloxy group having 3 to 24 carbon atoms, e.g., trimethylsilyloxy and triphenylsilyloxy). These substituents may be further substituted with any one or more substituents selected from the substituent group Z described above.

In the present invention, when one structural site has a plurality of substituents, these substituents may be linked to each other to form a ring or may be fused with a part or the whole of the structural site to form an aromatic ring or an unsaturated heterocyclic ring.

In the polyimide compound used in the present invention, the ratio of the repeating units represented by the above formulae (I), (II-a), (II-b), (III-a), and (III-b) is not particularly limited, and is appropriately adjusted in accordance with the purpose of gas separation (e.g., recovery and purity) in consideration of gas permeability and separation selectivity.

In the polyimide compound used in the present invention, the ratio ($E_{II}/E_{III}$) of the total number of moles ($E_{II}$) of the repeating units represented by the formulae (II-a) and (II-b) to the total number of moles ($E_{III}$) of the repeating units represented by the formulae (III-a) and (III-b) is preferably 5/95 to 95/5, more preferably 10/90 to 80/20, and further preferably 20/80 to 60/40.

The weight-average molecular weight of the polyimide compound used in the present invention is preferably 10,000 to 1,000,000, more preferably 15,000 to 500,000, and further preferably 20,000 to 200,000.

Synthesis of Polyimide Compound

The polyimide compound used in the present invention can be synthesized by causing condensation polymerization of a particular bifunctional acid anhydride (tetracarboxylic dianhydride) and a particular diamine. The synthesis can be performed by appropriately employing a method described in general books (e.g., Yoshio Imai, Rikio Yokota, "Latest Polyimides—Fundamentals and Applications—", NTS Inc., Aug. 25, 2010, pp. 3 to 49).

In the synthesis of the polyimide compound used in the present invention, at least one of tetracarboxylic dianhydrides serving as raw materials is represented by formula (VI) below. All the tetracarboxylic dianhydrides serving as raw materials are preferably represented by the formula (VI) below.

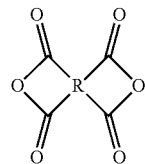

Formula (VI)

In the formula (VI), R has the same meaning as R in the above formula (I).

The tetracarboxylic dianhydride used in the present invention is, for example, as follows.

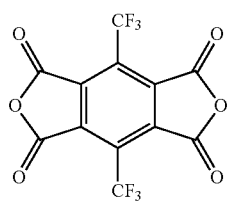
Anhydride-1

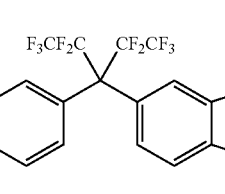
Anhydride-11

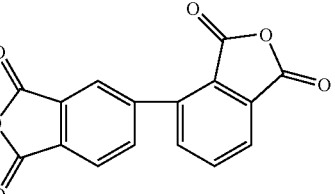
Anhydride-21

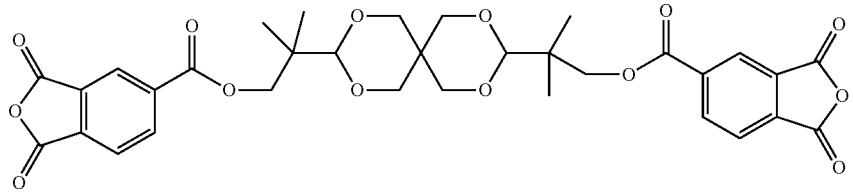
Anhydride-31

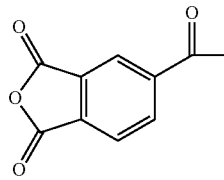
Anhydride-2

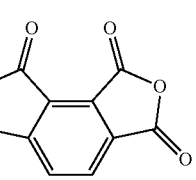
Anhydride-12

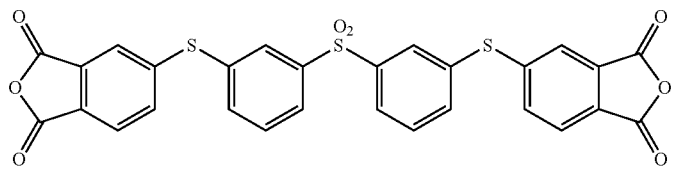
Anhydride-22

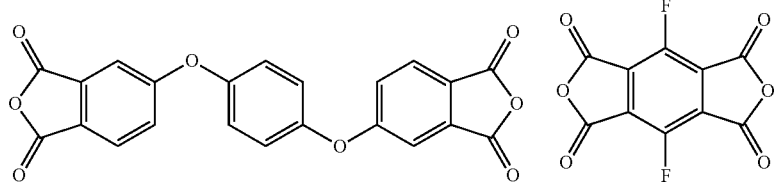
Anhydride-32

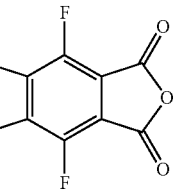
Anhydride-3

-continued
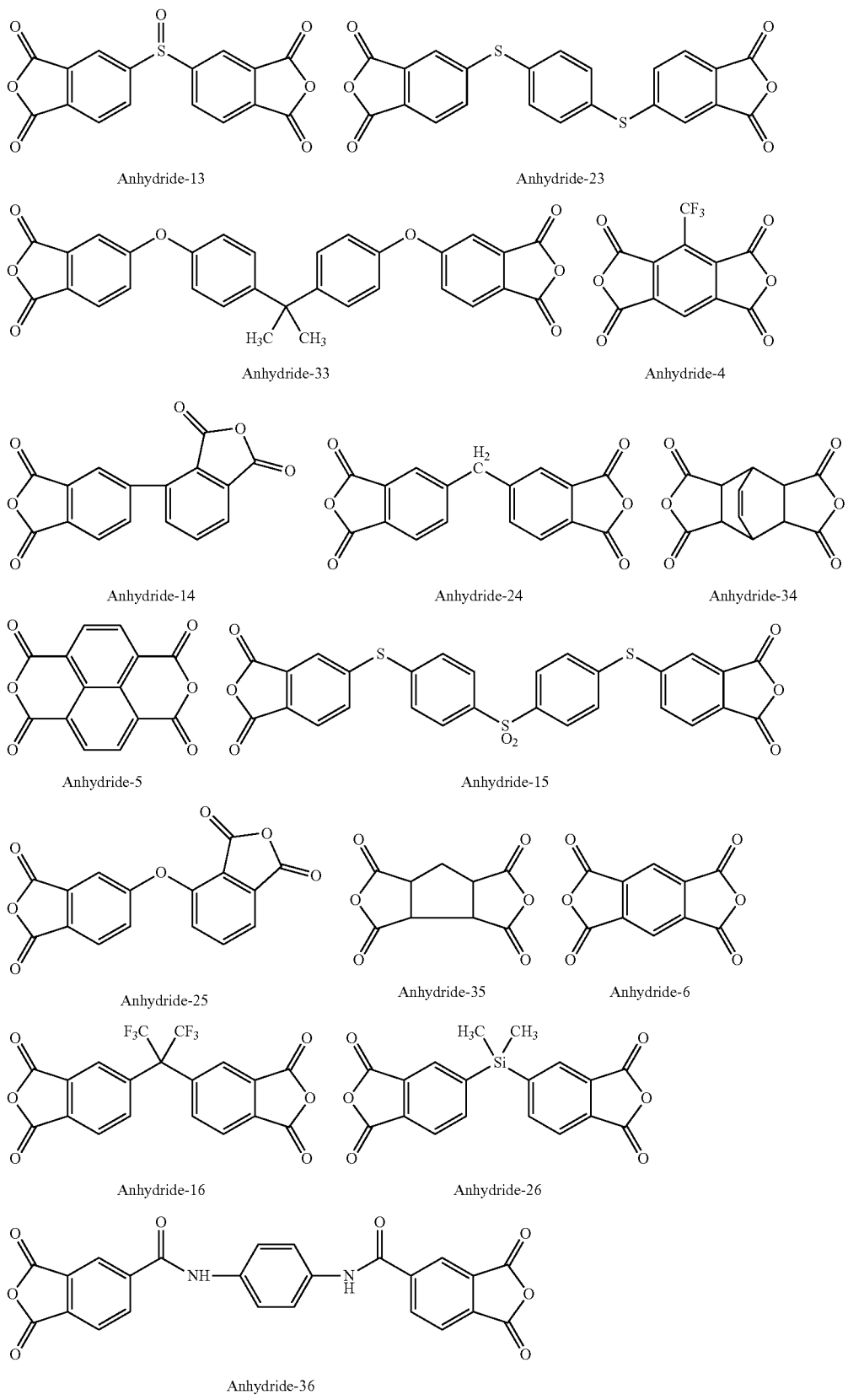

-continued
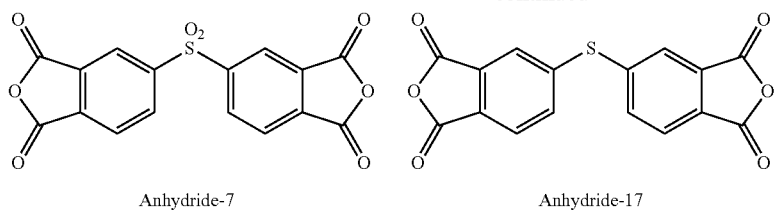
Anhydride-7   Anhydride-17
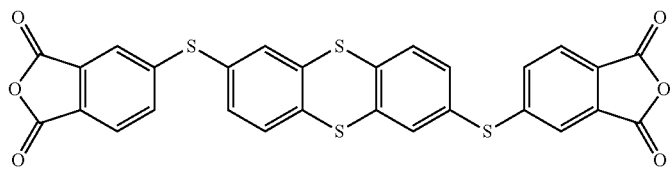
Anhydride-27
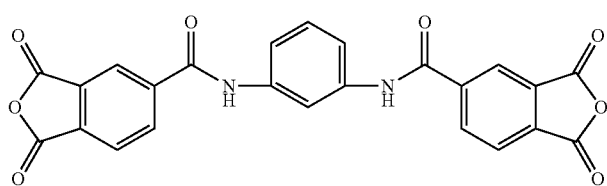
Anhydride-37
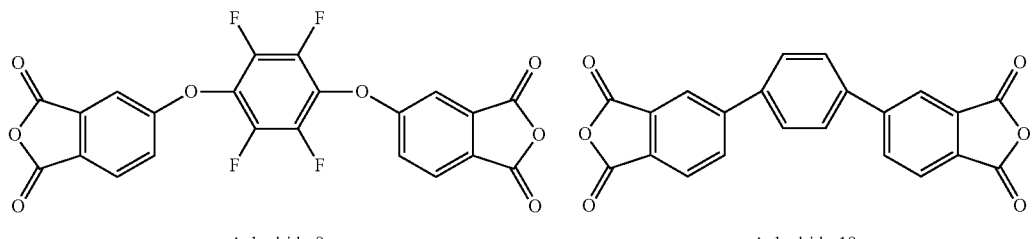
Anhydride-8   Anhydride-18
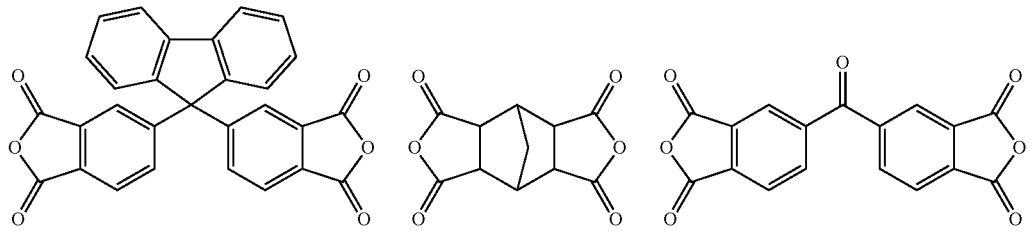
Anhydride-28   Anhydride-38   Anhydride-9
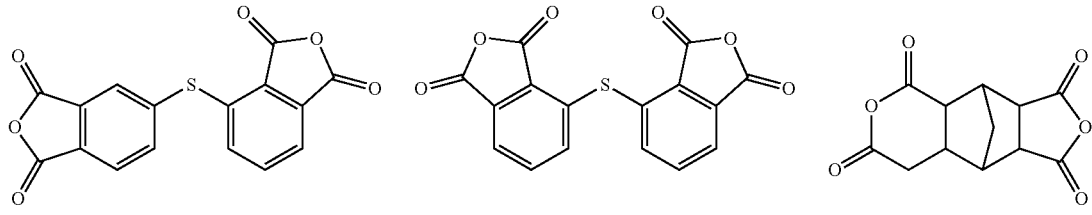
Anhydride-19   Anhydride-29   Anhydride-39
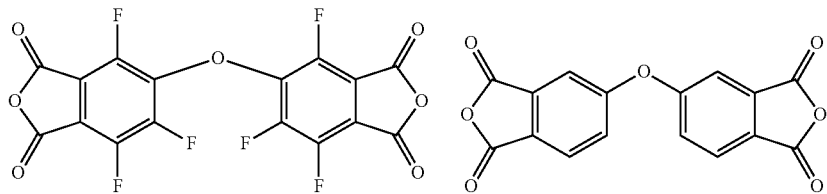
Anhydride-10   Anhydride-20

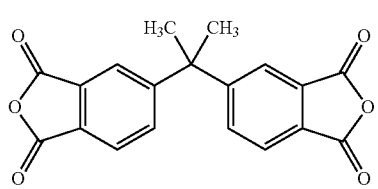
Anhydride-30

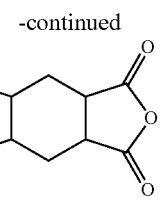
Anhydride-40

In the synthesis of the polyimide compound used in the present invention, at least one of diamine compounds serving as raw materials is preferably represented by any one of formulae (VII-a), (VII-b), (VIII-a), and (VIII-b) below. Furthermore, preferably, at least one of the diamine compounds serving as raw materials is represented by formula (VII-a) or (VII-b) and at least one of the diamine compounds is represented by formula (VIII-a) or (VIII-b). All the diamine compounds serving as raw materials are preferably represented by any of the formulae (VII-a), (VII-b), (VIII-a), and (VIII-b) below.

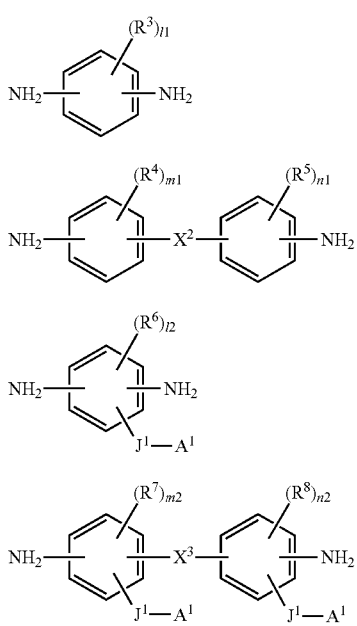

The symbols in the formulae (VII-a) and (VII-b) are the same as those in the formulae (II-a) and (II-b), respectively. The symbols in the formulae (VIII-a) and (VIII-b) are the same as those in the formulae (III-a) and (III-b), respectively.

Preferred examples of the diamine compound used in the present invention are shown below.

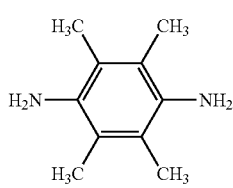
Diamine-1

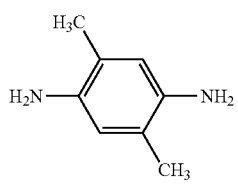
Diamine-2

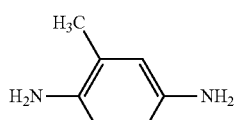
Diamine-3

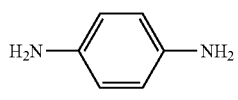
Diamine-4

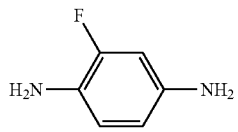
Diamine-5

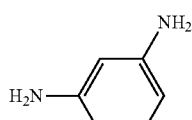
Diamine-6

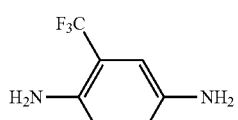
Diamine-7

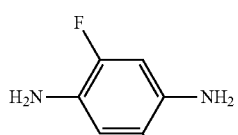
Diamine-8

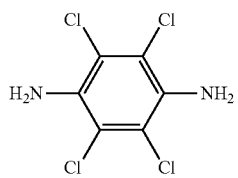
Diamine-9

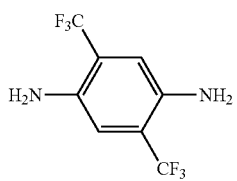
Diamine-10
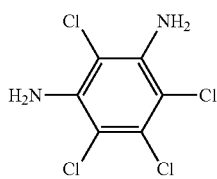
Diamine-11
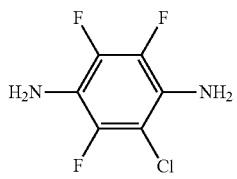
Diamine-12
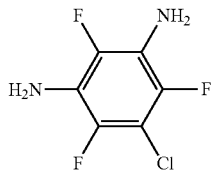
Diamine-13
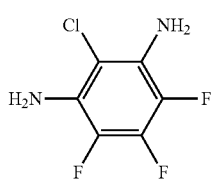
Diamine-14
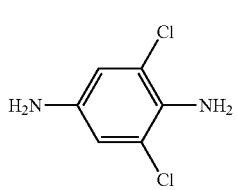
Diamine-15
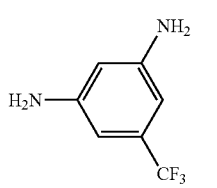
Diamine-16
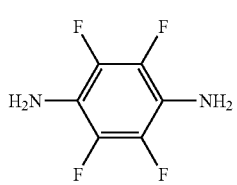
Diamine-17
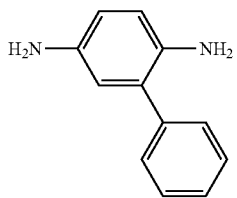
Diamine-18
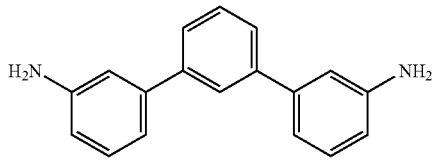
Diamine-19
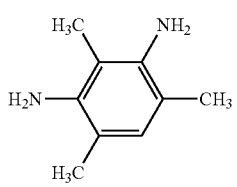
Diamine-20
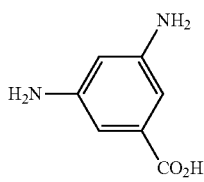
Diamine-31
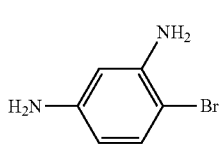
Diamine-32
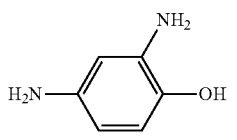
Diamine-33
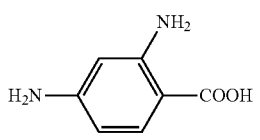
Diamine-34
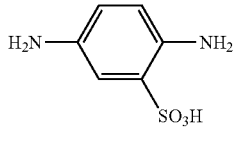
Diamine-35
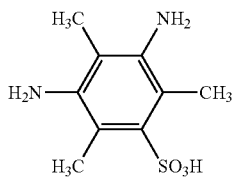
Diamine-36

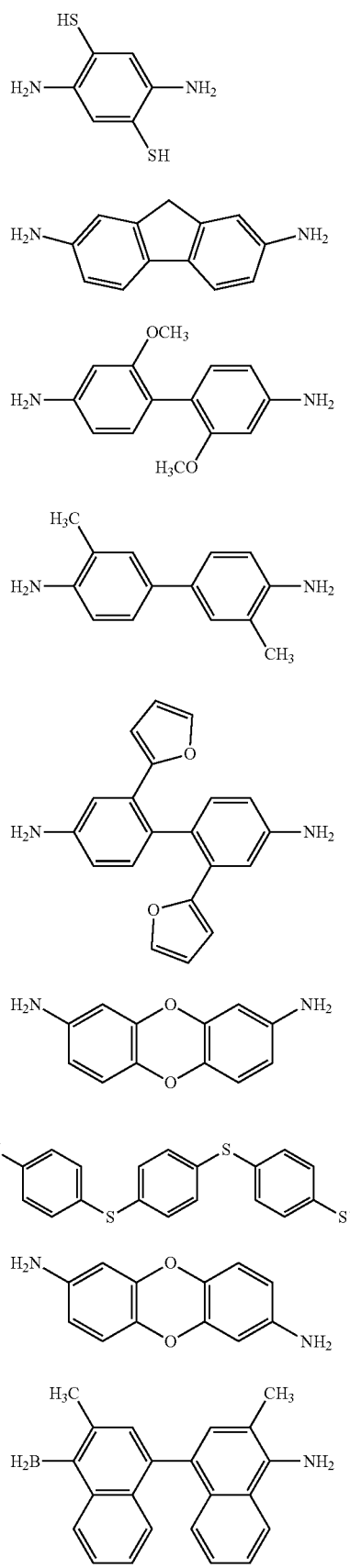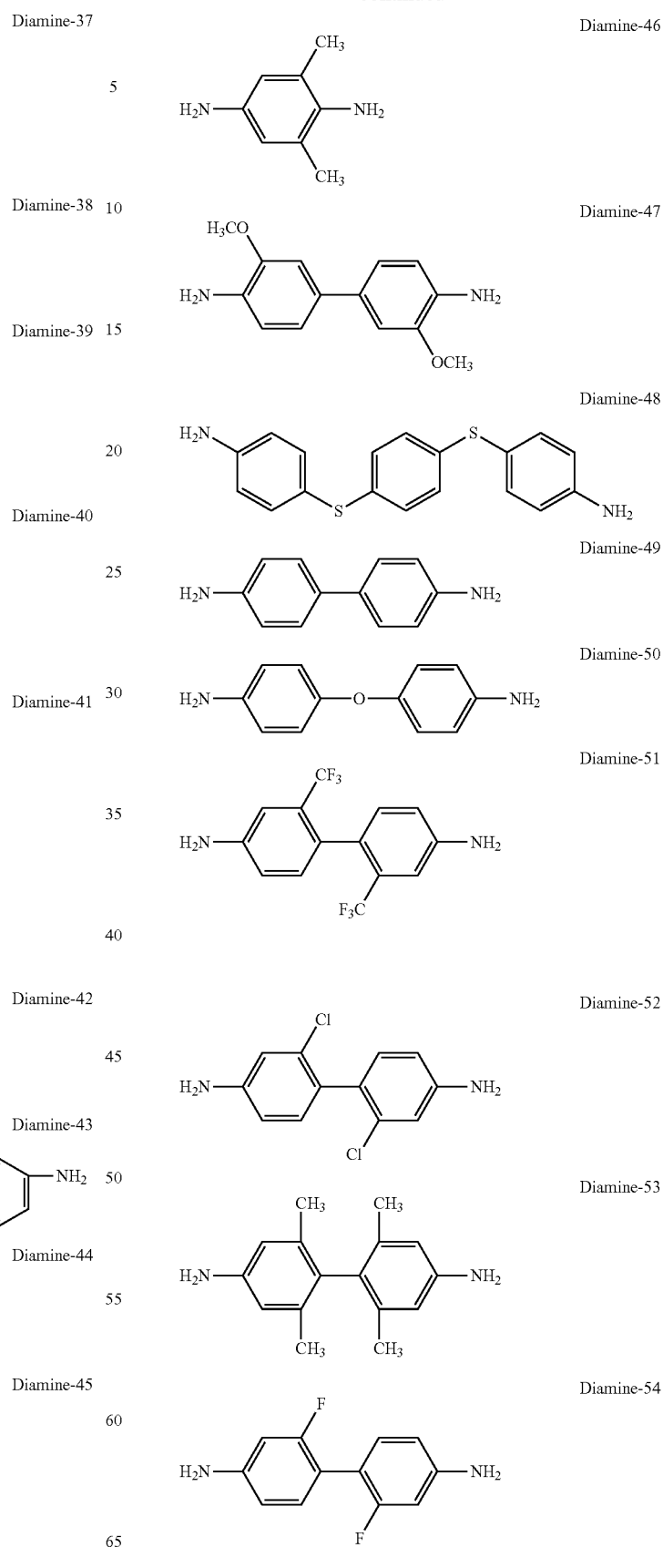

Diamine-55
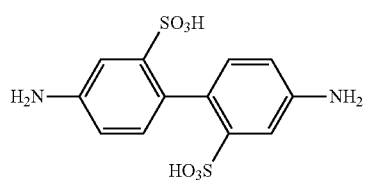

Diamine-56
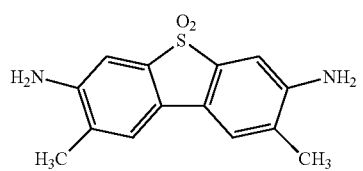

Diamine-57
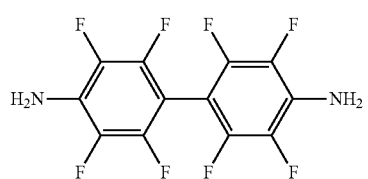

Diamine-58
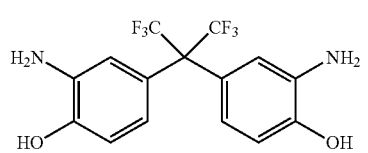

Diamine-59
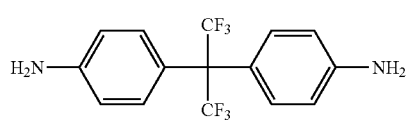

Diamine-60
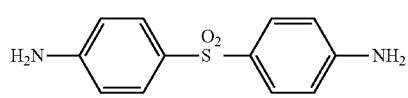

Diamine-61
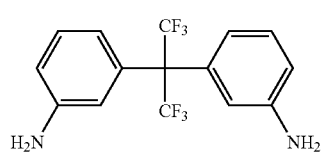

Diamine-62
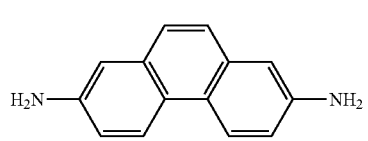

Diamine-63
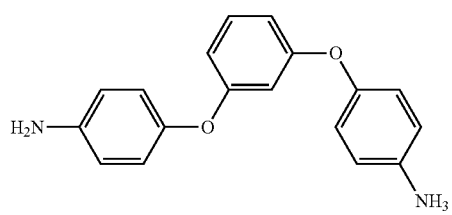

Diamine-64
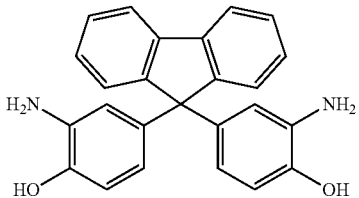

Diamine-65
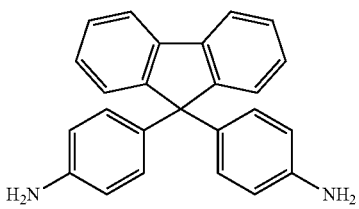

Diamine-66
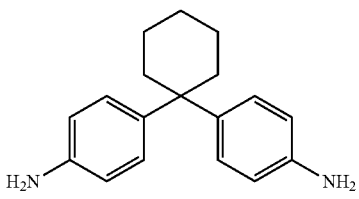

Diamine-67
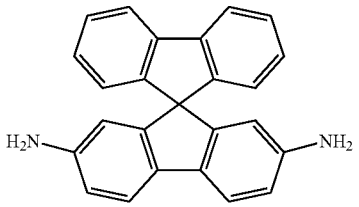

Diamine-68
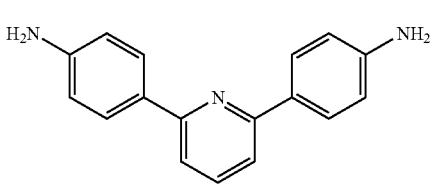

Diamine-69
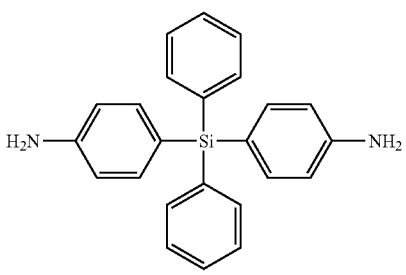

Diamine-70
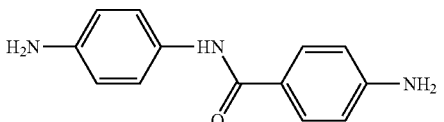

Preferred examples of the polyimide used in the present invention are shown below, but the polyimide used in the present invention is not limited thereto. All the repeating units are bonded so as to form an imide bond. In the formulae below, "100", "x", and "y" represent a copolymerization ratio (molar ratio). Table 1 below shows examples of "x", "y", and the weight-average molecular weight.

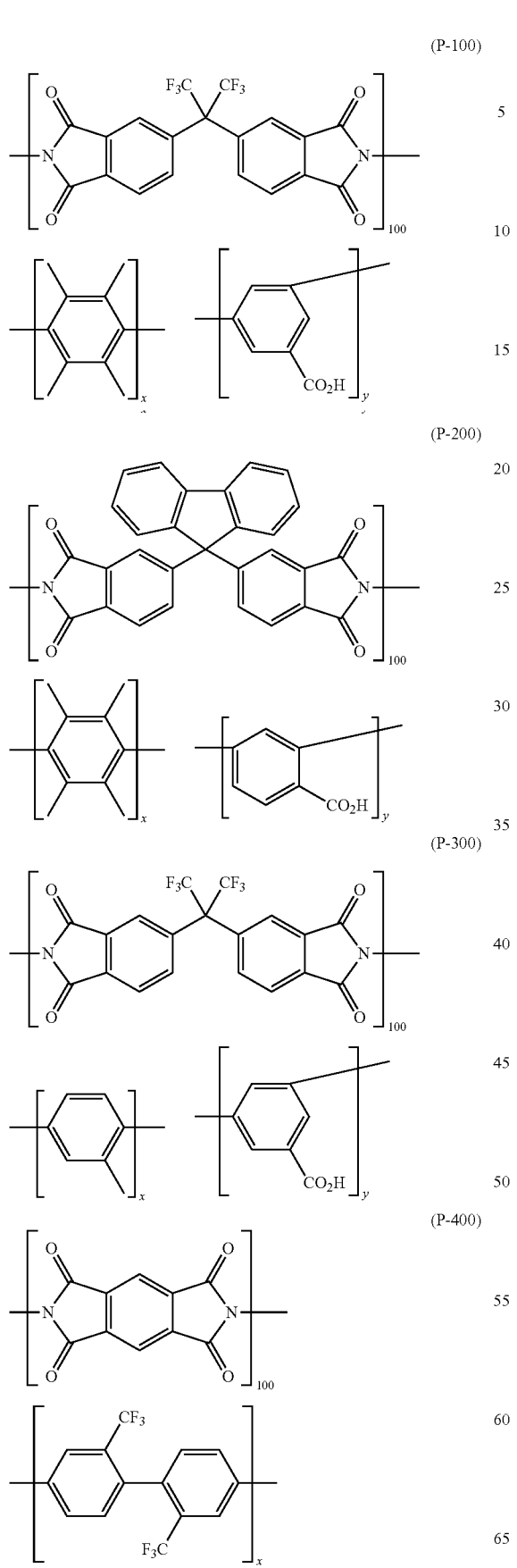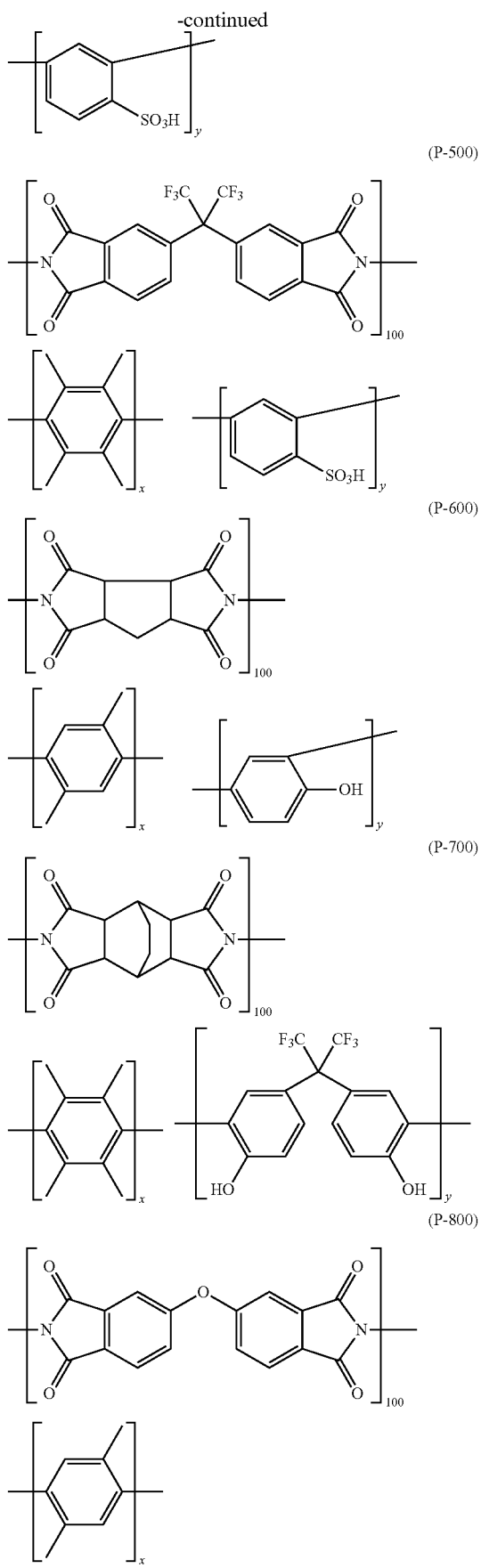

-continued

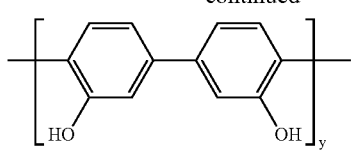
(P-900)

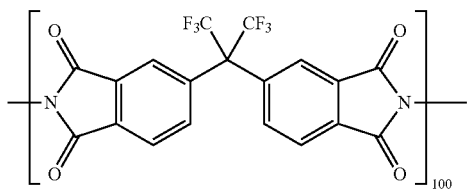

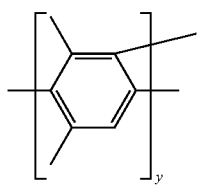

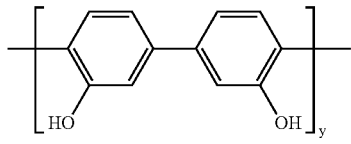
(P-1000)

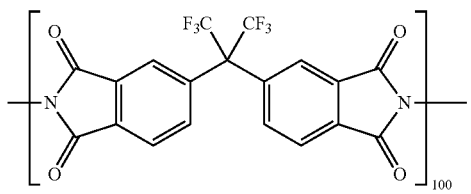

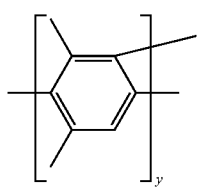
(P-1100)

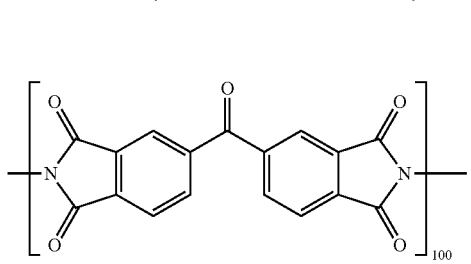

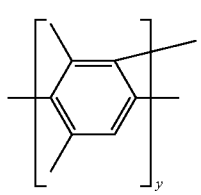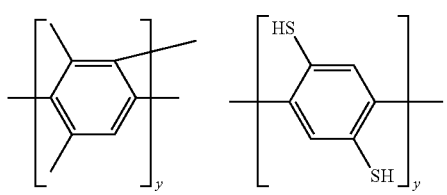

TABLE 1

| Polymer | Copolymerization ratio x | Copolymerization ratio y | Weight-average molecular weight |
|---|---|---|---|
| P-100 | 30.0000 | 70.0000 | 132000 |
| P-200 | 40.0000 | 60.0000 | 168000 |
| P-300 | 60.0000 | 40.0000 | 165000 |
| P-400 | 10.0000 | 90.0000 | 158000 |
| P-500 | 20.0000 | 80.0000 | 128000 |
| P-600 | 50.0000 | 50.0000 | 155000 |
| P-700 | 70.0000 | 30.0000 | 112500 |
| P-800 | 30.0000 | 70.0000 | 158000 |
| P-900 | 20.0000 | 80.0000 | 128000 |
| P-1000 | 60.0000 | 40.0000 | 150000 |
| P-1100 | 40.0000 | 60.0000 | 117000 |

When a polybenzoxazole compound, a polyethersulfone compound, a polyetherketone compound, a polycarbonate compound, a polysulfone compound, a polystyrene compound, a polyaniline compound, a PIM (polymer of intrinsic microporosity) compound, an alkyl cellulose, or cellulose acetate is used for the gas separation layer, such a polymer may be a commercially available product. Alternatively, a publicly known compound in literature or the like or a compound synthesized by a publicly known method may be used.

Method for Forming Gas Separation Layer

The gas separation layer is preferably formed on the siloxane compound layer by applying, onto the siloxane compound layer, a coating liquid containing a material for forming the gas separation layer and drying the coating liquid. The coating liquid may be dried while being heated to cure the polymer. The content of the polymer in the coating liquid is not particularly limited, and is preferably 0.1 to 30 mass % and more preferably 0.5 to 10 mass % in consideration of, for example, the viscosity of the coating liquid.

The organic solvent serving as a medium of the coating liquid is not particularly limited. Examples of the organic solvent include hydrocarbon organic solvents such as n-hexane and n-heptane; ester organic solvents such as methyl acetate, ethyl acetate, and butyl acetate; lower alcohols such as methanol, ethanol, n-propanol, isopropanol, n-butanol, isobutanol, and tert-butanol; aliphatic ketones such as acetone, methyl ethyl ketone, methyl isobutyl ketone, diacetone alcohol, cyclopentanone, and cyclohexanone; ether organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether, tetrahydrofuran, methyl cyclopentyl ether, and dioxane; N-methylpyrrolidone; 2-pyrrolidone; dimethylformamide; dimethylimidazolidinone; dimethyl sulfoxide; and dimethylacetamide. These organic solvents are appropriately selected within the range in which the support is not adversely affected through erosion or the like. These organic solvents are preferably esters (preferably butyl acetate), alcohols (preferably methanol, ethanol, isopropanol, and isobutanol), aliphatic ketones (preferably methyl ethyl ketone, methyl isobutyl ketone, diacetone alcohol, cyclopentanone, and cyclohexanone), ethers (ethylene glycol, diethylene glycol monomethyl ether, and methyl cyclopentyl ether) and more preferably aliphatic ketones, alcohols, and ethers. These organic solvents may be used alone or in combination of two or more.

The thickness of the gas separation layer is not particularly limited, and is preferably 0.01 to 5.0 μm and more preferably 0.05 to 2.0 μm.

Gas Separation Composite Membrane

The gas separation composite membrane according to the present invention has a crosslinked polysiloxane compound layer on a porous support. The crosslinked polysiloxane compound layer has a structural unit represented by formula (f1) below and a structural unit represented by formula (f2) below, and the Si ratio of the crosslinked polysiloxane compound layer is 0.65 to 1.00.

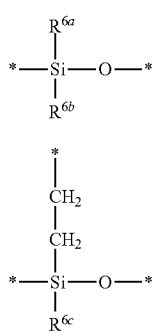

In the above formulae, $R^{6a}$ to $R^{6c}$ have the same meaning as $R^{1a}$ in the structural unit (a1), and the preferred forms are also the same as that of $R^{1a}$. Herein, * represents a linking site, the linking site * represented by *—Si— and —O—* is a linking site in a siloxane bond, and the linking site * represented by —CH$_2$—CH$_2$—* is a linking site with a Si atom constituting a siloxane bond.

The Si ratio is measured by the above-described method.

In the gas separation composite membrane according to the present invention, the form or physical properties of the crosslinked polysiloxane compound layer are the same as those of the crosslinked polysiloxane compound layer in the above-described production method according to the present invention.

The gas separation composite membrane according to the present invention may have a two-layer structure including a porous support and a crosslinked polysiloxane compound layer disposed on the porous support or may have a three-layer structure further including a gas separation layer on the crosslinked polysiloxane compound layer. In the case of the two-layer structure, the crosslinked polysiloxane compound layer functions as a gas separation layer.

The gas separation layer disposed on the crosslinked polysiloxane compound layer is the same as the gas separation layer described in the production method according to the present invention, and the preferred form thereof is also the same.

The gas separation composite membrane according to the present invention may further have a support made of nonwoven fabric or the like on the lower side of the porous support.

In the gas separation composite membrane according to the present invention, the crosslinked polysiloxane compound layer preferably further has the above-described structural units (e1) and/or (e2).

In the gas separation composite membrane according to the present invention, the crosslinked polysiloxane compound layer may have a structural unit represented by formula (g) below.

$$\begin{array}{c} R^{1g} \quad\quad\quad R^{3g} \\ | \quad\quad\quad\quad | \\ *-Si-CH_2-CH_2-Si-* \\ | \quad\quad\quad\quad | \\ R^{2g} \quad\quad\quad R^{4g} \end{array} \quad (g)$$

In the above formula, $R^{1g}$ to $R^{4g}$ have the same meaning as that of $R^{1a}$ in the structural unit (a1), the preferred forms thereof are also the same, and * represents a linking site in a siloxane bond.

In the gas separation composite membrane according to the present invention, the crosslinked polysiloxane compound layer may have a structural unit represented by formula (h) below.

$$\begin{array}{c} R^{1h} \\ | \\ *-Si-O-* \\ | \\ CH_2 \\ | \\ CH_2 \\ | \\ *-Si-O-* \\ | \\ R^{2h} \end{array} \quad (h)$$

In the above formula, $R^{1h}$ and $R^{2h}$ have the same meaning as $R^{1a}$ in the structural unit (a1), the preferred forms thereof are also the same, and * represents a linking site in a siloxane bond.

In the gas separation composite membrane according to the present invention, the total content of the structural units (f1) and (f2) in the crosslinked polysiloxane compound layer is preferably 45 to 100 mass % and more preferably 80 to 95 mass %.

In the crosslinked polysiloxane compound layer, the molar ratio ((f1)/(f2)) of the structural units (f1) and (f2) is preferably 200 or less and more preferably 100 or less.

When the crosslinked polysiloxane compound layer has the above-described structural units (e1) and/or (e2), the total molar quantity of the structural units (e1) and (e2) is preferably 0.1 to 55 and more preferably 5 to 20 relative to the total molar quantity 100 of the above-described structural units (f1) and (f2) in the crosslinked polysiloxane compound layer.

Furthermore, when the crosslinked polysiloxane compound layer has the above-described structural unit (g), the total molar quantity of the structural unit (g) is preferably 0.1 to 10 and more preferably 0.1 to 5 relative to the total molar quantity 100 of the above-described structural units (f1) and (f2) in the crosslinked polysiloxane compound layer.

Furthermore, when the crosslinked polysiloxane compound layer has the above-described structural unit (h), the total molar quantity of the structural unit (h) is preferably 0.1 to 50 and more preferably 0.1 to 30 relative to the total molar quantity 100 of the above-described structural units (f1) and (f2) in the crosslinked polysiloxane compound layer.

The gas separation composite membrane according to the present invention is normally prepared by the above-described production method according to the present invention. In this case, the structural unit (f1) is derived from the structural unit (a1) or (b1). The structural unit (f2) is derived from the structural unit (a2), the structural unit (b2), a form obtained by reacting the structural unit (a3) with the structural unit (b3) or (b4), or a form obtained by reacting the structural unit (b3) with the structural unit (a3) or (a4).

In the gas separation composite membrane according to the present invention, the structural units (e1) and (e2) that may constitute the crosslinked polysiloxane compound layer are derived from the structural units (e1) and (e2) described in the production method according to the present invention, respectively.

In the gas separation composite membrane according to the present invention, the structural unit (g) that may constitute the crosslinked polysiloxane compound layer is derived from a form obtained by reacting the structural units (a4) and (b4).

In the gas separation composite membrane according to the present invention, the structural unit (h) that may constitute the crosslinked polysiloxane compound layer is derived from a form obtained by reacting the structural units (a3) and (b3).

Applications and Characteristics of Gas Separation Composite Membrane

The gas separation composite membrane (composite membrane and asymmetric membrane) according to the present invention can be suitably used for gas separation recovery and gas separation purification. For example, a gas separation composite membrane can be provided that is capable of efficiently separating a particular gas from a gas mixture containing gases such as hydrogen, helium, carbon monoxide, carbon dioxide, hydrogen sulfide, oxygen, nitrogen, ammonia, sulfur oxides, nitrogen oxides, hydrocarbons, e.g., methane and ethane, unsaturated hydrocarbons, e.g., propylene, and perfluoro compounds, e.g., tetrafluoroethane. In particular, a gas separation composite membrane that selectively separates carbon dioxide from a gas mixture containing carbon dioxide/hydrocarbon (methane) is preferably provided.

When the gas to be subjected to separation treatment is a mixed gas of carbon dioxide and methane, the permeation rate of carbon dioxide at 30° C. and 5 MPa is preferably more than 20 GPU, more preferably more than 30 GPU, and further preferably more than 50 GPU. The ratio of the permeation rate of carbon dioxide to the permeation rate of methane ($R_{CO2}/R_{CH4}$, also referred to as separation selectivity) is preferably 10 or more, more preferably 15 or more, and further preferably 20 or more. $R_{CO2}$ represents the permeation rate of carbon dioxide, and $R_{CH4}$ represents the permeation rate of methane.

Note that 1 GPU is $1 \times 10^{-6}$ cm$^3$ (STP)/cm$^2$·sec·cmHg.

Gas Separation Method

The gas separation method according to the present invention is a method that includes performing selective permeation and separation of a particular gas from a mixture gas containing two or more gases using the gas separation composite membrane according to the present invention. In particular, the gas separation method according to the present invention is preferably a method that includes performing selective permeation of carbon dioxide from a mixture gas containing carbon dioxide and methane. The gas pressure during gas separation is preferably 0.5 to 10 MPa, more preferably 1 to 10 MPa, and further preferably 2 to 7 MPa.

The temperature of gas at which the gas separation method according to the present invention is performed is preferably −30° C. to 90° C. and more preferably 15° C. to 70° C. In the mixture gas containing carbon dioxide and methane gas, the mixture ratio of carbon dioxide and methane gas is not particularly limited, but is preferably carbon dioxide:methane gas=1:99 to 99:1 (volume ratio) and more preferably carbon dioxide:methane gas=5:95 to 90:10.

Gas Separation Module/Gas Separation Apparatus

A gas separation module can be provided by using the gas separation composite membrane according to the present invention. The module is, for example, a spiral-type module, a hollow fiber-type module, a pleated module, a tubular module, and a plate and frame-type module.

Furthermore, a gas separation apparatus having means for performing separation and recovery of gas or performing separation and purification of gas can be obtained by using the gas separation composite membrane or the gas separation module according to the present invention. The gas separation composite membrane according to the present invention may be applied to a gas separation-recovery apparatus for a membrane/absorption hybrid method in which a membrane is used in combination with an absorption liquid as described in, for example, JP2007-297605A.

EXAMPLES

Hereafter, the present invention will be further described in detail based on Examples, but is not limited to Examples below.

Synthesis of Polyimide Compound

Synthesis of Polymer (P-101)

To a 1 L three-necked flask, 123 ml of N-methylpyrrolidone and 54.97 g (0.124 mol) of 6FDA (4,4'-(hexafluoroisopropylidene)diphthalic anhydride, manufactured by Tokyo Chemical Industry Co., Ltd.) were added, and the 6FDA was dissolved at 40° C. Under stirring in a nitrogen stream, 84.0 ml of an N-methylpyrrolidone solution containing 4.098 g (0.0248 mol) of 2,3,5,6-tetramethyl-1,4-phenylenediamine (manufactured by Tokyo Chemical Industry Co., Ltd.) and 15.138 g (0.0992 mol) of 3,5-diaminobenzoic acid was added dropwise to the resulting mixture over 30 minutes while the system was kept at 40° C. After the reaction liquid was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were added thereto and stirring was further performed at 80° C. for 3 hours. Then, 676.6 mL of acetone was added to the reaction liquid for dilution. The reaction liquid diluted with acetone was added dropwise to a 5 L stainless container containing 1.15 L of methanol and 230 mL of acetone being stirred. The resulting polymer crystal was subjected to suction filtration and dried at 60° C. by air blowing to obtain 50.5 g of a polymer (P-101). The polymer P-101 was a polymer obtained by changing the ratio x:y of the above-mentioned polyimide P-100 to 20:80 and had a weight-average molecular weight of 158000.

Polymers listed in Tables were synthesized in conformity with the above synthesis example. In Tables, the fundamental skeletons of P-201 and P-301 respectively had structures obtained by changing the ratio (molar ratio) x:y of the above-mentioned polyimides P-200 and P-300 to 20:80. The polymer P-201 had a weight-average molecular weight of 122000, and the polymer P-301 had a weight-average molecular weight of 124000.

Preparation of Cellulose Compound

L-70 (degree of substitution: 2.4) manufactured by Daicel Corporation was used as cellulose acetate. The cellulose acetate L-70 had the following structure.

Comparative polymer 01

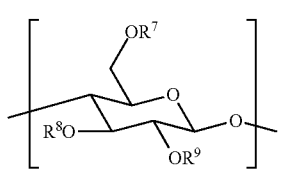

Weight-average molecular weight: 240,000

$R^7$, $R^8$, and $R^9$ represent a hydrogen atom or an acetyl group.

Example 1

Production of Crosslinked Polysiloxane Compound Layer

After 98.4 g of VQM-146 (trade name, manufactured by Gelest) and 1.6 g of HMS-301 (trade name, manufactured by Gelest) were dissolved in 900 g of heptane, 0.12 g of SIP6830.3 (trade name, manufactured by Gelest) was added thereto and the reaction was caused to proceed at 80° C. for 10 hours. Furthermore, 0.04 g of 2-methyl-3-butyn-2-ol (manufactured by Aldrich) was added to obtain a vinyl pre-crosslinked liquid (a solution of the crosslinkable polysiloxane compound (a)). The crosslinkable polysiloxane compound in the vinyl pre-crosslinked liquid did not have a hydrosilyl group.

Synthesis of Vinyl Pre-Crosslinked Liquid

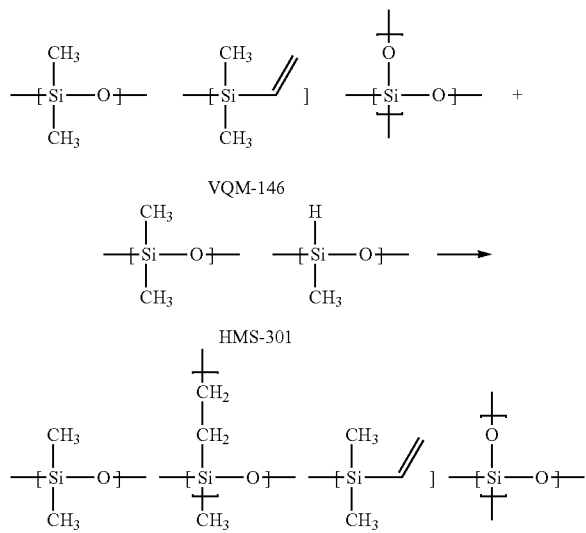

After 35.0 g of HMS-301 (trade name, manufactured by Gelest) and 65.0 g of VQM-146 (trade name manufactured by Gelest) were dissolved in 900 g of heptane, 0.12 g of SIP6830.3 (trade name, manufactured by Gelest) was added thereto and the reaction was caused to proceed at 80° C. for 10 hours. Furthermore, 0.04 g of 2-methyl-3-butyn-2-ol (manufactured by Aldrich) was added to obtain a hydro pre-crosslinked liquid (a solution of the crosslinkable polysiloxane compound (b)). The crosslinkable polysiloxane compound in the hydro pre-crosslinked liquid did not have a vinyl group.

Synthesis of Hydro Pre-Crosslinked Liquid

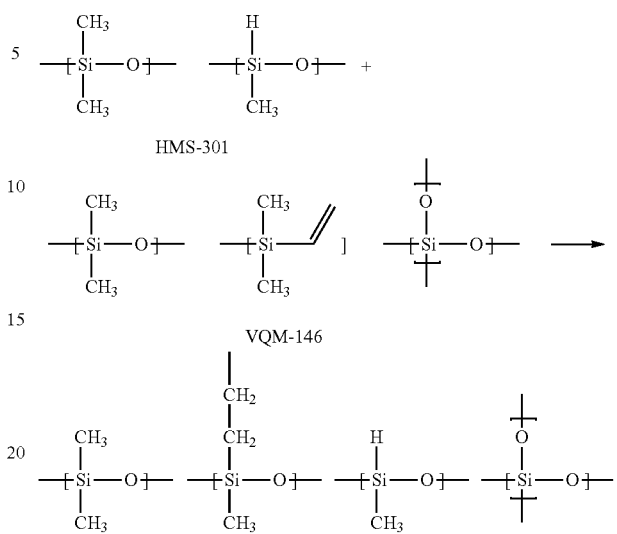

The vinyl pre-crosslinked liquid and the hydro pre-crosslinked liquid were mixed with each other at a mass ratio of [vinyl pre-crosslinked liquid]:[hydro pre-crosslinked liquid] =5:1 to prepare a dope liquid. A PAN (polyacrylonitrile) porous membrane (a polyacrylonitrile porous membrane was present on a nonwoven fabric, and the total thickness of the polyacrylonitrile porous membrane and the nonwoven fabric was about 180 μm) was used as a support and subjected to spin coating with the dope liquid, followed by drying at 110° C. for 1 hour. Thus, a crosslinked polysiloxane compound layer having a thickness of 1 μm was formed on the porous support. Consequently, a gas separation composite membrane (Example 1-(1)) having a form in which the gas separation layer 1 is removed from the form in FIG. 2 (a three-layer structure including a nonwoven fabric layer 4, a porous layer 3, and a crosslinked polysiloxane compound layer 2 among the layers illustrated in FIG. 2) was obtained.

In the following reaction scheme for forming the crosslinked polysiloxane compound layer, the right side schematically shows crosslinked structural units obtained by reacting the vinyl pre-crosslinked liquid and the hydro pre-crosslinked liquid. The structural unit having an ethylene group among structural units after the curing reaction in the following reaction scheme includes a structural unit having an ethylene group, the structural unit being included in the vinyl pre-crosslinked liquid and the hydro pre-crosslinked liquid before the curing reaction, and a structural unit formed by reacting a structural unit having a vinyl group and a structural unit having a hydrosilyl group, the structural units being included in the vinyl pre-crosslinked liquid and the hydro pre-crosslinked liquid before the curing reaction.

Formation of crosslinked polysiloxane compound layer

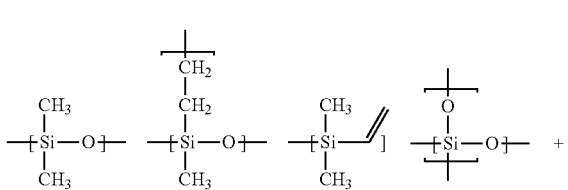

-continued

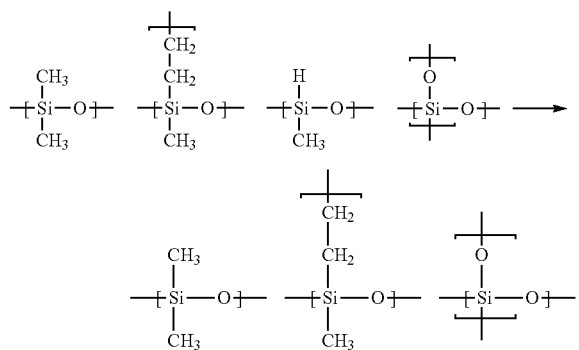

Production of Polymer Film

The crosslinked polysiloxane compound layer was subjected to spin coating with a THF (tetrahydrofuran) solution containing 1 wt % P-101, followed by drying at 70° C. for 240 hours. Thus, a gas separation layer having a thickness of 100 nm was formed on the crosslinked polysiloxane compound layer. Consequently, a gas separation composite membrane (Example 1-(2)) having the form illustrated in FIG. 2 was obtained.

Example 2

A gas separation composite membrane (Example 2-(1)) including a crosslinked polysiloxane compound layer as a gas separation layer and a gas separation composite membrane (Example 2-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

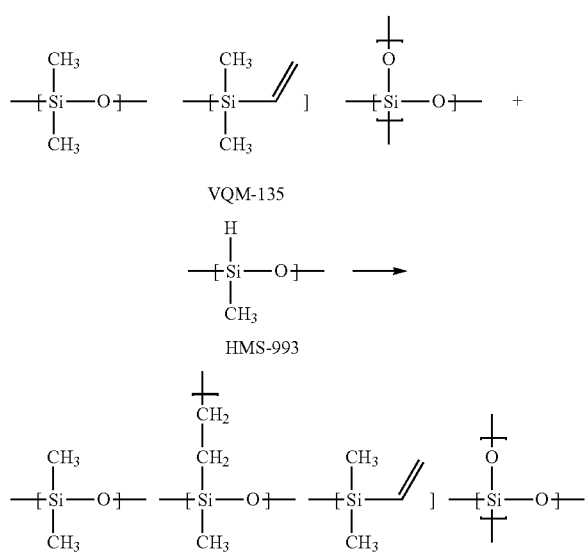

VQM-135

HMS-993

Synthesis of Hydro Pre-Crosslinked Liquid

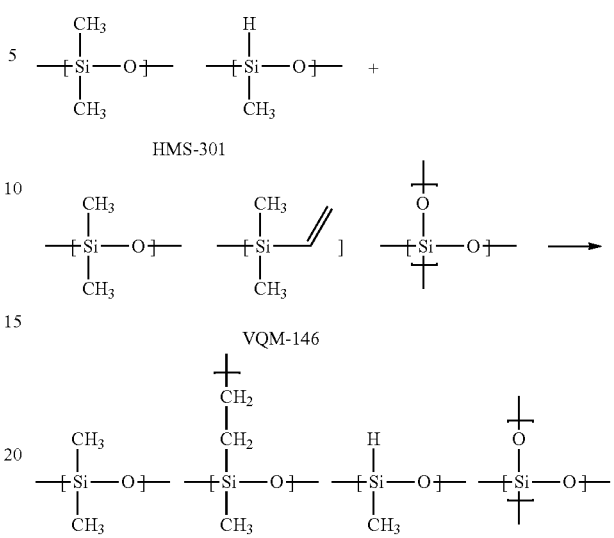

HMS-301

VQM-146

Formation of Crosslinked Polysiloxane Compound Layer

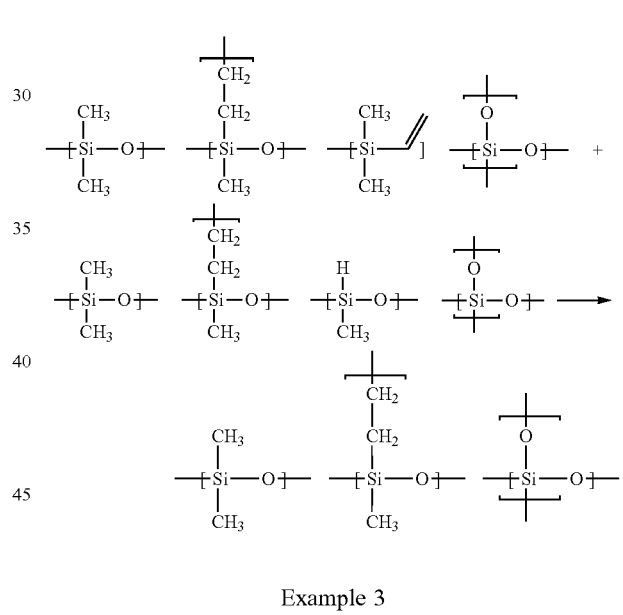

Example 3

A gas separation composite membrane (Example 3-(1)) including a crosslinked polysiloxane compound layer as a gas separation layer and a gas separation composite membrane (Example 3-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

DMS-V21

-continued

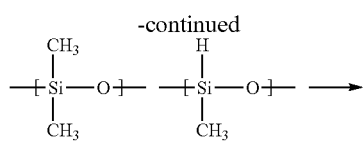
HMS-301

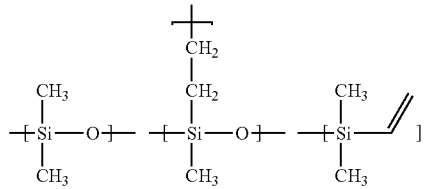

Synthesis of Hydro Pre-Crosslinked Liquid

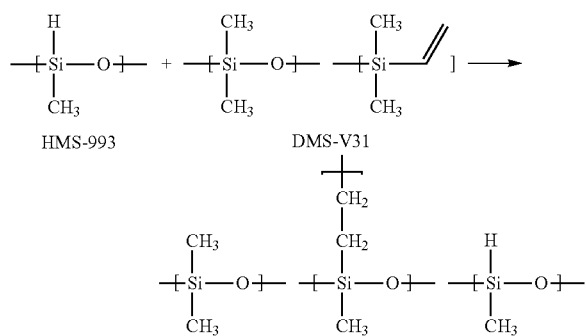
HMS-993    DMS-V31

Formation of Crosslinked Polysiloxane Compound Layer

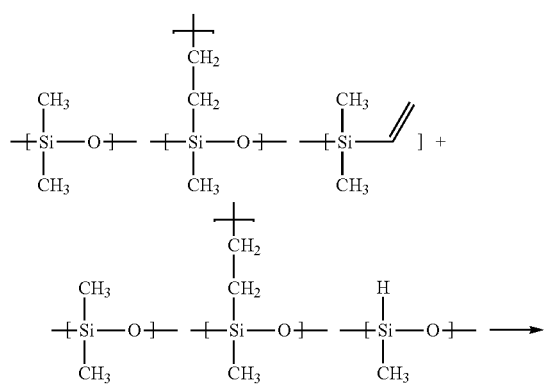

Example 4

A gas separation composite membrane (Example 4-(1)) including a crosslinked polysiloxane compound layer as a gas separation layer and a gas separation composite membrane (Example 4-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

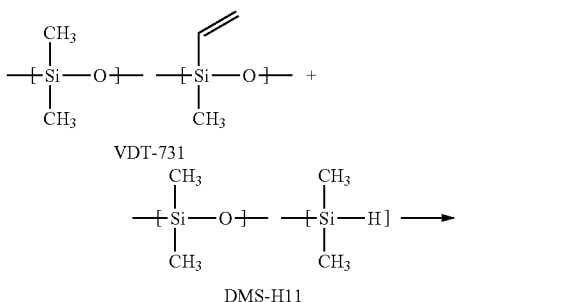
VDT-731

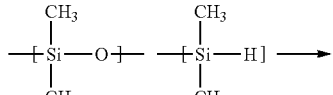
DMS-H11

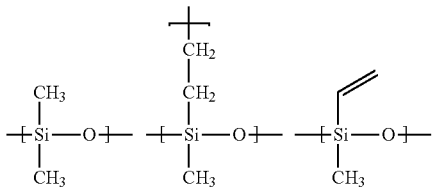

Synthesis of Hydro Pre-Crosslinked Liquid

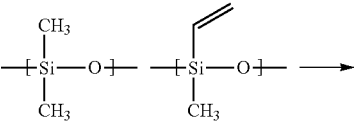
DMS-H11

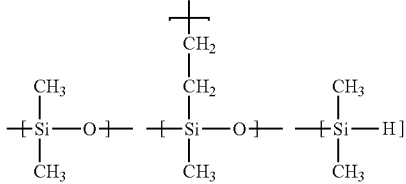
VDT-731

Formation of Crosslinked Polysiloxane Compound Layer

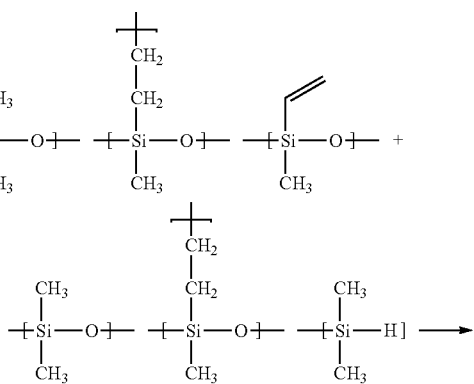

-continued

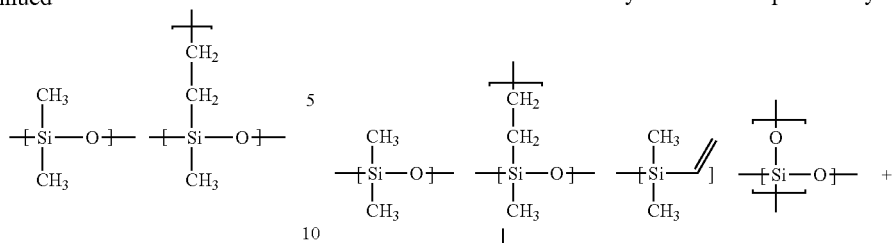

Example 5

A gas separation composite membrane (Example 5-(1)) including a crosslinked polysiloxane compound layer as a gas separation layer and a gas separation composite membrane (Example 5-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

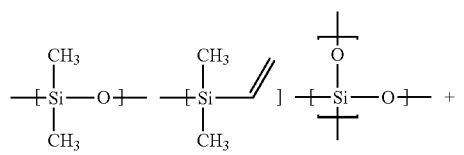

VQM-146

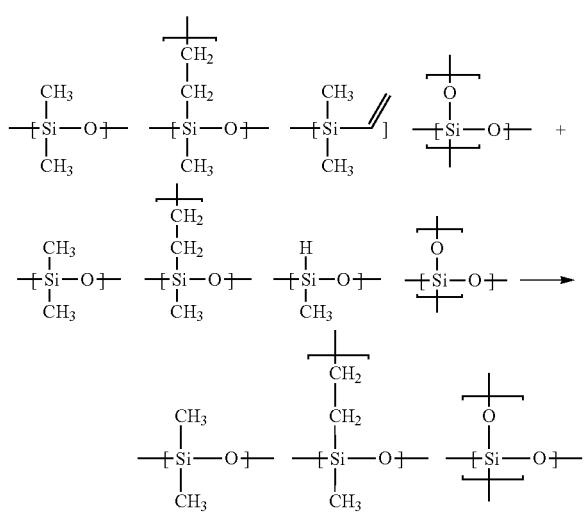

HMS-301

Synthesis of Hydro Pre-Crosslinked Liquid

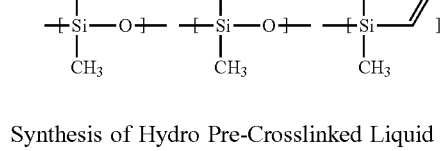

HMS-301

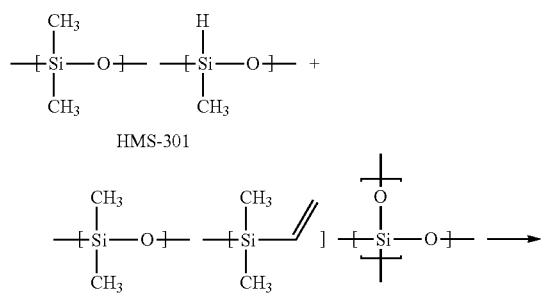

VQM-146

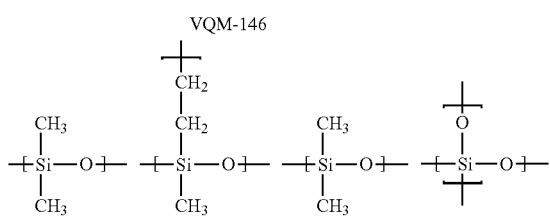

Formation of Crosslinked Polysiloxane Compound Layer

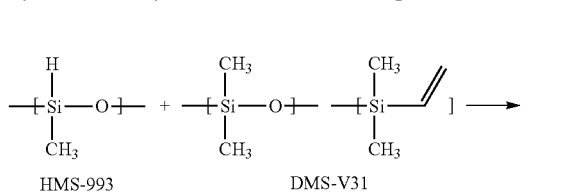

Example 6

A gas separation composite membrane (Example 6-(1)) including a crosslinked polysiloxane compound layer as a gas separation layer and a gas separation composite membrane (Example 6-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

DMS-V21

HMS-301

Synthesis of Hydro Pre-Crosslinked Liquid

HMS-993  DMS-V31

-continued

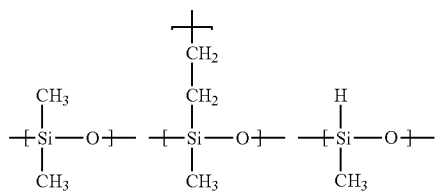

Formation of Crosslinked Polysiloxane Compound Layer

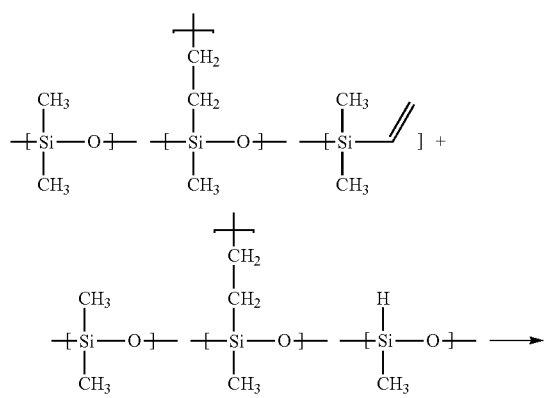

Example 7

A gas separation composite membrane (Example 7-(1)) including a crosslinked polysiloxane compound layer as a gas separation layer and a gas separation composite membrane (Example 7-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

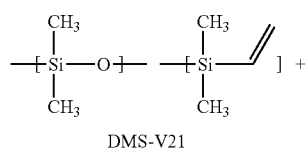

DMS-V21

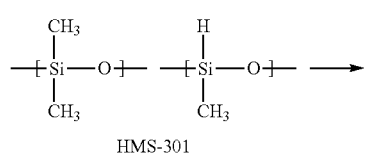

HMS-301

-continued

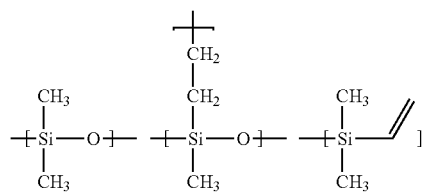

Synthesis of Hydro Pre-Crosslinked Liquid

Formation of Crosslinked Polysiloxane Compound Layer

Example 8

A gas separation composite membrane (Example 8-(1)) including a crosslinked polysiloxane compound layer as a gas separation layer and a gas separation composite membrane (Example 8-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

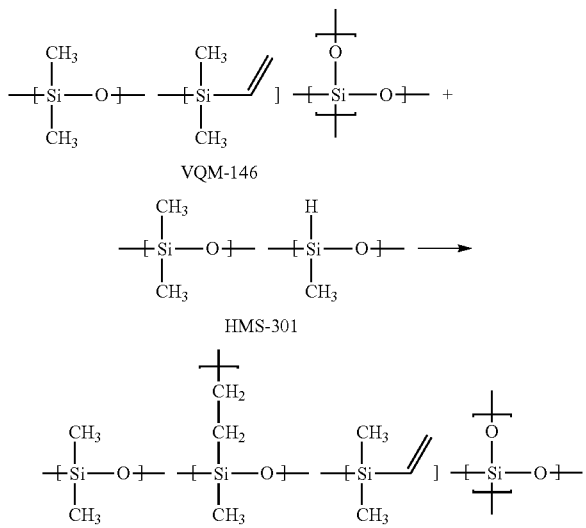

Synthesis of Hydro Pre-Crosslinked Liquid

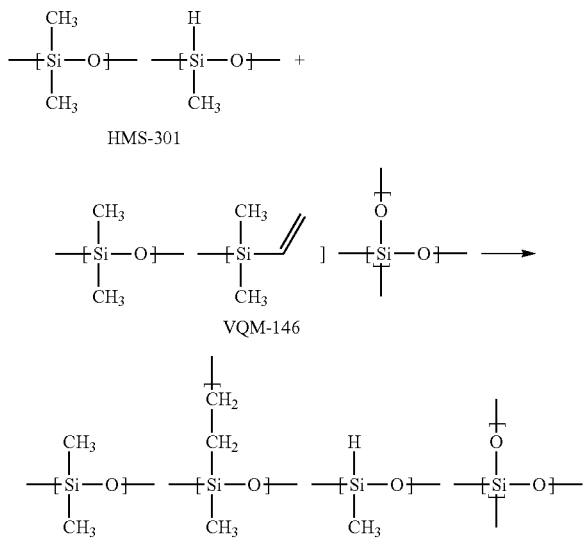

Formation of Crosslinked Polysiloxane Compound Layer

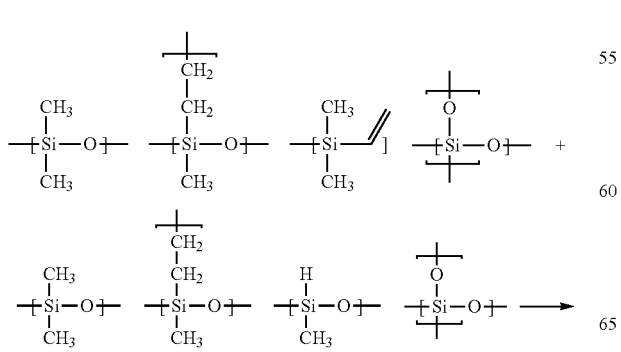

-continued

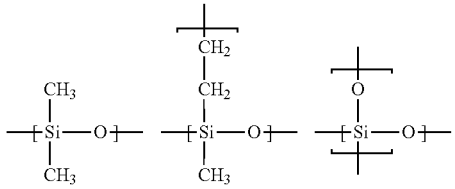

Example 9

A gas separation composite membrane (Example 9-(1)) including a crosslinked polysiloxane compound layer as a gas separation layer and a gas separation composite membrane (Example 9-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

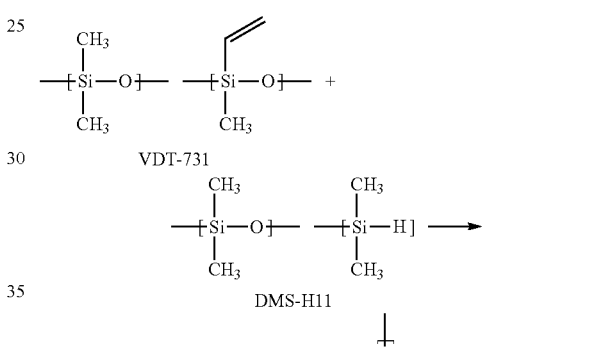

Synthesis of Hydro Pre-Crosslinked Liquid

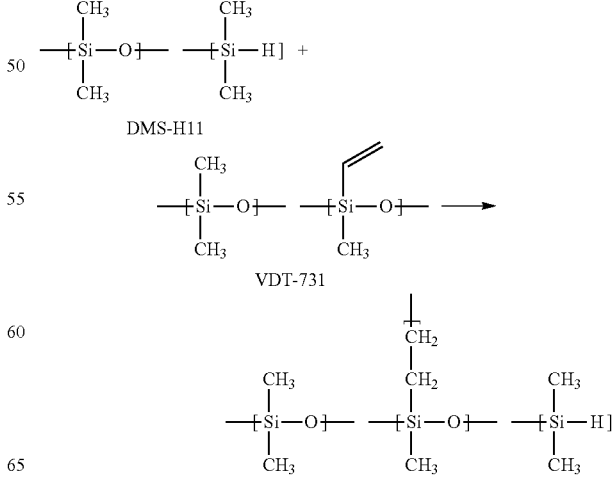

Formation of Crosslinked Polysiloxane Compound Layer

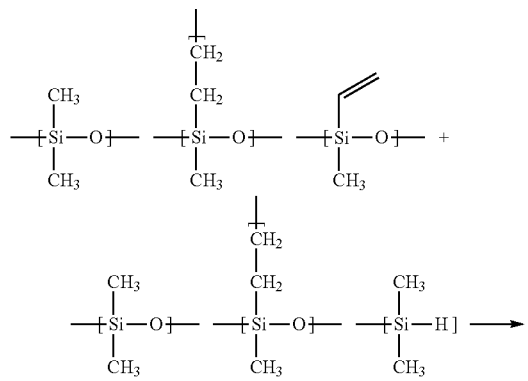

Example 10

A gas separation composite membrane (Example 10-(1)) including a crosslinked polysiloxane compound layer as a gas separation layer and a gas separation composite membrane (Example 10-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

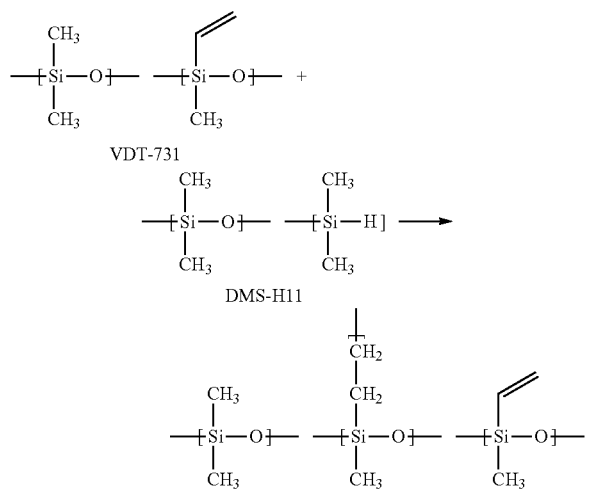

VDT-731

DMS-H11

Synthesis of Hydro Pre-Crosslinked Liquid

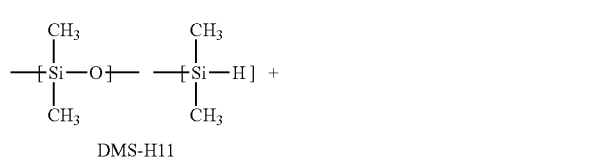

DMS-H11

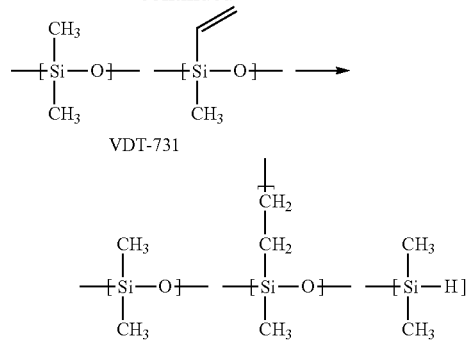

VDT-731

Formation of Crosslinked Polysiloxane Compound Layer

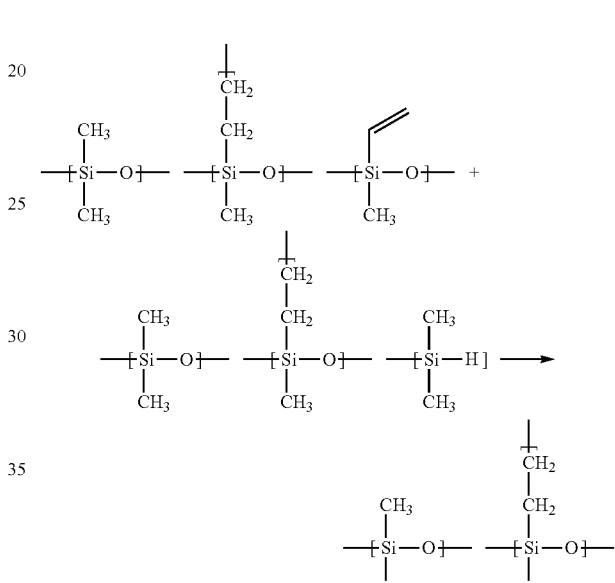

Example 11

A gas separation composite membrane (Example 11-(1)) including a crosslinked polysiloxane compound layer as a gas separation layer and a gas separation composite membrane (Example 11-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

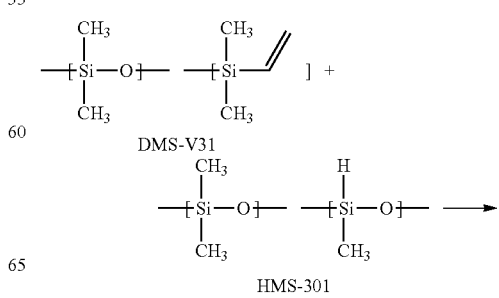

DMS-V31

HMS-301

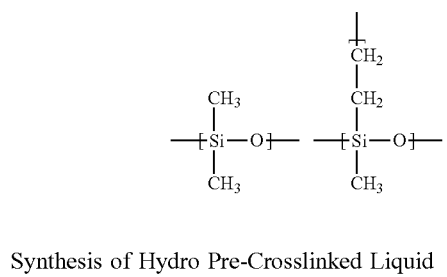

Synthesis of Hydro Pre-Crosslinked Liquid

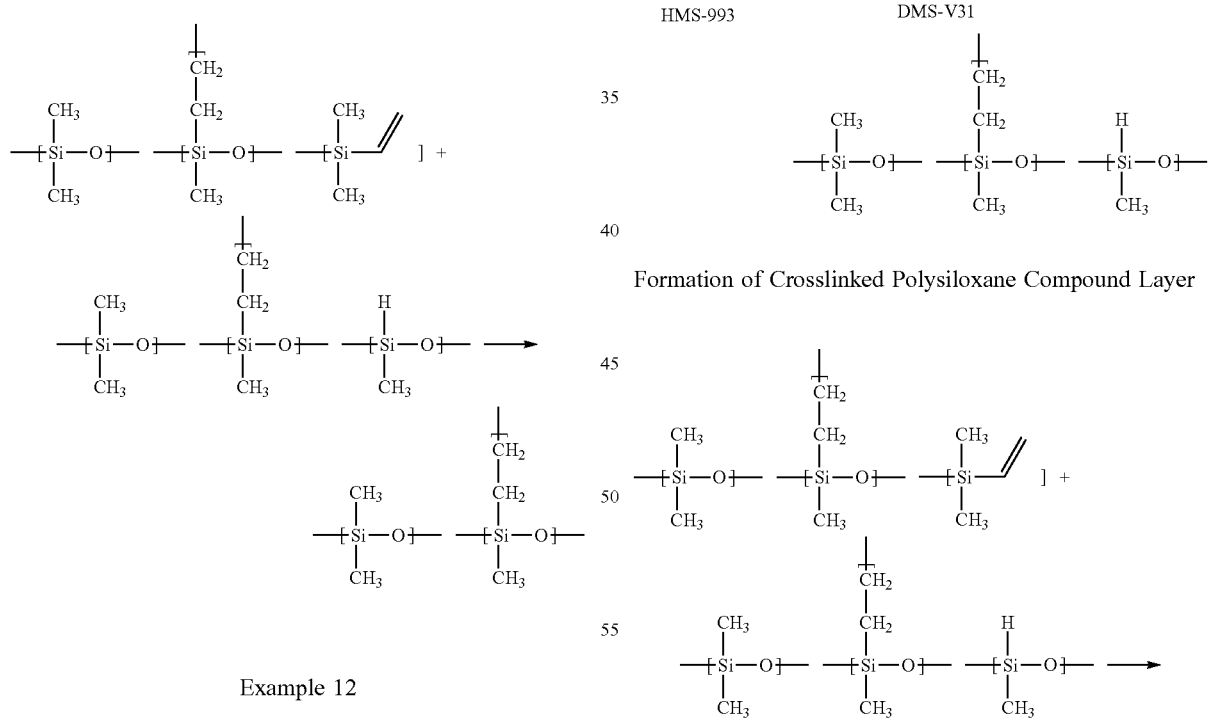

Formation of Crosslinked Polysiloxane Compound Layer

Example 12

A gas separation composite membrane (Example 12-(1)) including a crosslinked polysiloxane compound layer as a gas separation layer and a gas separation composite membrane (Example 12-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

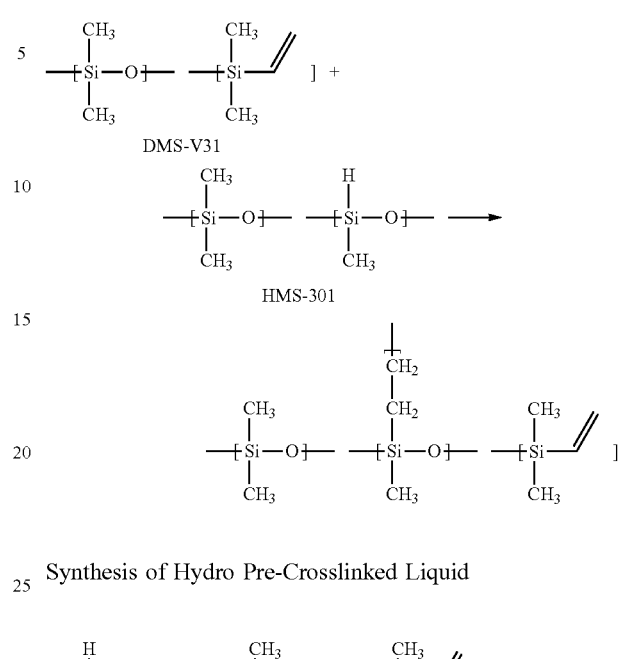

Synthesis of Hydro Pre-Crosslinked Liquid

Formation of Crosslinked Polysiloxane Compound Layer

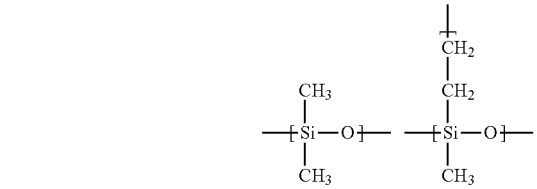

Example 13

A gas separation composite membrane (Example 13-(1)) including a crosslinked polysiloxane compound layer as a gas separation layer and a gas separation composite membrane (Example 13-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

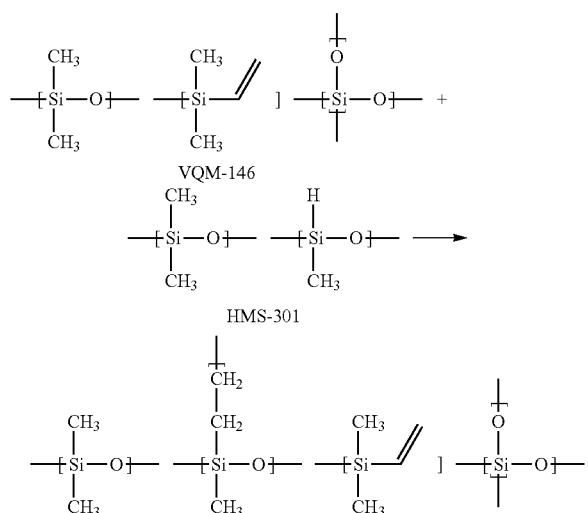

Synthesis of Hydro Pre-Crosslinked Liquid

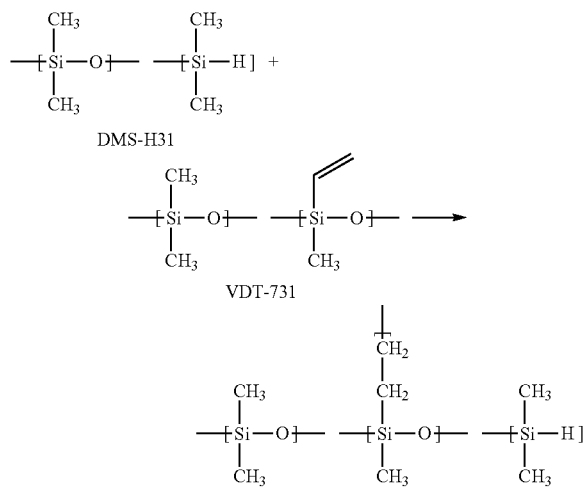

Formation of Crosslinked Polysiloxane Compound Layer

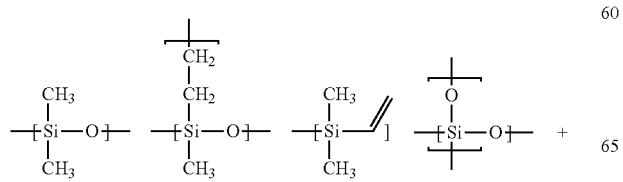

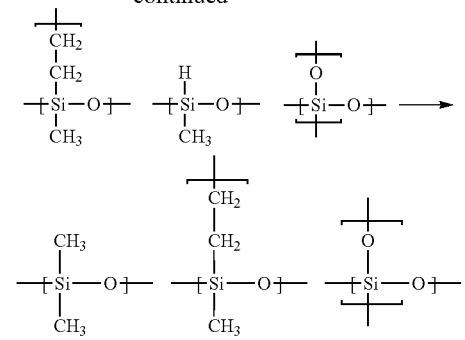

Example 14

A gas separation composite membrane (Example 14-(1)) including a crosslinked polysiloxane compound layer as a gas separation layer and a gas separation composite membrane (Example 14-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

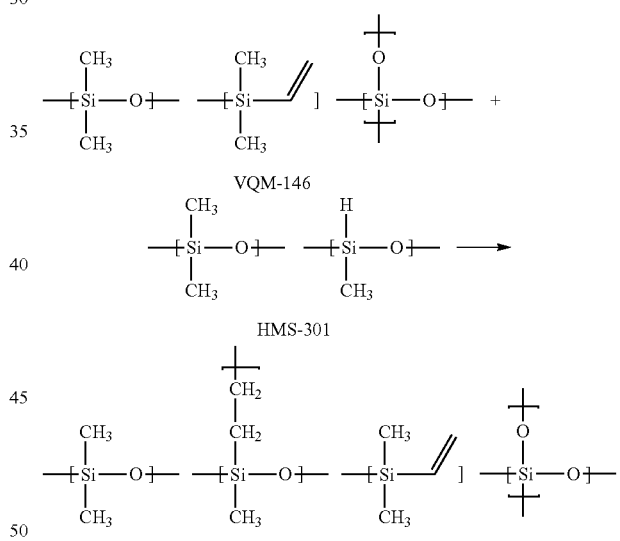

Synthesis of Hydro Pre-Crosslinked Liquid

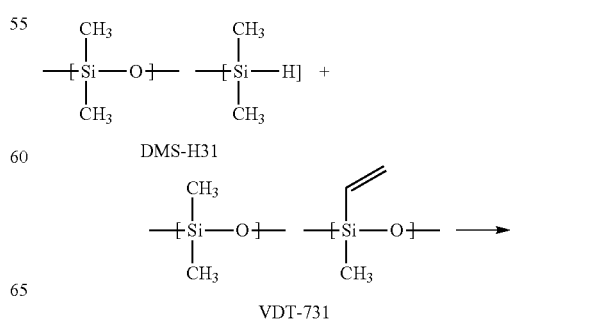

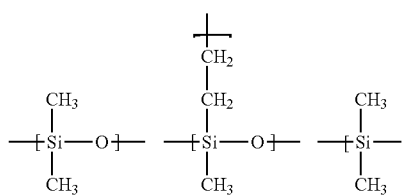

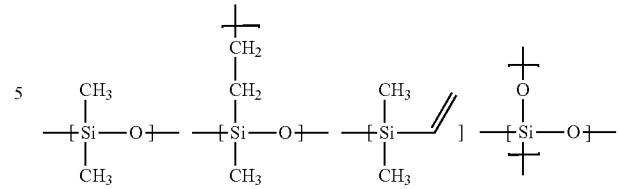

Formation of Crosslinked Polysiloxane Compound Layer

Synthesis of Hydro Pre-Crosslinked Liquid

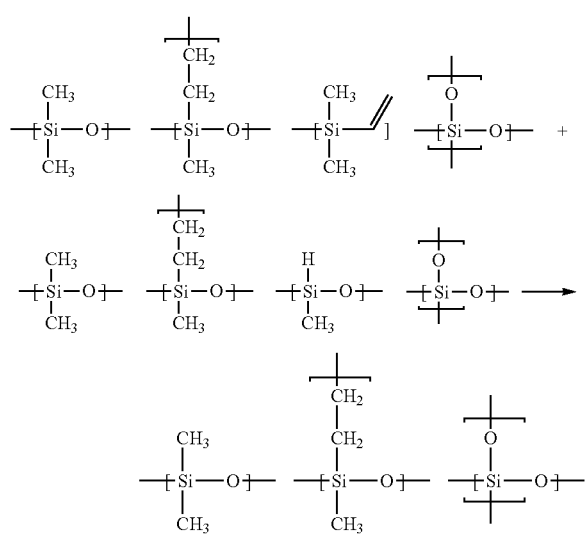

HMS-301

VQM-146

Formation of Crosslinked Polysiloxane Compound Layer

Example 15

A gas separation composite membrane (Example 15-(1)) including a crosslinked polysiloxane compound layer as a gas separation layer and a gas separation composite membrane (Example 15-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

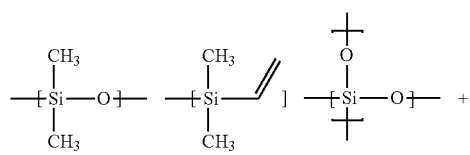

VQM-146

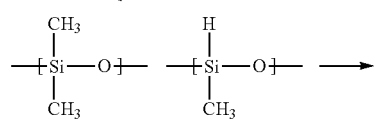

HMS-301

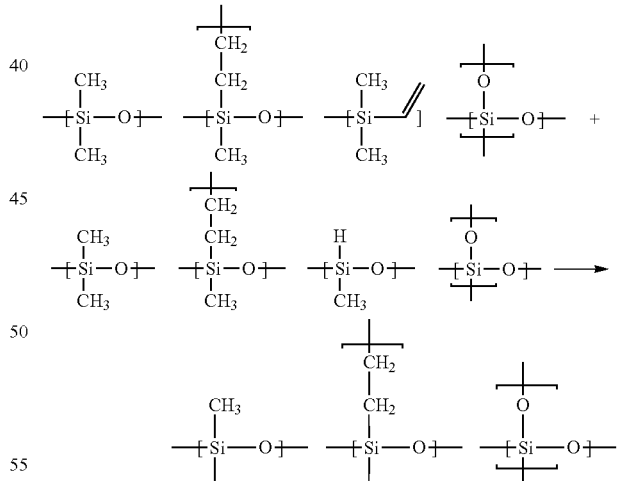

Example 16

A gas separation composite membrane (Example 16-(1)) including a crosslinked polysiloxane compound layer as a gas separation layer and a gas separation composite membrane (Example 16-(2)) including a gas separation layer formed of a polymer on a crosslinked polysiloxane compound layer were obtained in the same manner as in Example 1, except that the raw materials used and the curing conditions were changed to those listed in Tables below.

Example 17

A gas separation composite membrane (Example 17-(2)) was obtained in the same manner as in the case of the gas separation composite membrane in Example 1-(2), except that the following oxygen permeation treatment was performed on the crosslinked polysiloxane compound layer before the formation of the gas separation layer formed of a polymer in the gas separation composite membrane in Example 1-(2).

Oxygen Permeation Treatment

The crosslinked polysiloxane compound layer was inserted into a desktop vacuum plasma apparatus (manufactured by YOUTEC Co., Ltd.). The carrier gas conditions were set to be as follows: an oxygen flow rate of 20 cm$^3$ (STP)/min and an argon flow rate of 100 cm$^3$ (STP)/min. A plasma treatment was performed at a degree of vacuum of 30 Pa at an input power of 10 W for a treatment time of 10 seconds. The permeation of oxygen into the crosslinked polysiloxane compound layer was confirmed by checking whether the surface of the crosslinked polysiloxane compound layer was hydrophilized through measurement of a contact angle under the following conditions.

Measurement Conditions of Contact Angle

Determination device: DM-501 (trade name) manufactured by Kyowa Interface Science Co., Ltd.

Liquid: pure water

Liquid amount: 2.0 μl

Measurement temperature: 25° C.

Measurement method: Sessile drop method, θ/2 method, measured one second after dropping

Comparative Example 1

A gas separation composite membrane (Comparative Example 1-(1)) including a crosslinked polysiloxane compound layer as a gas separation layer and a gas separation composite membrane (Comparative Example 1-(2)) including a gas separation layer formed of a polymer on a crosslinked polysiloxane compound layer were obtained in the same manner as in Example 1, except that the raw materials used and the curing conditions were changed to those listed in Tables below.

Formation of Crosslinked Polysiloxane Compound Layer

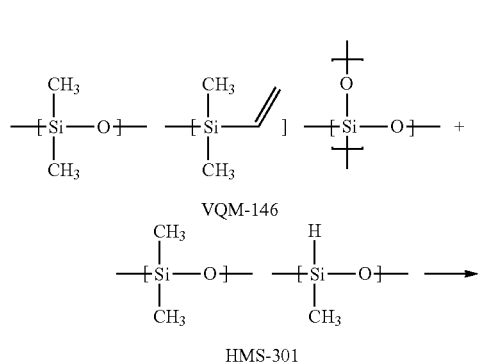

VQM-146

HMS-301

-continued

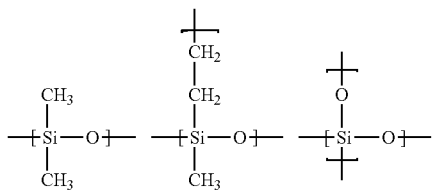

Comparative Example 2

A gas separation composite membrane (Comparative Example 2-(1)) including a crosslinked polysiloxane compound layer as a gas separation layer and a gas separation composite membrane (Comparative Example 2-(2)) including a gas separation layer formed of a polymer on a crosslinked polysiloxane compound layer were obtained in the same manner as in Example 1, except that the raw materials used and the curing conditions were changed to those listed in Tables below.

Synthesis of Vinyl Pre-Crosslinked Liquid

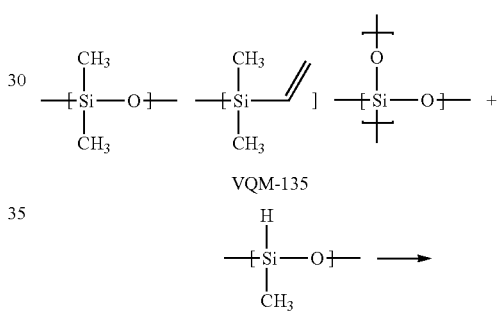

VQM-135

HMS-983

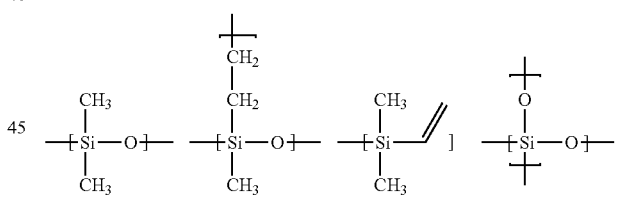

Formation of Crosslinked Polysiloxane Compound Layer

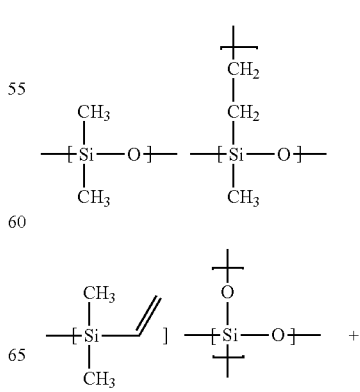

-continued

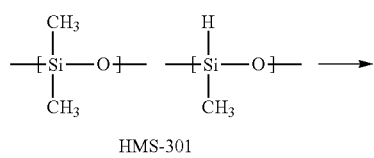

HMS-301

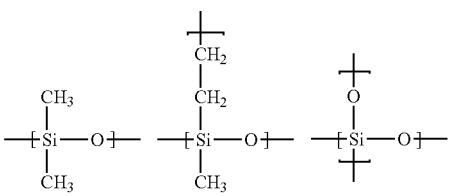

Comparative Example 3

A gas separation composite membrane (Comparative Example 3-(1)) including a crosslinked polysiloxane compound layer as a gas separation layer and a gas separation composite membrane (Comparative Example 3-(2)) including a gas separation layer formed of a polymer on a crosslinked polysiloxane compound layer were obtained in the same manner as in Example 1, except that the raw materials used and the curing conditions were changed to those listed in Tables below.

Synthesis of Hydro Pre-Crosslinked Liquid

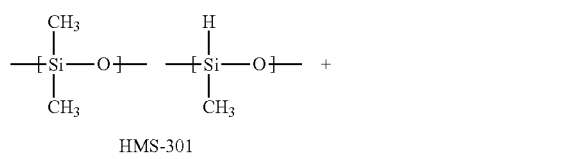

HMS-301

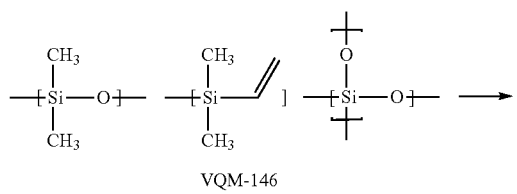

VQM-146

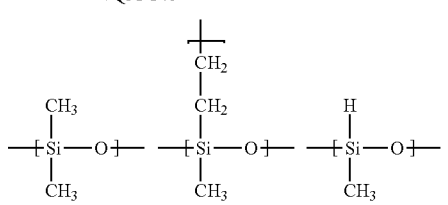

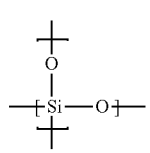

Formation of Crosslinked Polysiloxane Compound Layer

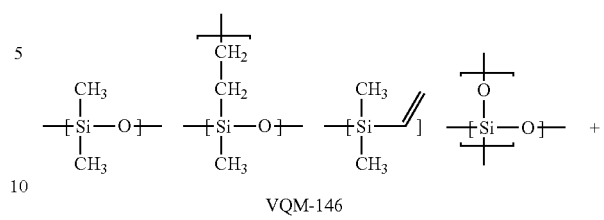

VQM-146

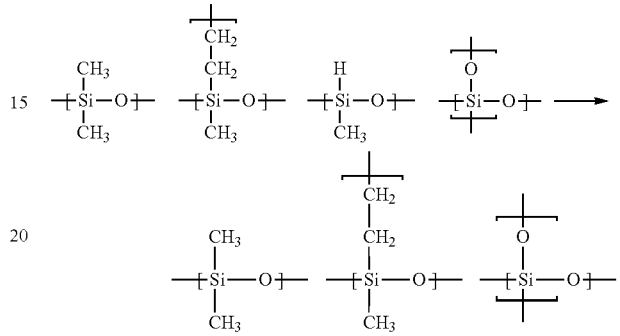

Comparative Example 4

A gas separation composite membrane (Comparative Example 4-(1)) including a crosslinked polysiloxane compound layer as a gas separation layer and a gas separation composite membrane (Comparative Example 4-(2)) including a gas separation layer formed of a polymer on a crosslinked polysiloxane compound layer were obtained in the same manner as in Example 1, except that the crosslinked polysiloxane compound layer was formed in the same manner as in the formation of a gutter layer described in Example 1 of U.S. Pat. No. 5,286,280A.

Synthesis of Vinyl Pre-Crosslinked Liquid

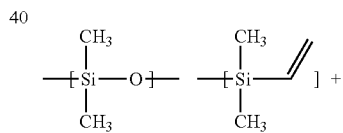

PS-783

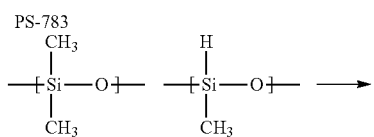

PS-123

Comparative Example 5

A gas separation composite membrane (Comparative Example 5-(1)) including a crosslinked polysiloxane compound layer as a gas separation layer and a gas separation composite membrane (Comparative Example 5-(2)) including a gas separation layer formed of a polymer on a crosslinked polysiloxane compound layer were obtained in the same manner as in Example 1, except that the crosslinked polysiloxane compound layer was formed in the same manner as in the formation of an epoxy-silicone resin layer described in Example 1 of U.S. Pat. No. 6,368,382B.

Comparative Example 6

A gas separation composite membrane (Comparative Example 6-(2)) was obtained in the same manner as in the case of the gas separation composite membrane in Comparative Example 4-(2), except that the oxygen permeation treatment in Example 17 was performed on the crosslinked polysiloxane compound layer before the formation of the gas separation layer formed of a polymer in the gas separation composite membrane in Comparative Example 4-(2).

Tables 2 and 3 below collectively show the composition ratio of the raw materials for preparing the vinyl pre-crosslinked liquids and the molar ratio of the structural units of the crosslinked polysiloxane compounds after the reaction. Tables 4 and 5 below collectively show the composition ratio of the raw materials for preparing the hydro pre-crosslinked liquids and the molar ratio of the structural units of the crosslinked polysiloxane compounds after the reaction. Tables 6 and 7 below collectively show the compositions of the crosslinked polysiloxane compound layers.

TABLE 2

| | | | \multicolumn{7}{c|}{Vinyl pre-crosslinked liquid} |
|---|---|---|---|---|---|---|---|---|---|
| | | | Example 1 | Example 2 | Example 3 | Example 4 | Example 5 | Example 6 | Example 7 |
| Raw material composition (mass ratio) | Binder (vinyl group-containing polysiloxane) | VQM-146 | 98.4 | 0 | 0 | 0 | 99 | 0 | 0 |
| | | VQM-135 | 0 | 99.6 | 0 | 0 | 0 | 0 | 0 |
| | | DMS-V31 | 0 | 0 | 0 | 0 | 0 | 0 | 0 |
| | | DMS-V21 | 0 | 0 | 96 | 0 | 0 | 94 | 92 |
| | | VDT-731 | 0 | 0 | 0 | 85 | 0 | 0 | 0 |
| | Crosslinking agent (hydrosilyl group-containing polysiloxane) | HMS-301 | 1.6 | 0 | 4 | 0 | 1 | 6 | 8 |
| | | HMS-993 | 0 | 0.4 | 0 | 0 | 0 | 0 | 0 |
| | | DMS-H11 | 0 | 0 | 0 | 15 | 0 | 0 | 0 |
| | Catalyst | SIP6830.3 | 0.12 | 0.24 | 0 | 0 | 0.12 | 0 | 0 |
| | | SIP6832.2 | 0 | 0 | 0.12 | 0.06 | 0 | 0.12 | 0.12 |
| | Terminator | 2-Methyl-3-butyn-2-ol | 0.04 | 0.08 | 0 | 0 | 0.04 | 0 | 0 |
| | Solvent | Heptane | 900 | 0 | 900 | 0 | 900 | 900 | 900 |
| | | Toluene | 0 | 900 | 0 | 900 | 0 | 0 | 0 |
| | Vinyl group/Hydrosilyl group (mixing molar ratio) | | 3.36 | 3.89 | 2.24 | 5.67 | 5.41 | 1.46 | 1.07 |
| Crosslinked polysiloxane after reaction | Molar ratio | Structural unit (a1) | 79.30 | 78.71 | 97.48 | 93.63 | 79.17 | 97.53 | 97.59 |
| | | Structural unit (a2) | 0.45 | 0.48 | 1.13 | 1.13 | 0.28 | 1.69 | 2.25 |
| | | Structural unit (a3) + (a4) | 1.06 | 1.39 | 1.40 | 5.25 | 1.24 | 0.78 | 0.17 |
| | | Structural unit (e1) + (e2) | 19.19 | 19.42 | 0.00 | 0.00 | 19.31 | 0.00 | 0.00 |

| | | | Example 8 | Example 9 | Example 10 | Example 11 | Example 12 |
|---|---|---|---|---|---|---|---|
| Raw material composition (mass ratio) | Binder (vinyl group-containing polysiloxane) | VQM-146 | 98.4 | 0 | 0 | 0 | 0 |
| | | VQM-135 | 0 | 0 | 0 | 0 | 0 |
| | | DMS-V31 | 0 | 0 | 0 | 98.5 | 98 |
| | | DMS-V21 | 0 | 0 | 0 | 0 | 0 |
| | | VDT-731 | 0 | 85 | 85 | 0 | 0 |
| | Crosslinking agent (hydrosilyl group-containing polysiloxane) | HMS-301 | 1.6 | 0 | 0 | 1.5 | 2 |
| | | HMS-993 | 0 | 0 | 0 | 0 | 0 |
| | | DMS-H11 | 0 | 15 | 15 | 0 | 0 |
| | Catalyst | SIP6830.3 | 0.12 | 0 | 0 | 0.12 | 0.12 |
| | | SIP6832.2 | 0 | 0.12 | 0.12 | 0 | 0 |
| | Terminator | 2-Methyl-3-butyn-2-ol | 0.04 | 0 | 0 | 0.04 | 0.04 |
| | Solvent | Heptane | 900 | 0 | 0 | 900 | 900 |
| | | Toluene | 0 | 900 | 900 | 0 | 0 |
| | Vinyl group/Hydrosilyl group (mixing molar ratio) | | 3.36 | 5.67 | 5.67 | 1.49 | 1.11 |
| Crosslinked polysiloxane after reaction | Molar ratio | Structural unit (a1) | 79.30 | 93.63 | 93.63 | 99.37 | 99.38 |
| | | Structural unit (a2) | 0.45 | 1.13 | 1.13 | 0.42 | 0.56 |
| | | Structural unit (a3) + (a4) | 1.06 | 5.25 | 5.25 | 0.21 | 0.06 |
| | | Structural unit (e1) + (e2) | 19.19 | 0.00 | 0.00 | 0.00 | 0.00 |

TABLE 3

| | | | Example 13 | Example 14 | Example 15 | Example 16 | Example 17 | Comparative Example 1 |
|---|---|---|---|---|---|---|---|---|
| Raw material composition (mass ratio) | Binder (vinyl group-containing polysiloxane) | VQM-146 | 98.4 | 98.4 | 98.4 | 98.4 | 98.4 | 100 |
| | | VQM-135 | 0 | 0 | 0 | 0 | 0 | 0 |
| | | DMS-V31 | 0 | 0 | 0 | 0 | 0 | 0 |
| | | DMS-V21 | 0 | 0 | 0 | 0 | 0 | 0 |
| | | VDT-731 | 0 | 0 | 0 | 0 | 0 | 0 |
| | Crosslinking agent (hydrosilyl group-containing polysiloxane) | HMS-301 | 1.6 | 1.6 | 1.6 | 1.6 | 1.6 | 0 |
| | | HMS-993 | 0 | 0 | 0 | 0 | 0 | 0 |
| | | DMS-H11 | 0 | 0 | 0 | 0 | 0 | 0 |
| | Catalyst | SIP6830.3 | 0.12 | 0.12 | 0.12 | 0.12 | 0.12 | 0.12 |
| | | SIP6832.2 | 0 | 0 | 0 | 0 | 0 | 0 |
| | Terminator | 2-Methyl-3-butyn-2-ol | 0.04 | 0.04 | 0.04 | 0.04 | 0.04 | 0.04 |
| | Solvent | Heptane | 900 | 900 | 900 | 900 | 900 | 900 |
| | | Toluene | 0 | 0 | 0 | 0 | 0 | 0 |
| | Vinyl group/Hydrosilyl group (mixing molar ratio) | | 1.11 | 3.36 | 3.36 | 3.36 | 3.36 | — |
| Crosslinked polysiloxane after reaction | Molar ratio | Structural unit (a1) | 79.30 | 79.30 | 79.30 | 79.30 | 79.30 | 78.96 |
| | | Structural unit (a2) | 0.45 | 0.45 | 0.45 | 0.45 | 0.45 | 0.00 |
| | | Structural unit (a3) + (a4) | 1.06 | 1.06 | 1.06 | 1.06 | 1.06 | 1.54 |
| | | Structural unit (e1) + (e2) | 19.19 | 19.19 | 19.19 | 19.19 | 19.19 | 19.50 |

| | | | Comparative Example 2 | Comparative Example 3 | Comparative Example 4 | Comparative Example 5 | Comparative Example 6 |
|---|---|---|---|---|---|---|---|
| Raw material composition (mass ratio) | Binder (vinyl group-containing polysiloxane) | VQM-146 | 0 | 100 | | | |
| | | VQM-135 | 99.6 | 0 | | | |
| | | DMS-V31 | 0 | 0 | | | |
| | | DMS-V21 | 0 | 0 | | | |
| | | VDT-731 | 0 | 0 | | | |
| | Crosslinking agent (hydrosilyl group-containing polysiloxane) | HMS-301 | 0 | 0 | | | |
| | | HMS-993 | 0.4 | 0 | | | |
| | | DMS-H11 | 0 | 0 | | | |
| | Catalyst | SIP6830.3 | 0.24 | 0.12 | | | |
| | | SIP6832.2 | 0 | 0 | | | |
| | Terminator | 2-Methyl-3-butyn-2-ol | 0.08 | 0.04 | | | |
| | Solvent | Heptane | 0 | 900 | | | |
| | | Toluene | 900 | 0 | | | |
| | Vinyl group/Hydrosilyl group (mixing molar ratio) | | 3.89 | — | | | |
| Crosslinked polysiloxane after reaction | Molar ratio | Structural unit (a1) | 78.71 | 78.96 | | | |
| | | Structural unit (a2) | 0.48 | 0.00 | | | |
| | | Structural unit (a3) + (a4) | 1.39 | 1.54 | | | |
| | | Structural unit (e1) + (e2) | 19.42 | 19.50 | | | |

TABLE 4

Hydro pre-crosslinked liquid

| | | | Example 1 | Example 2 | Example 3 | Example 4 | Example 5 | Example 6 | Example 7 |
|---|---|---|---|---|---|---|---|---|---|
| Raw material composition (mass ratio) | Binder (hydrosilyl group-containing polysiloxane) | HMS-301 | 35.0 | 35.0 | 0.0 | 0.0 | 35.0 | 0.0 | 0.0 |
| | | HMS-993 | 0.0 | 0.0 | 15.0 | 0.0 | 0.0 | 15.0 | 15.0 |
| | | DMS-H31 | 0.0 | 0.0 | 0.0 | 0.0 | 0.0 | 0.0 | 0.0 |
| | | DMS-H11 | 0.0 | 0.0 | 0.0 | 90.0 | 0.0 | 0.0 | 0.0 |
| | Crosslinking agent (vinyl group-containing polysiloxane) | VQM-146 | 65.0 | 65.0 | 0.0 | 0.0 | 65.0 | 0.0 | 0.0 |
| | | DMS-V31 | 0.0 | 0.0 | 85.0 | 0.0 | 0.0 | 85.0 | 85.0 |
| | | VDT-731 | 0.0 | 0.0 | 0.0 | 10.0 | 0.0 | 0.0 | 0.0 |
| | Catalyst | SIP6830.3 | 0.12 | 0.24 | 0 | 0 | 0.12 | 0 | 0 |
| | | SIP6832.2 | 0 | 0 | 0.12 | 0.06 | 0 | 0.12 | 0.12 |

TABLE 4-continued

| | | | | | | | | | |
|---|---|---|---|---|---|---|---|---|---|
| | | Hydro pre-crosslinked liquid | | | | | | | |
| | Terminator | 2-Methyl-3-butyn-2-ol | 0.04 | 0.08 | 0 | 0 | 0.04 | 0 | 0 |
| | Solvent | Heptane | 900 | 900 | 900 | 900 | 900 | 900 | 900 |
| | | Toluene | 0 | 0 | 0 | 0 | 0 | 0 | 0 |
| | Hydrosilyl group/Vinyl group (mixing molar ratio) | | 9.85 | 9.85 | 33.22 | 9.00 | 9.85 | 33.22 | 33.22 |
| Crosslinked polysiloxane after reaction | Molar ratio | Structural unit (b1) | 77.48 | 77.48 | 82.00 | 93.25 | 77.48 | 82.00 | 82.00 |
| | | Structural unit (b2) | 1.00 | 1.00 | 0.54 | 0.75 | 1.00 | 0.54 | 0.54 |
| | | Structural unit (b3) + (b4) | 8.84 | 8.84 | 17.46 | 6.00 | 8.84 | 17.46 | 17.46 |
| | | Structural unit (e1) + (e2) | 12.68 | 12.68 | 0.00 | 0.00 | 12.68 | 0.00 | 0.00 |

| | | | Example 8 | Example 9 | Example 10 | Example 11 | Example 12 |
|---|---|---|---|---|---|---|---|
| Raw material composition (mass ratio) | Binder (hydrosilyl group-containing polysiloxane) | HMS-301 | 80.0 | 0.0 | 0.0 | 0.0 | 0.0 |
| | | HMS-993 | 0.0 | 0.0 | 0.0 | 15.0 | 15.0 |
| | | DMS-H31 | 0.0 | 0.0 | 0.0 | 0.0 | 0.0 |
| | | DMS-H11 | 0.0 | 78.0 | 70.0 | 0.0 | 0.0 |
| | Crosslinking agent (vinyl group-containing polysiloxane) | VQM-146 | 20.0 | 0.0 | 0.0 | 0.0 | 0.0 |
| | | DMS-V31 | 0.0 | 0.0 | 0.0 | 85.0 | 85.0 |
| | | VDT-731 | 0.0 | 22.0 | 30.0 | 0.0 | 0.0 |
| | Catalyst | SIP6830.3 | 0.12 | 0 | 0 | 0.12 | 0.12 |
| | | SIP6832.2 | 0 | 0.12 | 0.12 | 0 | 0 |
| | Terminator | 2-Methyl-3-butyn-2-ol | 0.04 | 0 | 0 | 0.04 | 0.04 |
| | Solvent | Heptane | 900 | 900 | 900 | 900 | 900 |
| | | Toluene | 0 | 0 | 0 | 0 | 0 |
| | Hydrosilyl group/Vinyl group (mixing molar ratio) | | 73.17 | 3.55 | 2.33 | 33.22 | 33.22 |
| Crosslinked polysiloxane after reaction | Molar ratio | Structural unit (b1) | 73.60 | 94.15 | 94.75 | 82.00 | 82.00 |
| | | Structural unit (b2) | 0.31 | 1.65 | 2.25 | 0.54 | 0.54 |
| | | Structural unit (b3) + (b4) | 22.19 | 4.20 | 3.00 | 17.46 | 17.46 |
| | | Structural unit (e1) + (e2) | 3.90 | 0.00 | 0.00 | 0.00 | 0.00 |

TABLE 5

| | | | | | | | | |
|---|---|---|---|---|---|---|---|---|
| | | Hydro pre-crosslinked liquid | | | | | | |
| | | | Example 13 | Example 14 | Example 15 | Example 16 | Example 17 | Comparative Example 1 |
| Raw material composition (mass ratio) | Binder (hydrosilyl group-containing polysiloxane) | HMS-301 | 0.0 | 0.0 | 35.0 | 35.0 | 35.0 | 100.0 |
| | | HMS-993 | 0.0 | 0.0 | 0.0 | 0.0 | 0.0 | 0.0 |
| | | DMS-H31 | 99.0 | 99.5 | 0.0 | 0.0 | 0.0 | 0.0 |
| | | DMS-H11 | 0.0 | 0.0 | 0.0 | 0.0 | 0.0 | 0.0 |
| | Crosslinking agent (vinyl group-containing polysiloxane) | VQM-146 | 0.0 | 0.0 | 65.0 | 65.0 | 65.0 | 0.0 |
| | | DMS-V31 | 0.0 | 0.0 | 0.0 | 0.0 | 0.0 | 0.0 |
| | | VDT-731 | 1.0 | 0.5 | 0.0 | 0.0 | 0.0 | 0.0 |
| | Catalyst | SIP6830.3 | 0.12 | 0.12 | 0.12 | 0.12 | 0.12 | 0.12 |
| | | SIP6832.2 | 0 | 0 | 0 | 0 | 0 | 0 |
| | Terminator | 2-Methyl-3-butyn-2-ol | 0.04 | 0.04 | 0.04 | 0.04 | 0.04 | 0.04 |
| | Solvent | Heptane | 900 | 900 | 900 | 900 | 900 | 900 |
| | | Toluene | 0 | 0 | 0 | 0 | 0 | 0 |
| | Hydrosilyl group/Vinyl group (mixing molar ratio) | | 8.91 | 3.51 | 9.85 | 9.85 | 9.85 | — |
| Crosslinked polysiloxane after reaction | Molar ratio | Structural unit (b1) | 99.33 | 97.62 | 77.48 | 77.48 | 77.48 | 71.88 |
| | | Structural unit (b2) | 0.08 | 0.17 | 1.00 | 1.00 | 1.00 | 0.00 |
| | | Structural unit (b3) + (b4) | 0.59 | 0.44 | 8.84 | 8.84 | 8.84 | 28.13 |
| | | Structural unit (e1) + (e2) | 0.00 | 1.77 | 12.68 | 12.68 | 12.68 | 0.00 |

TABLE 5-continued

| | | | Hydro pre-crosslinked liquid | | | | |
|---|---|---|---|---|---|---|---|
| | | | Comparative Example 2 | Comparative Example 3 | Comparative Example 4 | Comparative Example 5 | Comparative Example 6 |
| Raw material composition (mass ratio) | Binder (hydrosilyl group-containing polysiloxane) | HMS-301 | 100.0 | 35.0 | | | |
| | | HMS-993 | 0.0 | 0.0 | | | |
| | | DMS-H31 | 0.0 | 0.0 | | | |
| | | DMS-H11 | 0.0 | 0.0 | | | |
| | Crosslinking agent (vinyl group-containing polysiloxane) | VQM-146 | 0.0 | 65.0 | | | |
| | | DMS-V31 | 0.0 | 0.0 | | | |
| | | VDT-731 | 0.0 | 0.0 | | | |
| | Catalyst | SIP6830.3 | 0.12 | 0.12 | | | |
| | | SIP6832.2 | 0 | 0 | | | |
| | Terminator | 2-Methyl-3-butyn-2-ol | 0.04 | 0.04 | | | |
| | Solvent | Heptane | 900 | 900 | | | |
| | | Toluene | 0 | 0 | | | |
| | Hydrosilyl group/Vinyl group (mixing molar ratio) | | — | 9.85 | | | |
| Crosslinked polysiloxane after reaction | Molar ratio | Structural unit (b1) | 71.88 | 77.48 | | | |
| | | Structural unit (b2) | 0.00 | 1.00 | | | |
| | | Structural unit (b3) + (b4) | 28.13 | 8.84 | | | |
| | | Structural unit (e1) + (e2) | 0.00 | 12.68 | | | |

TABLE 6

| | | Example 1 | Example 2 | Example 3 | Example 4 | Example 5 | Example 6 |
|---|---|---|---|---|---|---|---|
| Crosslinked polysiloxane compound layer | Vinyl pre-crosslinked liquid/Hydro pre-crosslinked liquid (mixing mass ratio) | 5 | 4 | 10 | 0.6 | 4 | 12 |
| | Hydrosilyl group/Vinyl group (mixing molar ratio) | 1.66 | 1.59 | 1.25 | 1.90 | 1.78 | 1.87 |
| | Polysiloxane molar ratio after reaction — Structural unit (f1) | 80.64 | 80.43 | 97.71 | 97.61 | 80.80 | 97.72 |
| | Structural unit (f2) | 1.26 | 1.49 | 2.29 | 2.39 | 1.22 | 2.28 |
| | Structural unit (e1) + (e2) | 18.10 | 18.07 | 0.00 | 0.00 | 17.98 | 0.00 |
| | Curing conditions (temperature, time) | 110° C. 1 h | 70° C. 5 h | 110° C. 1 h | 70° C. 5 h | 130° C. 0.5 h | 110° C. 1 h |
| | Surface treatment | No | No | No | No | No | No |
| Gas separation layer | Polymer | P-101 | P-201 | P-101 | P-201 | P-101 | P-101 |

| | | Example 7 | Example 8 | Example 9 | Example 10 | Example 11 | Example 12 |
|---|---|---|---|---|---|---|---|
| Crosslinked polysiloxane compound layer | Vinyl pre-crosslinked liquid/Hydro pre-crosslinked liquid (mixing mass ratio) | 70 | 15 | 0.6 | 0.3 | 60 | 150 |
| | Hydrosilyl group/Vinyl group (mixing molar ratio) | 1.51 | 1.39 | 1.33 | 1.90 | 1.41 | 1.87 |
| | Polysiloxane molar ratio after reaction — Structural unit (f1) | 97.62 | 80.35 | 97.61 | 98.53 | 99.38 | 99.38 |
| | Structural unit (f2) | 2.38 | 1.42 | 2.39 | 1.47 | 0.62 | 0.62 |
| | Structural unit (e1) + (e2) | 0.00 | 18.23 | 0.00 | 0.00 | 0.00 | 0.00 |
| | Curing conditions (temperature, time) | 110° C. 1 h | 110° C. 1 h | 70° C. 5 h | 70° C. 5 h | 110° C. 1 h | 110° C. 1 h |
| | Surface treatment | No | No | No | No | No | No |
| Gas separation layer | Polymer | P-101 | P-101 | P-201 | P-201 | P-101 | P-101 |

TABLE 7

|  |  | Example 13 | Example 14 | Example 15 | Example 16 | Example 17 | Comparative Example 1 |
|---|---|---|---|---|---|---|---|
| Crosslinked polysiloxane compound layer | Vinyl pre-crosslinked liquid/Hydro pre-crosslinked liquid (mixing mass ratio) | 0.3 | 0.3 | 5 | 5 | 5 | 10 |
|  | Hydrosilyl group/Vinyl group (mixing molar ratio) | 1.86 | 1.37 | 1.66 | 1.66 | 1.66 | 1.83 |
|  | Polysiloxane molar ratio after reaction — Structural unit (f1) | 95.22 | 93.86 | 80.64 | 80.64 | 80.64 | 80.88 |
|  | Structural unit (f2) | 0.35 | 0.35 | 1.26 | 1.26 | 1.26 | 1.40 |
|  | Structural unit (e1) + (e2) | 4.43 | 5.79 | 18.10 | 18.10 | 18.10 | 17.73 |
|  | Curing conditions (temperature, time) | 110° C. 1 h | 110° C. 1 h | 110° C. 1 h | 110° C. 1 h | 110° C. 1 h | 110° C. 1 h |
|  | Surface treatment | No | No | No | No | Yes | No |
| Gas separation layer | Polymer | P-101 | P-101 | P-301 | L-70 | P-101 | P-101 |

|  |  | Comparative Example 2 | Comparative Example 3 | Comparative Example 4 | Comparative Example 5 | Comparative Example 6 |
|---|---|---|---|---|---|---|
| Crosslinked polysiloxane compound layer | Vinyl pre-crosslinked liquid/Hydro pre-crosslinked liquid (mixing mass ratio) | 15 |  | 4 |  |  |
|  | Hydrosilyl group/Vinyl group (mixing molar ratio) | 1.35 |  | 1.44 |  |  |
|  | Polysiloxane molar ratio after reaction — Structural unit (f1) | 80.04 | 80.64 |  |  |  |
|  | Structural unit (f2) | 1.75 | 1.23 |  |  |  |
|  | Structural unit (e1) + (e2) | 18.21 | 18.14 |  |  |  |
|  | Curing conditions (temperature, time) | 110° C. 1 h | 110° C. 1 h |  |  |  |
|  | Surface treatment | No | No | No | No | Yes |
| Gas separation layer | Polymer | P-101 | P-101 | P-101 | P-101 | P-101 |

Notes in Tables

Binder, Crosslinking agent, and Catalyst: each manufactured by Gelest and listed by trade name Terminator: manufactured by Aldrich Solvent: manufactured by Wako Pure Chemical Industries, Ltd.

Test Example 1: Evaluation of Si Ratio Before and after Immersion in Chloroform A crosslinked polysiloxane compound layer having a size of 3 cm×3 cm was cut out from the gas separation composite membrane (the gas separation composite membrane not including "a gas separation layer formed of a polymer") including a crosslinked polysiloxane compound layer as a gas separation layer in each of Examples and Comparative Examples and immersed in 500 g of chloroform at 25° C. for 12 hours. Then, the cut film was taken out and dried in a vacuum. Subsequently, the surface of the crosslinked polysiloxane compound layer was irradiated with X-rays to measure the Si-Kα X-ray (1.74 keV) intensity (peak height). The surface of the crosslinked polysiloxane compound layer before the immersion in chloroform was also irradiated with X-rays in the same manner as above to measure the Si-Kα X-ray (1.74 keV) intensity. The Si ratio was calculated by substituting the Si-Kα X-ray (1.74 keV) intensities before and after the immersion in chloroform into the mathematical formula (I).

Test Example 2: Evaluation of Hardness

The hardness of the surface of the crosslinked polysiloxane compound layer in the gas separation composite membrane (the gas separation composite membrane not including "a gas separation layer formed of a polymer") including a crosslinked polysiloxane compound layer as a gas separation layer in each of Examples and Comparative Examples was measured using an HM500 hardness tester (Berkovich indenter) at a pressure of 0.05 mN.

Test Example 3: Volume Swelling Ratio after Exposure to Toluene-Saturated Atmosphere for 10 Minutes The gas separation composite membrane (the gas separation composite membrane not including "a gas separation layer formed of a polymer") including a crosslinked polysiloxane compound layer as a gas separation layer in each of Examples and Comparative Examples was exposed to a saturated toluene vapor. More specifically, a 100 mL beaker was inserted into a metal container with a lid that was filled with a toluene solvent, and the metal container covered with the lid was left to stand for 12 hours. Then, the lid was opened, the gas separation composite membrane produced in each of Examples and Comparative Examples was quickly inserted into the beaker, and the lid was closed again. The container was left to stand at 25° C. for 10 minutes, and the gas separation composite membrane was taken out of the container.

Each of the gas separation composite membranes before and after exposure to toluene was immersed in liquid nitrogen for 1 minute and fractured with a pair of forceps. The cross section was observed with a SEM and the thickness of the crosslinked polysiloxane compound layer was measured. The volume swelling ratio was calculated from the following formula.

Volume swelling ratio=(thickness after exposure to toluene)/(thickness before exposure to toluene)× 100

Test Example 4: Evaluation of Arithmetical Mean Roughness

The roughness curve of the surface (the surface opposite to the porous support) of the crosslinked polysiloxane compound layer in the gas separation composite membrane (the gas separation composite membrane not including "a gas separation layer formed of a polymer") including a crosslinked polysiloxane compound layer as a gas separation layer in each of Examples and Comparative Examples was measured using a white-light interferometer. The arithmetical mean roughness was calculated in conformity with JIS B0601. The sampling length was 0.08 mm.

Test Example 5: Evaluation of Sample Error Percentage

Figure 3:
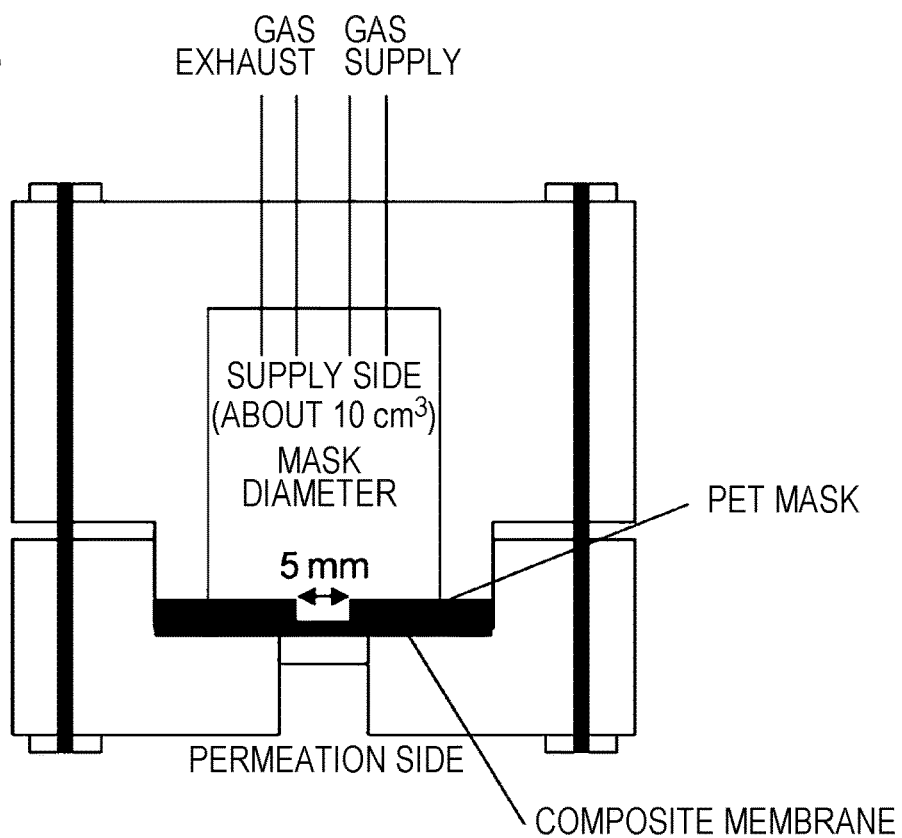
FIG. 3 schematically illustrates a method for evaluating gas separation performance in Examples.

Fifty gas separation composite membranes were prepared as samples by the same method described in each of Examples and Comparative Examples. As illustrated in FIG. 3, the gas separation composite membrane was set to a SUS316 stainless cell (manufactured by DENISSEN, internal volume: about 10 cm$^3$) having resistance to high pressure (PET mask: Lumirror manufactured by Toray Industries, Inc., mask diameter: φ5 mm). The temperature of the cell was adjusted to 30° C. A gas cylinder having a volume of 7000 L and a pressure of 6 MPa and including a mixture gas of carbon dioxide ($CO_2$) and methane ($CH_4$) at a volume ratio of 10:90 was connected to the gas supply side. If the pressure was not increased to 5 MPa when the pressure was applied for 10 minutes at a supply flow rate of 0.5 L/min and an exhaust flow rate of 0.0 L/min, the sample was judged to be a membrane with pin holes (sample error), and the sample error percentage was determined from the following formula.

The membrane formability was evaluated on the basis of the sample error percentage with reference to the evaluation criteria below.

Sample error percentage (%)=100×[number of sample errors/50]

Evaluation Criteria of Membrane Formability

A: sample error percentage of 1% or less (i.e., no sample errors)

B: sample error percentage of more than 1% and 3% or less (i.e., one sample error)

C: sample error percentage of more than 3% and 5% or less (i.e., two sample errors)

D: sample error percentage of more than 5% (i.e., three or more sample errors)

Evaluation outcomes of A to C are passing grades.

Test Example 6: Evaluation of Gas Separation Performance

The gas separation composite membrane prepared in each of Examples and Comparative Examples was set as illustrated in FIG. 3. The gas separation performance was evaluated using a SUS316 stainless cell (manufactured by DENISSEN) having resistance to high pressure at a cell temperature of 30° C. The total pressure of a mixture gas containing carbon dioxide ($CO_2$) and methane ($CH_4$) at a volume ratio of 10:90 on the gas supply side was adjusted to 5 MPa, and the permeability of each of $CO_2$ and $CH_4$ was measured with a TCD gas chromatography. The gas permeabilities of the gas separation composite membranes prepared in Examples and Comparative Examples were compared with each other by calculating a gas permeation rate as a gas permeance. The gas permeance (gas permeation rate) was expressed in units of GPU [1 GPU=1×10$^{-6}$ cm$^3$ (STP)/cm$^2$·sec·cmHg]. The gas separation selectivity was calculated as a ratio ($R_{CO2}/R_{CH4}$) of the permeation rate $R_{CO2}$ of $CO_2$ to the permeation rate $R_{CH4}$ of $CH_4$ of the membrane.

The evaluation criteria of the gas separation performance of the gas separation composite membrane (the gas separation composite membrane not including a gas separation layer formed of a polymer on a crosslinked polysiloxane compound layer) including a crosslinked polysiloxane compound layer as a gas separation layer are shown below.

A: gas permeability ($R_{CO2}$) of 800 GPU or more and gas separation selectivity ($R_{CO2}/R_{CH4}$) of 2.1 or more B: gas permeability ($R_{CO2}$) of 800 GPU or more and gas separation selectivity ($R_{CO2}/R_{CH4}$) of 1.8 or more and less than 2.1

C: gas permeability ($R_{CO2}$) of 800 GPU or more and gas separation selectivity ($R_{CO2}/R_{CH4}$) of 1.5 or more and less than 1.8

D: gas permeability ($R_{CO2}$) of 800 GPU or more and gas separation selectivity ($R_{CO2}/R_{CH4}$) of less than 1.5, gas permeability ($R_{CO2}$) of less than 800 GPU, or no test was conducted because the pressure did not increase Evaluation Outcomes of A to C are Passing Grades.

The evaluation criteria of the gas separation performance of the gas separation composite membrane including a gas separation layer formed of a polymer on a crosslinked polysiloxane compound layer are shown below.

A: gas permeability ($R_{CO2}$) of 30 GPU or more and gas separation selectivity ($R_{CO2}/R_{CH4}$) of 30 or more B: gas permeability ($R_{CO2}$) of 10 GPU or more and less than 30 GPU and gas separation selectivity ($R_{CO2}/R_{CH4}$) of 30 or more, or gas permeability ($R_{CO2}$) of 30 GPU or more and gas separation selectivity ($R_{CO2}/R_{CH4}$) of 10 or more and less than 30

C: gas permeability ($R_{CO2}$) of less than 10 GPU and gas separation selectivity ($R_{CO2}/R_{CH4}$) of 10 or more D: gas separation selectivity of less than 10 or no test was conducted because the pressure did not increase Evaluation Outcomes of A to C are Passing Grades.

Test Example 7: Evaluation of Gas Separation Performance after Swelling with Toluene A 100 mL beaker was inserted into a metal container with a lid that was filled with a toluene solvent, and the metal container covered with the lid was left to stand for 12 hours. Then, the lid was opened, the gas separation composite membrane produced in each of Examples and Comparative Examples was quickly inserted into the beaker, and the lid was closed again. The container was left to stand at 25° C. for 10 minutes, and the gas separation performance was evaluated in the same manner as in Test Example 6.

Test Example 8: Evaluation of Gas Separation Performance after Bending

The gas separation composite membrane produced in each of Examples and Comparative Examples was bent at 90 degrees and straightened 50 times, and then the gas separation performance was evaluated in the same manner as in Test Example 6.

Tables 8 and 9 below show the results of Test Examples.

TABLE 8

Gas separation composite membrane including crosslinked polysiloxane compound layer as gas separation layer

|  | Si Ratio | Hardness [N/mm$^2$] | Volume swelling ratio after exposure to toluene-saturated atmosphere for 10 minutes [%] | Arithmetical mean roughness [nm] | Sample error percentage | Gas separation performance | Gas separation performance after swelling with toluene | Gas separation performance after bending |
|---|---|---|---|---|---|---|---|---|
| Example 1-(1) | 0.9 | 80 | 106 | 30 | A | A | A | A |
| Example 2-(1) | 0.9 | 70 | 105 | 40 | A | A | A | A |
| Example 3-(1) | 0.9 | 60 | 118 | 20 | A | A | A | B |
| Example 4-(1) | 0.9 | 60 | 120 | 30 | A | A | A | B |
| Example 5-(1) | 0.8 | 50 | 138 | 50 | B | B | C | B |
| Example 6-(1) | 0.8 | 50 | 127 | 50 | B | B | C | B |
| Example 7-(1) | 0.7 | 40 | 143 | 90 | C | C | C | C |
| Example 8-(1) | 0.8 | 50 | 131 | 50 | B | B | C | B |
| Example 9-(1) | 0.8 | 50 | 130 | 50 | B | B | B | B |
| Example 10-(1) | 0.7 | 30 | 150 | 90 | C | C | C | C |
| Example 11-(1) | 0.8 | 50 | 128 | 60 | B | B | C | B |
| Example 12-(1) | 0.7 | 30 | 149 | 100 | C | C | C | C |
| Example 13-(1) | 0.7 | 60 | 150 | 70 | B | B | C | B |
| Example 14-(1) | 0.7 | 40 | 173 | 90 | C | C | C | C |
| Example 15-(1) | 0.9 | 80 | 106 | 30 | A | A | A | A |
| Example 16-(1) | 0.9 | 80 | 106 | 30 | A | A | A | A |
| Comparative Example 1-(1) | 0.1 | 0 | 248 | 450 | D | D | D | D |
| Comparative Example 2-(1) | 0.1 | 0 | 239 | 190 | D | D | D | D |
| Comparative Example 3-(1) | 0.2 | 10 | 205 | 210 | C | C | D | D |
| Comparative Example 4-(1) | 0.4 | 10 | 195 | 150 | C | C | D | D |
| Comparative Example 5-(1) | 0.4 | 10 | 220 | 280 | C | C | D | D |

TABLE 9

Gas separation composite membrane including gas separation layer formed of polymer on crosslinked polysiloxane compound layer

|  | Sample error percentage | Gas separation performance | Gas separation performance after swelling with toluene | Gas separation performance after bending |
|---|---|---|---|---|
| Example 1-(2) | A | A | A | A |
| Example 2-(2) | A | A | A | A |
| Example 3-(2) | A | A | A | B |
| Example 4-(2) | A | A | A | B |
| Example 5-(2) | B | B | C | B |
| Example 6-(2) | B | B | B | B |
| Example 7-(2) | C | C | C | C |
| Example 8-(2) | B | B | C | B |
| Example 9-(2) | B | B | B | B |
| Example 10-(2) | C | C | C | C |
| Example 11-(2) | B | B | C | B |
| Example 12-(2) | C | C | C | C |
| Example 13-(2) | B | B | C | B |
| Example 14-(2) | C | C | C | C |
| Example 15-(2) | A | A | A | A |
| Example 16-(2) | B | B | C | C |
| Example 17-(2) | A | A | A | A |
| Comparative Example 1-(2) | D | D | D | D |
| Comparative Example 2-(2) | D | D | D | D |
| Comparative Example 3-(2) | C | C | D | D |
| Comparative Example 4-(2) | C | C | D | D |
| Comparative Example 5-(2) | C | C | D | D |
| Comparative Example 6-(2) | C | C | D | D |

As shown in Tables 8 and 9 above, in the gas separation composite membranes in Comparative Examples 1-(1), 2-(1), and 3-(1) in which a vinyl group-containing polysiloxane having a non-crosslinked structure or a hydrosilyl group-containing polysiloxane having a non-crosslinked structure was used as a raw material for forming the crosslinked polysiloxane compound layer, the crosslinked polysiloxane compound layers had a small Si ratio, had a low hardness, were apt to swell (plasticize) through exposure to toluene, and had poor smoothness. Furthermore, the gas separation composite membranes in Comparative Examples 1-(1), 2-(1), and 3-(1) and the gas separation composite membranes in Comparative Examples 1-(2), 2-(2), and 3-(2) in which a gas separation layer formed of a polymer was further disposed on the crosslinked polysiloxane compound layer of the gas separation composite membrane in each of Comparative Examples 1-(1), 2-(1), and 3-(1) had gas separation performance reduced through exposure to toluene, leading to low durability, and had poor bending resistance.

In the gas separation composite membranes in Comparative Examples 4-(1), 4-(2), and 6-(2) in which a polysiloxane having a vinyl group and a hydrosilyl group in a single molecule thereof was used as a raw material and the gas separation composite membranes in Comparative Examples 5-(1) and 5-(2) in which a crosslinked polysiloxane structure was formed using an epoxy group, the crosslinked polysiloxane compound layers also had a small Si ratio, had a low hardness, were apt to swell (plasticize) through exposure to toluene, and had poor smoothness. The gas separation composite membranes in Comparative Examples 4-(1), 4-(2), 6-(2), 5-(1), and 5-(2) had gas separation performance reduced through exposure to toluene, leading to low durability, and had poor bending resistance.

In contrast, in the gas separation composite membranes in Examples 1-(1) to 16-(1) and Examples 1-(2) to 17-(2) produced by the production method according to the present invention, the crosslinked polysiloxane compound layers had a large Si ratio, had a high hardness, were not apt to swell (plasticize) through exposure to toluene, and had good surface smoothness. The gas separation composite membranes in Examples 1-(1) to 16-(1) and Examples 1-(2) to 17-(2) had good gas separation performance maintained even after exposure to toluene, leading to high durability, and had good bending resistance and therefore can be applied to various modules.

REFERENCE SIGNS LIST 1 gas separation layer
2 crosslinked polysiloxane compound layer
3 porous layer
4 nonwoven fabric layer
10, 20 gas separation composite membrane

What is claimed is:

1. A method for producing a gas separation composite membrane, the method comprising:
   applying a mixed liquid containing a crosslinkable polysiloxane compound (a) below and a crosslinkable polysiloxane compound (b) below onto a porous support to form a coating film; and
   curing the coating film to form a crosslinked polysiloxane compound layer:
   (a) a crosslinkable polysiloxane compound that has a structural unit represented by formula (a1) below, a structural unit represented by formula (a2) below, and at least one structural unit selected from the group consisting of a structural unit represented by formula (a3) below and a structural unit represented by formula (a4) below and that does not have a hydrosilyl group, and
   (b) a crosslinkable polysiloxane compound that has a structural unit represented by formula (b1) below, a structural unit represented by formula (b2) below, and at least one structural unit selected from the group consisting of a structural unit represented by formula (b3) below and a structural unit represented by formula (b4) below and that does not have a vinyl group,

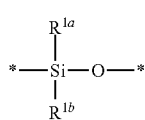

(a1)

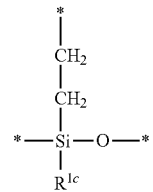

(a2)

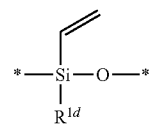

(a3)

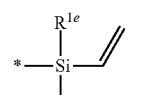

(a4)

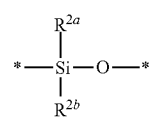

(b1)

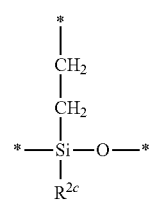

(b2)

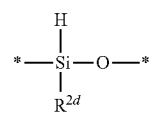

(b3)

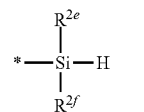

(b4)

where $R^{1a}$ to $R^{1f}$ and $R^{2a}$ to $R^{2f}$ represent a substituent that is not reactive with a vinyl group or a hydrosilyl group and * represents a linking site, where a linking site * in *—Si— and —O—* is a linking site in a siloxane bond and a linking site * in —$CH_2$—$CH_2$—* is a linking site with a Si atom constituting a siloxane bond.

2. The method for producing a gas separation composite membrane according to claim 1, wherein the crosslinkable polysiloxane compound (a) and the crosslinkable polysiloxane compound (b) are obtained by reacting a polysiloxane compound (c) below and a polysiloxane compound (d) below:
   (c) a polysiloxane compound that has a structural unit represented by formula (c1) below and at least one structural unit selected from the group consisting of a structural unit represented by formula (c3) below and a structural unit represented by formula (c4) below, and
   (d) a polysiloxane compound that has a structural unit represented by formula (d1) below and at least one structural unit selected from the group consisting of a structural unit represented by formula (d3) below and a structural unit represented by formula (d4) below,

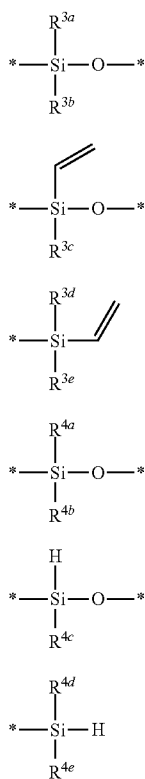

(c1)

(c3)

(c4)

(d1)

(d3)

(d4)

where $R^{3a}$ to $R^{3c}$ and $R^{4a}$ to $R^{4e}$ represent a substituent that is not reactive with a vinyl group or a hydrosilyl group and * represents a linking site in a siloxane bond.

3. The method for producing a gas separation composite membrane according to claim 1, wherein the crosslinkable polysiloxane compound (a) and/or the crosslinkable polysiloxane compound (b) has a structural unit represented by formula (e1) below and/or a structural unit represented by formula (e2) below:

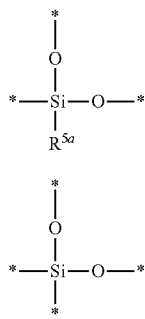

(e1)

(e2)

where $R^{5a}$ represents a substituent that is not reactive with a vinyl group or a hydrosilyl group and * represents a linking site in a siloxane bond.

4. The method for producing a gas separation composite membrane according to claim 1, wherein $R^{1a}$ to $R^{1f}$, $R^{2a}$ to $R^{2f}$, $R^{3a}$ to $R^{3e}$, $R^{4a}$ to $R^{4e}$, and $R^{5a}$ represent a non-aromatic substituent.

5. The method for producing a gas separation composite membrane according to claim 1, wherein after the cross-linked polysiloxane compound layer is formed, a gas separation layer is formed on the crosslinked polysiloxane compound layer.

6. The method for producing a gas separation composite membrane according to claim 5, wherein after the crosslinked polysiloxane compound layer is formed and before the gas separation layer is formed, an oxygen atom is caused to permeate into the crosslinked polysiloxane compound layer.

7. The method for producing a gas separation composite membrane according to claim 5, wherein the gas separation layer is a layer having a polyimide compound.

8. A liquid composition comprising a crosslinkable polysiloxane compound (a) below and a crosslinkable polysiloxane compound (b) below:

(a) a crosslinkable polysiloxane compound that has a structural unit represented by formula (a1) below, a structural unit represented by formula (a2) below, and at least one structural unit selected from the group consisting of a structural unit represented by formula (a3) below and a structural unit represented by formula (a4) below and that does not have a hydrosilyl group, and (b) a crosslinkable polysiloxane compound that has a structural unit represented by formula (b1) below, a structural unit represented by formula (b2) below, and at least one structural unit selected from the group consisting of a structural unit represented by fomnnula (b3) below and a structural unit represented by formula (b4) below and that does not have a vinyl group,

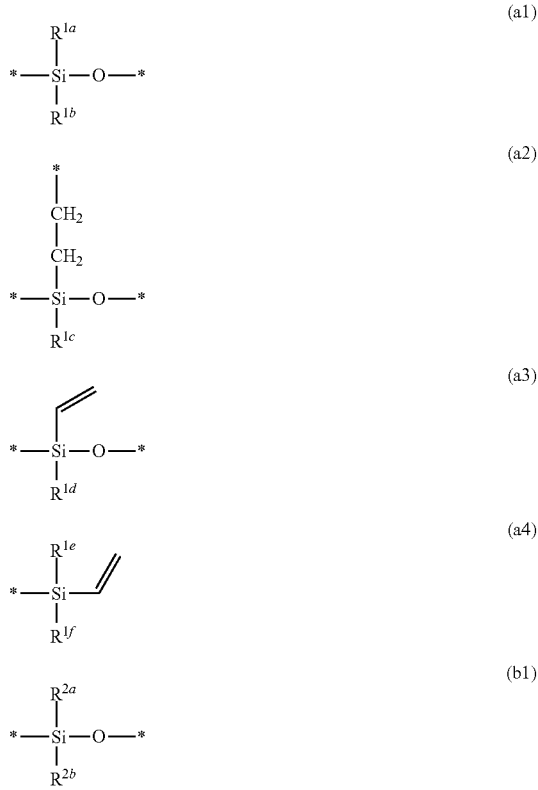

-continued

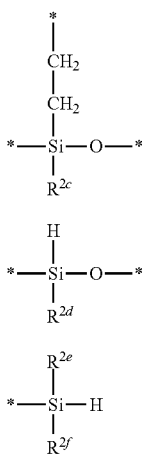

(b2)

(b3)

(b4)

where $R^{1a}$ to $R^{1f}$ and $R^{2a}$ to $R^{2f}$ represent a substituent that is not reactive with a vinyl group or a hydrosilyl group and * represents a linking site, where a linking site * in *—Si— and —O—* is a linking site in a siloxane bond and a linking site * in —CH$_2$—CH$_2$—* is a linking site with a Si atom constituting a siloxane bond.

9. The liquid composition according to claim 8, wherein a molar ratio of a total content β of a hydrosilyl group in the crosslinkable polysiloxane compound (b) to a total content α of a vinyl group in the crosslinkable polysiloxane compound (a) in the liquid composition is β/α=0.8 to 2.0.

10. The liquid composition according to claim 8, wherein $R^{1a}$ to $R^{1f}$ and $R^{2a}$ to $R^{2f}$ represent a non-aromatic substituent.

11. A gas separation composite membrane comprising a crosslinked polysiloxane compound layer on a porous support,
wherein the crosslinked polysiloxane compound layer has
a structural unit represented by formula (f1) below and
a structural unit represented by formula (f2) below,
a Si ratio of the crosslinked polysiloxane compound layer before and after immersion in chloroform, the Si ratio being calculated from mathematical formula (I) below, is 0.65 to 1.00, and
a surface of the crosslinked polysiloxane compound layer has an arithmetical mean roughness of 70 nm or less,

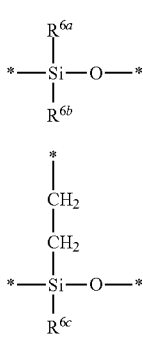

(f1)

(f2)

where $R^{6a}$ to $R^{6c}$ represent a substituent that is not reactive with a vinyl group or a hydrosilyl group and * represents a linking site, where a linking site * in *—Si— and —O—* is a linking site in a siloxane bond and a linking site * in —CH$_2$—CH$_2$—* is a linking site with a Si atom constituting a siloxane bond, Si ratio=(Si-Kα X-ray intensity after immersion in chloroform)/(Si-Kα X-ray intensity before immersion in chloroform).     Mathematical formula (1)

12. The gas separation composite membrane according to claim 11, wherein the crosslinked polysiloxane compound layer has a structural unit represented by formula (e1) below and/or a structural unit represented by formula (e2) below:

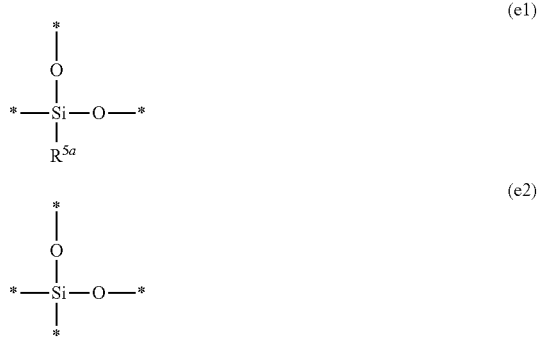

where $R^{5a}$ represents a substituent and * represents a linking site in a siloxane bond.

13. The gas separation composite membrane according to claim 11, wherein the crosslinked polysiloxane compound layer has a hardness of 30 N/mm$^2$ or more.

14. The gas separation composite membrane according to claim 11, wherein a volume swelling ratio obtained when the crosslinked polysiloxane compound layer is exposed to a toluene-saturated atmosphere for 10 minutes is 100% to 155%.

15. The gas separation composite membrane according to claim 11, wherein $R^{6a}$ to $R^{6c}$ represent a non-aromatic substituent.

16. The gas separation composite membrane according to claim 12, wherein $R^{5a}$ represents a non-aromatic substituent.

17. The gas separation composite membrane according to claim 11, comprising a gas separation layer on the crosslinked polysiloxane compound layer.

18. The gas separation composite membrane according to claim 17, wherein the gas separation layer contains a polyimide compound.

19. A gas separation module comprising the gas separation composite membrane according to claim 11.

20. A gas separation apparatus comprising the gas separation module according to claim 19.

* * * * *